US012527823B2

(12) United States Patent
Rafii et al.

(10) Patent No.: US 12,527,823 B2
(45) Date of Patent: Jan. 20, 2026

(54) GENERATION OF KIDNEY GLOMERULAR SPECIFIC ENDOTHELIAL CELLS AND METHODS OF USE

(71) Applicant: CORNELL UNIVERSITY, Ithaca, NY (US)

(72) Inventors: Shahin Rafii, Great Neck, NY (US); David M. Barry, Ithaca, NY (US); Sina Rabbany, Great Neck, NY (US); Balvir Kunar, Ithaca, NY (US); Raphael Lis, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 918 days.

(21) Appl. No.: 17/777,856

(22) PCT Filed: Nov. 20, 2020

(86) PCT No.: PCT/US2020/061515
§ 371 (c)(1),
(2) Date: May 18, 2022

(87) PCT Pub. No.: WO2021/102267
PCT Pub. Date: May 27, 2021

(65) Prior Publication Data

US 2022/0409670 A1 Dec. 29, 2022

Related U.S. Application Data

(60) Provisional application No. 62/937,982, filed on Nov. 20, 2019.

(51) Int. Cl.

| | |
|---|---|
| ***A61K 35/44*** | (2015.01) |
| ***A61P 13/12*** | (2006.01) |
| ***C12N 5/071*** | (2010.01) |
| ***C12N 15/86*** | (2006.01) |

(52) U.S. Cl.
CPC .............. *A61K 35/44* (2013.01); *A61P 13/12* (2018.01); *C12N 5/0686* (2013.01); *C12N 15/86* (2013.01); *C12N 2500/90* (2013.01); *C12N 2506/28* (2013.01); *C12N 2740/15043* (2013.01)

(58) Field of Classification Search
None
See application file for complete search history.

(56) References Cited

U.S. PATENT DOCUMENTS

| | | | | |
|---|---|---|---|---|
| 6,899,822 | B2 | 5/2005 | McKedy | |
| 11,479,602 | B2 * | 10/2022 | Hu | A61P 11/06 |
| 11,492,392 | B2 * | 11/2022 | Hu | A61P 13/12 |
| 11,840,683 | B2 * | 12/2023 | Perin | C12M 29/10 |
| 2006/0216722 | A1 | 9/2006 | Betsholtz et al. | |
| 2007/0026520 | A1 | 2/2007 | Kelly | |
| 2011/0044895 | A1 | 2/2011 | Berry et al. | |
| 2012/0207744 | A1 | 8/2012 | Mendlein et al. | |
| 2014/0242595 | A1 | 8/2014 | Yu et al. | |
| 2016/0058800 | A1 | 3/2016 | Yoshida et al. | |
| 2016/0137985 | A1 | 5/2016 | Osafune et al. | |
| 2016/0143949 | A1 | 5/2016 | Ingber et al. | |
| 2016/0244718 | A1 | 8/2016 | Vogel et al. | |
| 2017/0191031 | A1 | 7/2017 | Sullivan et al. | |
| 2017/0205396 | A1 | 7/2017 | Izpisua Belmonte et al. | |
| 2018/0216078 | A1 | 8/2018 | Rossi et al. | |
| 2019/0321490 | A1 | 10/2019 | Meis et al. | |

FOREIGN PATENT DOCUMENTS

| | | | |
|---|---|---|---|
| EP | 3719116 | A1 | 10/2020 |
| JP | 2008099737 | A | 5/2008 |
| WO | 2008060792 | A2 | 5/2008 |
| WO | 2019140260 | A1 | 7/2019 |
| WO | 2019230737 | A1 | 12/2019 |

OTHER PUBLICATIONS

Snippert, H. J., et al., "Intestinal crypt homeostasis results from neutral competition between symmetrically dividing Lgr5 stem cells", Cell 143, Oct. 1, 2010, pp. 134-144.
Trapnell, C. et al., "The dynamics and regulators of cell fate decisions are revealed by pseudotemporal ordering of single cells", Nature Biotechnology, Apr. 2014, pp. 381-386, vol. 32, No. 4.
Van den Berg, C.W., et al., "Renal Subcapsular Transplantation of PSC-Derived Kidney Organoids Induces Neo-vasculogenesis and Significant Glomerular and Tubular Maturation In Vivo", Stem Cell Reports, Mar. 13, 2018, pp. 751-765, vol. 10.
Vanlandewijck, M. et al., "A molecular atlas of cell types and zonation in the brain vasculature", Nature, Feb. 22, 2018, pp. 475-480, vol. 554.
Washkowitz, A. J., et al., "Diverse functional networks of Tbx3 in development and disease", Wiley Interdiscip Rev Syst Biol Med, May 2012, pp. 273-283, 4(3).
Zhang, B., et al., "The association between the polymorphisms in a sodium channel gene SCN7A and essential hypertension: a case-control study in the Northern Han Chinese", Annals of Human Genetics, Accepted Sep. 3, 2014, 9 pages.
Extended European Search Report dated Dec. 7, 2023 received in EP Application No. 20890437, 10 pages.

(Continued)

*Primary Examiner* — Blaine Lankford
(74) *Attorney, Agent, or Firm* — Scully, Scott, Murphy & Presser, P.C.

(57) ABSTRACT

The present disclosure is directed to method of generating human glomeruli endothelial cells (HGECs) from human endothelial cells (ECs), comprising expressing in human ECs an exogenous nucleic acid encoding a T-box transcription factor 3 (Tbx3), alone or in combination with one or more of PR domain zinc finger protein 1 (Prdm1), GATA Binding Protein 5 (Gata5) and Pre-B-Cell Leukemia Transcription Factor 1 (Pbx1). Disclosed also are HGECs produced by the methods of the instant disclosure, as well as methods for using the same.

24 Claims, 22 Drawing Sheets
(22 of 22 Drawing Sheet(s) Filed in Color)
Specification includes a Sequence Listing.

(56) References Cited

OTHER PUBLICATIONS

Farber, G., et al., "Glomerular endothelial cell maturation depends on ADAMI0, a key regulator of Notch signaling", Angiogenesis (2018), Jun. 22, 2017, Accepted Jan. 8, 2018, Published online Feb. 3, 2018, pp. 335-347, 21.
Leuning, D.G, "Vascular bioengineering of scaffolds derived from human discarded transplant kidneys using human pluripotent stem cell-derived endothelium", American Journal of Transplantation 2019, Revised Oct. 22, 2018, Accepted Nov. 21, 2018, pp. 1328-1343.
Nakagawa, Y., et al., "Serum antibody activity to glomerular endothelial cells is a prospective indicator of renal allograft rejection", Clinical and Experimental Nephrology (2002), Accepted Mar. 22, 2002, pp. 111-117.
Rops, A., et al., "Isolation and characterization of conditionally immortalized mouse glomerular endothelial cell lines", Kidney International (2004), Received for publication Apr. 1, 2004, revised May 28, 2004, accepted Jun. 18, 2004, pp. 2193-2201, 66.
Sengoelge, G., et al., "A SAGE based approach to human glomerular endothelium: defining the transcriptome, finding a novel molecule and highlighting endothelial diversity", BMC Genomics 2014, Accepted Aug. 15, 2014, Published Aug. 27, 2014, pp. 1-16, 15:725.
Aibar, S. et al., "SCENIC: single-cell regulatory network inference and clustering" Nat Methods, 2017, pp. 1083-1086, 14(11).
Aird, W. C., "Phenotypic heterogeneity of the endothelium: II. Representative vascular beds", Circulation Research 100, Feb. 2, 2007, pp. 174-190.
Alva, J. A., et al., "VE-Cadherin-Cre-recombinase transgenic mouse: a tool for lineage analysis and gene deletion in endothelial cells", Developmental Dynamics, 2006, pp. 759-767, 235.
Augustin, H. G., et al., "Organotypic vasculature: From descriptive heterogeneity to functional pathophysiology", Science 357, Aug. 25, 2017, pp. 1-12.
Barry, D.M., et al., "Molecular determinants of nephron vascular specialization in the kidney", Nature Communications, 2019, 14 pages, 10:5705.
Bartlett, C. S., et al., "Vascular Growth Factors and Glomerular Disease", Annu Rev Physiol, 2016, pp. 437-461, 78.
Brunskill, E.W., et al., "Single cell dissection of early kidney development: multilineage priming", Development, Accepted May 21, 2014 pp. 3093-3101, 141.
Choi, M., et al., "K+ channel mutations in adrenal aldosterone-producing adenomas and hereditary hypertension", Science, Feb. 2011, pp. 768-772, 331(6018).
Daniel, E., et al., "Spatiotemporal heterogeneity and patterning of developing renal blood vessels", Angiogenesis, Aug. 2018, pp. 617-634, 21(3).
Danziger, J., et al., "Osmotic homeostasis", Clin J Am Soc Nephrol, May 2015, pp. 852-862, vol. 10.
De Luca, A., et al., "Taurine: the appeal of a safe amino acid for skeletal muscle disorders", J Transl Med, 2015, 18 pages, 13:243.
Ema, M., et al., "Deletion of the selection cassette, but not cis-acting elements, in targeted Flk1-lacZ allele reveals Flk1 expression in multipotent mesodermal progenitors", Blood, Jan. 1, 2006, pp. 111-117, vol. 107, No. 1.
Frank, D. U., et al., "Mouse TBX3 mutants suggest novel molecular mechanisms for Ulnar-mammary syndrome", PLoS One, Jul. 2013, pp. 1-7, vol. 8, Issue 7, e67841.
Frey, B. J., et al., "Clustering by passing messages between data points", Science, Feb. 16, 2007, pp. 972-976, vol. 315.
George, M., et al., "Renal thrombotic microangiopathy in mice with combined deletion of endocytic recycling regulators EHD3 and EHD4", PLoS One, Mar. 2011, pp. 1-11, vol. 6, Issue 3, e17838.
Ginsberg, M., et al., "Efficient Direct Reprogramming of Mature Amniotic Cells into Endothelial Cells by ETS Factors and TGFb Suppression", Cell, Oct. 26, 2012, pp. 559-575, 151.
Gori, J. L., et al., "Endothelial Cells Promote Expansion of Long-Term Engrafting Marrow Hematopoietic Stem and Progenitor Cells in Primates", Stem Cells Translational Medicine, 2017, pp. 864-876, 6.
Grabias, B.M., et al., "The physical basis of renal fibrosis: effects of altered hydrodynamic forces on kidney homeostasis", Am J Physiol Renal Physiol, 2014, pp. F473-F485, 306.
Hagenbuch, B., "Cellular entry of thyroid hormones by organic anion transporting polypeptides", Best Practice & Research Clinical Endocrinology & Metabolism, 2007, pp. 209-221, vol. 21. No. 2.
Hamm, L L., et al., "Acid-Base Homeostasis", Clinical Journal of the American Society of Nephrology, Dec. 2015, pp. 2232-2242, vol. 10.
Han, X., et al., "Knockout of the TauT gene predisposes C57BL/6 mice to streptozotocin-induced diabetic nephropathy", PLoS One, Jan. 28, 2015, pp. 1-13, 10(1): e0117718.
Hanner, F., et al., "Connexins and the kidney", Am J Physiol Regul Integr Comp Physiol, 2010, pp. R1143-R1155, 298.
Helgason, C.D., et al., "Basic Cell Culture Protocols", 4th Edition, Human Press Publishing, 2013, 550 pages.
Homan, K.A., et al., "Flow-enhanced vascularization and maturation of kidney organoids in vitro", Nat Methods, Mar. 2019, pp. 255-262, 16(3).
Julian, B.A., et al., "Sources of Urinary Proteins and their Analysis by Urinary Proteomics for the Detection of Biomarkers of Disease", Proteomics Clin Appl, Aug. 26, 2009, pp. 1029-1043, 3(9).
Kenig-Kozlovsky, Y., et al., "Ascending Vasa Recta Are Angiopoietin/Tie2-Dependent Lymphatic-Like Vessels", J Am Soc Nephrol, 2018, pp. 1097-1107, 29.
Klingenstein, M., et al., "TBX3 Knockdown Decreases Reprogramming Efficiency of Human Cells", Stem Cells International, Accepted Jul. 2, 2015, 7 pages, vol. 2016, Article ID 6759343.
Kummerfeld, S. K., et al., "DBD: a transcription factor prediction database", Nucleic Acids Research, 2006, pp. D74-D81, vol. 34.
Lee, K. S. et al., "Catheter-directed Intraportal Delivery of Endothelial Cell Therapy for Liver Regeneration: A Feasibility Study in a Large-Animal Model of Cirrhosis", Radiology, Oct. 2017, pp. 114-123, vol. 285, No. 1.
Lu, Y., et al., "Single-cell RNA-sequence analysis of mouse glomerular mesangial cells uncovers mesangial cell essential genes", Kidney International, revised Jan. 10, 2017, accepted Jan. 12, 2017, published online Mar. 18, 2017, pp. 504-513, 92.
McMahon, A. P., "Development of the Mammalian Kidney", Curr Top Dev Biol 2016, pp. 31-64, 117.
McMillan, E. A. et al., "Chemistry-First Approach for Nomination of Personalized Treatment in Lung Cancer", Cell, May 3, 2018, pp. 864-878, 173.
Messaoudi, S., et al., "Endothelial Gata5 transcription factor regulates blood pressure", Nature Communications, Accepted Oct. 8, 2015, Published Nov. 30, 2015, 13 pages, 6:8835.
Mitry, R.R., et al., "Human Cell Culture Protocols", 3rd Edition, Human Press Publishing, 2012, 433 pages.
Molema, G., et al., "Vascular heterogeneity in the kidney", Seminars in Nephrology, Mar. 2012, pp. 145-155, vol. 32, No. 2.
Munro, D. A. D., et al., "Cycles of vascular plexus formation within the nephrogenic zone of the developing mouse kidney" Scientific Reports, Accepted May 4, 2017, Published Jun. 12, 2017, 13 pages, 7:3273.
Munro, D. A. D., et al., "Vascularizing the Kidney in the Embryo and Organoid: Questioning Assumptions about Renal Vasculogenesis", J Am Soc Nephrol, 2018, pp. 1593-1595, 29.
Nolan, D. J., et al., "Molecular signatures of tissue-specific microvascular endothelial cell heterogeneity in organ maintenance and regeneration", Developmental Cell, Jul. 29, 2013, pp. 204-219, 26.
Oja, S. S., et al., "Pharmacology of taurine", Proc West Pharmacol Soc, 2007, pp. 8-15, 50.
Park, J., et al., "Single-cell transcriptomics of the mouse kidney reveals potential cellular targets of kidney disease", Science, May 18, 2018, pp. 758-763, 360.
Portis, J. L., et al., "A simplified rapid method for purification of glomeruli", J Clin Pathol 32, Received for publication Sep. 4, 1978, pp. 406-409.

(56) References Cited

OTHER PUBLICATIONS

Rafii, S.,et al., "Angiocrine functions of organ-specific endothelial cells", Nature 529, 2016, pp. 316-325.
Rafii, S., et al., "Transplantation of Endothelial Cells to Mitigate Acute and Chronic Radiation Injury to Vital Organs", Radiation Research, 2016, pp. 196-202, 186.
Rembold, C. M., "Regulation of contraction and relaxation in arterial smooth muscle", Hypertension, accepted in revised form Feb. 19, 1992, pp. 129-137, 20.
Ritchie, M. E., et al. "limma powers differential expression analyses for RNA-sequencing and microarray studies", Nucleic Acids Research 2015, Revised Jan. 4, 2015, Accepted Jan. 6, 2015, Published online Jan. 20, 2015, 13 pages, vol. 43, No. 7, e47.
Robinson, M. D., et al., "edgeR: a Bioconductor package for differential expression analysis of digital gene expression data", Bioinformatics, revised on Oct. 19, 2009, accepted on Oct. 23, 2009, Advance Access publication Nov. 11, 2009, pp. 139-140, vol. 26, No. 1.
Roth, M., et al., "OATPs, OATs and OCTs: the organic anion and cation transporters of the SLCO and SLC22A gene superfamilies", British Journal of Pharmacology 2012, Revised Sep. 1, 2011, Accepted Sep. 23, 2011 pp. 1260-1287, 165.
Ruepp, A., et al., "CORUM: the comprehensive resource of mammalian protein complexe—2009", Nucleic Acids Research, 2010, Published online Nov. 1, 2009, pp. D497-D501, vol. 38.
Satija, R., et al., "Spatial reconstruction of single-cell gene expression data", Nat Biotechnol 2015, pp. 495-502, 33(5).
Schonthaler, H. B., et al., "Targeting inflammation by modulating the Jun/AP-1 pathway", Ann Rheum Dis 2011, Accepted Aug. 20, 2010, pp. i109-i112, 70 (Suppl 1).

* cited by examiner

J

C

C

D

SEQUENCE LISTING

```
<160> NUMBER OF SEQ ID NOS: 49

<210> SEQ ID NO 1
<211> LENGTH: 723
<212> TYPE: PRT
<213> ORGANISM: Homo sapiens

<400> SEQUENCE: 1

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
```

-continued

```
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Ile Leu Asn Ser
    210                 215                 220

Met His Lys Tyr Gln Pro Arg Phe His Ile Val Arg Ala Asn Asp Ile
225                 230                 235                 240

Leu Lys Leu Pro Tyr Ser Thr Phe Arg Thr Tyr Leu Phe Pro Glu Thr
                245                 250                 255

Glu Phe Ile Ala Val Thr Ala Tyr Gln Asn Asp Lys Ile Thr Gln Leu
            260                 265                 270

Lys Ile Asp Asn Asn Pro Phe Ala Lys Gly Phe Arg Asp Thr Gly Asn
        275                 280                 285

Gly Arg Arg Glu Lys Arg Lys Gln Leu Thr Leu Gln Ser Met Arg Val
    290                 295                 300

Phe Asp Glu Arg His Lys Lys Glu Asn Gly Thr Ser Asp Glu Ser Ser
305                 310                 315                 320

Ser Glu Gln Ala Ala Phe Asn Cys Phe Ala Gln Ala Ser Ser Pro Ala
                325                 330                 335

Ala Ser Thr Val Gly Thr Ser Asn Leu Lys Asp Leu Cys Pro Ser Glu
            340                 345                 350

Gly Glu Ser Asp Ala Glu Ala Glu Ser Lys Glu Glu His Gly Pro Glu
        355                 360                 365

Ala Cys Asp Ala Ala Lys Ile Ser Thr Thr Thr Ser Glu Glu Pro Cys
    370                 375                 380

Arg Asp Lys Gly Ser Pro Ala Val Lys Ala His Leu Phe Ala Ala Glu
385                 390                 395                 400

Arg Pro Arg Asp Ser Gly Arg Leu Asp Lys Ala Ser Pro Asp Ser Arg
                405                 410                 415

His Ser Pro Ala Thr Ile Ser Ser Ser Thr Arg Gly Leu Gly Ala Glu
            420                 425                 430

Glu Arg Arg Ser Pro Val Arg Glu Gly Thr Ala Pro Ala Lys Val Glu
        435                 440                 445

Glu Ala Arg Ala Leu Pro Gly Lys Glu Ala Phe Ala Pro Leu Thr Val
    450                 455                 460

Gln Thr Asp Ala Ala Ala Ala His Leu Ala Gln Gly Pro Leu Pro Gly
465                 470                 475                 480

Leu Gly Phe Ala Pro Gly Leu Ala Gly Gln Gln Phe Phe Asn Gly His
                485                 490                 495

Pro Leu Phe Leu His Pro Ser Gln Phe Ala Met Gly Gly Ala Phe Ser
            500                 505                 510

Ser Met Ala Ala Ala Gly Met Gly Pro Leu Leu Ala Thr Val Ser Gly
        515                 520                 525

Ala Ser Thr Gly Val Ser Gly Leu Asp Ser Thr Ala Met Ala Ser Ala
    530                 535                 540

Ala Ala Ala Gln Gly Leu Ser Gly Ala Ser Ala Ala Thr Leu Pro Phe
545                 550                 555                 560

His Leu Gln Gln His Val Leu Ala Ser Gln Gly Leu Ala Met Ser Pro
                565                 570                 575

Phe Gly Ser Leu Phe Pro Tyr Pro Tyr Thr Tyr Met Ala Ala Ala Ala
            580                 585                 590
```

```
Ala Ala Ser Ser Ala Ala Ala Ser Ser Ser Val His Arg His Pro Phe
        595                 600                 605

Leu Asn Leu Asn Thr Met Arg Pro Arg Leu Arg Tyr Ser Pro Tyr Ser
    610                 615                 620

Ile Pro Val Pro Val Pro Asp Gly Ser Ser Leu Leu Thr Thr Ala Leu
625                 630                 635                 640

Pro Ser Met Ala Ala Ala Ala Gly Pro Leu Asp Gly Lys Val Ala Ala
                645                 650                 655

Leu Ala Ala Ser Pro Ala Ser Val Ala Val Asp Ser Gly Ser Glu Leu
            660                 665                 670

Asn Ser Arg Ser Ser Thr Leu Ser Ser Ser Ser Met Ser Leu Ser Pro
        675                 680                 685

Lys Leu Cys Ala Glu Lys Glu Ala Ala Thr Ser Glu Leu Gln Ser Ile
    690                 695                 700

Gln Arg Leu Val Ser Gly Leu Glu Ala Lys Pro Asp Arg Ser Arg Ser
705                 710                 715                 720

Ala Ser Pro


<210> SEQ ID NO 2
<211> LENGTH: 743
<212> TYPE: PRT
<213> ORGANISM: Homo sapiens

<400> SEQUENCE: 2

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240
```

```
Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Glu Arg His Lys Lys Glu Asn Gly Thr Ser
                325                 330                 335

Asp Glu Ser Ser Ser Glu Gln Ala Ala Phe Asn Cys Phe Ala Gln Ala
            340                 345                 350

Ser Ser Pro Ala Ala Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Cys Arg Asp Lys Gly Ser Pro Ala Val Lys Ala His Leu
                405                 410                 415

Phe Ala Ala Glu Arg Pro Arg Asp Ser Gly Arg Leu Asp Lys Ala Ser
            420                 425                 430

Pro Asp Ser Arg His Ser Pro Ala Thr Ile Ser Ser Ser Thr Arg Gly
        435                 440                 445

Leu Gly Ala Glu Glu Arg Arg Ser Pro Val Arg Glu Gly Thr Ala Pro
    450                 455                 460

Ala Lys Val Glu Glu Ala Arg Ala Leu Pro Gly Lys Glu Ala Phe Ala
465                 470                 475                 480

Pro Leu Thr Val Gln Thr Asp Ala Ala Ala Ala His Leu Ala Gln Gly
                485                 490                 495

Pro Leu Pro Gly Leu Gly Phe Ala Pro Gly Leu Ala Gly Gln Gln Phe
            500                 505                 510

Phe Asn Gly His Pro Leu Phe Leu His Pro Ser Gln Phe Ala Met Gly
        515                 520                 525

Gly Ala Phe Ser Ser Met Ala Ala Ala Gly Met Gly Pro Leu Leu Ala
    530                 535                 540

Thr Val Ser Gly Ala Ser Thr Gly Val Ser Gly Leu Asp Ser Thr Ala
545                 550                 555                 560

Met Ala Ser Ala Ala Ala Ala Gln Gly Leu Ser Gly Ala Ser Ala Ala
                565                 570                 575

Thr Leu Pro Phe His Leu Gln Gln His Val Leu Ala Ser Gln Gly Leu
            580                 585                 590

Ala Met Ser Pro Phe Gly Ser Leu Phe Pro Tyr Pro Tyr Thr Tyr Met
        595                 600                 605

Ala Ala Ala Ala Ala Ala Ser Ser Ala Ala Ala Ser Ser Ser Val His
    610                 615                 620

Arg His Pro Phe Leu Asn Leu Asn Thr Met Arg Pro Arg Leu Arg Tyr
625                 630                 635                 640

Ser Pro Tyr Ser Ile Pro Val Pro Val Pro Asp Gly Ser Ser Leu Leu
                645                 650                 655
```

```
Thr Thr Ala Leu Pro Ser Met Ala Ala Ala Ala Gly Pro Leu Asp Gly
            660                 665                 670

Lys Val Ala Ala Leu Ala Ala Ser Pro Ala Ser Val Ala Val Asp Ser
        675                 680                 685

Gly Ser Glu Leu Asn Ser Arg Ser Ser Thr Leu Ser Ser Ser Ser Met
    690                 695                 700

Ser Leu Ser Pro Lys Leu Cys Ala Glu Lys Glu Ala Ala Thr Ser Glu
705                 710                 715                 720

Leu Gln Ser Ile Gln Arg Leu Val Ser Gly Leu Glu Ala Lys Pro Asp
                725                 730                 735

Arg Ser Arg Ser Ala Ser Pro
            740


<210> SEQ ID NO 3
<211> LENGTH: 741
<212> TYPE: PRT
<213> ORGANISM: Mus musculus

<400> SEQUENCE: 3

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Asp Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285
```

-continued

Ile Thr Gln Leu Lys Ile Asp Asn Asn Pro Phe Ala Lys Gly Phe Arg
290 295 300

Asp Thr Gly Asn Gly Arg Arg Glu Lys Arg Lys Gln Leu Thr Leu Gln
305 310 315 320

Ser Met Arg Val Phe Glu Glu Arg His Lys Lys Glu Thr Ser Asp Glu
325 330 335

Ser Ser Ser Glu Gln Ala Ala Phe Asn Cys Phe Ala Gln Ala Ser Ser
340 345 350

Pro Ala Val Ser Ile Val Gly Thr Ser Asn Leu Lys Asp Leu Cys Pro
355 360 365

Ser Glu Ala Glu Ser Asp Ala Glu Ala Glu Ser Lys Glu Glu His Gly
370 375 380

Pro Glu Ala Cys Asp Ala Ala Lys Ile Ser Thr Thr Thr Ala Glu Glu
385 390 395 400

Pro Gly Arg Asp Lys Gly Ser Pro Ala Thr Arg Ala Gln Leu Phe Pro
405 410 415

Ala Glu Pro Ser Arg Ala Arg Asp Thr Ala Arg Leu Asp Lys Ala Ser
420 425 430

Pro Asp Ser Arg His Ser Pro Ala Thr Ile Ser Ser Ser Thr Arg Val
435 440 445

Pro Gly Ala Asp Glu Arg Arg Ser Pro Gly Arg Glu Gly Pro Val Ala
450 455 460

Thr Lys Val Asp Glu Ala Arg Ala Ile Pro Ala Lys Asp Ala Phe Ala
465 470 475 480

Pro Leu Ser Val Gln Thr Asp Ala Thr Ala His Leu Ala Gln Gly Pro
485 490 495

Leu Pro Gly Leu Gly Phe Ala Pro Gly Leu Ala Gly Gln Gln Phe Phe
500 505 510

Asn Gly His Pro Leu Phe Leu His Pro Gly Gln Phe Ala Met Gly Gly
515 520 525

Ala Phe Ser Ser Met Ala Ala Gly Met Gly Pro Leu Leu Ala Thr Val
530 535 540

Ser Gly Ala Ser Thr Gly Val Ser Gly Leu Glu Ser Thr Ala Met Ala
545 550 555 560

Ser Ala Ala Ala Ala Gln Gly Leu Ser Gly Ala Ser Ala Ala Thr Leu
565 570 575

Pro Phe His Leu Gln Gln His Val Leu Ala Ser Gln Gly Leu Ala Met
580 585 590

Ser Pro Phe Gly Ser Leu Phe Pro Tyr Pro Tyr Thr Tyr Met Ala Ala
595 600 605

Ala Ala Ala Ala Ser Thr Ala Ala Ala Ser Ser Ser Val His Arg His
610 615 620

Pro Phe Leu Asn Leu Asn Ser Met Arg Pro Arg Leu Arg Tyr Ser Pro
625 630 635 640

Tyr Ser Ile Pro Val Pro Val Pro Asp Ser Ser Ser Leu Leu Ala Thr
645 650 655

Ala Leu Pro Ser Met Ala Ser Ala Ala Gly Pro Leu Asp Gly Lys Ala
660 665 670

Ala Ala Leu Ala Ala Ser Pro Ala Ser Val Ala Val Asp Ser Gly Ser
675 680 685

Glu Leu Asn Ser Arg Ser Ser Thr Leu Ser Ser Gly Ser Val Ser Leu
690 695 700

```
Ser Pro Lys Leu Cys Ser Glu Lys Glu Ala Ala Thr Ser Glu Leu Gln
705                 710                 715                 720

Ser Ile Gln Arg Leu Val Ser Gly Leu Glu Ala Lys Pro Asp Arg Ser
                725                 730                 735

Cys Ser Gly Ser Pro
            740


<210> SEQ ID NO 4
<211> LENGTH: 743
<212> TYPE: PRT
<213> ORGANISM: Rattus norvegicus

<400> SEQUENCE: 4

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Asp Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Glu Arg His Lys Lys Glu Thr Gly Thr Ser
                325                 330                 335
```

-continued

```
Asp Glu Ser Ser Ser Glu Gln Ala Ala Phe Asn Cys Phe Ala Gln Ala
            340                 345                 350

Ser Ser Pro Ala Val Ser Thr Val Gly Thr Ser Asn Leu Lys Asp Leu
        355                 360                 365

Cys Pro Ser Glu Ala Glu Ser Asp Ala Glu Ala Glu Ser Lys Glu Glu
    370                 375                 380

His Gly Pro Glu Ala Cys Asp Thr Ala Lys Ile Ser Thr Thr Thr Ala
385                 390                 395                 400

Glu Glu Pro Gly Arg Asp Lys Gly Ser Pro Ala Thr Arg Ala Gln Leu
                405                 410                 415

Phe Pro Ala Glu Pro Ser Arg Ala Arg Asp Thr Ala Arg Leu Asp Lys
            420                 425                 430

Ala Ser Pro Asp Ser Arg His Ser Pro Ala Thr Ile Ser Ser Ser Thr
        435                 440                 445

Arg Val Pro Gly Ala Asp Glu His Arg Ser Pro Gly Arg Glu Gly Pro
    450                 455                 460

Val Ser Ala Lys Val Asp Glu Ala Arg Ala Leu Pro Ala Lys Asp Ala
465                 470                 475                 480

Phe Ala Pro Leu Ser Val Gln Thr Asp Ala Thr Ala His Leu Thr Gln
                485                 490                 495

Gly Pro Leu Pro Gly Leu Gly Phe Ala Pro Gly Leu Ala Gly Gln Gln
            500                 505                 510

Phe Phe Asn Gly His Pro Leu Phe Leu His Pro Gly Gln Phe Ala Met
        515                 520                 525

Gly Gly Ala Phe Ser Ser Met Ala Ala Gly Met Gly Pro Leu Leu Ala
    530                 535                 540

Thr Val Ser Gly Ala Ser Thr Gly Val Ser Gly Leu Asp Ser Thr Ala
545                 550                 555                 560

Met Ala Ser Ala Ala Ala Ala Gln Gly Leu Ser Gly Ala Ser Ala Ala
                565                 570                 575

Thr Leu Pro Phe His Leu Gln Gln His Val Leu Ala Ser Gln Gly Leu
            580                 585                 590

Ala Met Ser Pro Phe Gly Ser Leu Phe Pro Tyr Pro Tyr Thr Tyr Met
        595                 600                 605

Ala Ala Ala Ala Ala Ala Ser Ser Ala Ala Ala Ser Ser Ser Val His
    610                 615                 620

Arg His Pro Phe Leu Asn Leu Asn Ser Met Arg Pro Arg Leu Arg Tyr
625                 630                 635                 640

Ser Pro Tyr Ser Ile Pro Val Pro Val Pro Asp Ser Ser Ser Leu Leu
                645                 650                 655

Ala Thr Ala Leu Pro Ser Met Ala Ser Ala Ala Gly Pro Leu Asp Gly
            660                 665                 670

Lys Ser Ala Val Leu Ala Ala Ser Pro Ala Ser Val Ala Val Asp Ser
        675                 680                 685

Gly Ser Glu Leu Asn Ser Arg Ser Ser Thr Leu Ser Ser Gly Ser Val
    690                 695                 700

Ser Leu Ser Pro Lys Leu Cys Ser Glu Lys Glu Ala Ala Thr Ser Glu
705                 710                 715                 720

Leu Gln Ser Ile Gln Arg Leu Val Ser Gly Leu Glu Ala Lys Pro Asp
                725                 730                 735

Arg Ser Cys Ser Gly Ser Pro
            740
```

<210> SEQ ID NO 5
<211> LENGTH: 732
<212> TYPE: PRT
<213> ORGANISM: Gallus gallus

<400> SEQUENCE: 5

```
Met Asn Ile Pro Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Ala Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Ala Ile Pro Phe Ser Ser
65                  70                  75                  80

Leu Gly His Gln Ala Ala Ala His Leu Arg Pro Leu Lys Thr Leu Glu
                85                  90                  95

Pro Glu Glu Glu Val Glu Asp Asp Pro Lys Val His Leu Glu Ala Lys
            100                 105                 110

Glu Leu Trp Glu Gln Phe His Lys Arg Gly Thr Glu Met Val Ile Thr
        115                 120                 125

Lys Ser Gly Arg Arg Met Phe Pro Pro Phe Lys Val Arg Cys Thr Gly
    130                 135                 140

Leu Asp Lys Lys Ala Lys Tyr Ile Leu Leu Met Asp Ile Val Ala Ala
145                 150                 155                 160

Asp Asp Cys Arg Tyr Lys Phe His Asn Ser Arg Trp Met Val Ala Gly
                165                 170                 175

Lys Ala Asp Pro Glu Met Pro Lys Arg Met Tyr Ile His Pro Asp Ser
            180                 185                 190

Pro Ala Thr Gly Glu Gln Trp Met Ser Lys Val Val Thr Phe His Lys
        195                 200                 205

Leu Lys Leu Thr Asn Asn Ile Ser Asp Lys His Gly Phe Thr Ile Leu
    210                 215                 220

Asn Ser Met His Lys Tyr Gln Pro Arg Phe His Ile Val Arg Ala Asn
225                 230                 235                 240

Asp Ile Leu Lys Leu Pro Tyr Ser Thr Phe Arg Thr Tyr Val Phe Pro
                245                 250                 255

Glu Thr Glu Phe Ile Ala Val Thr Ala Tyr Gln Asn Asp Lys Ile Thr
            260                 265                 270

Gln Leu Lys Ile Asp Asn Asn Pro Phe Ala Lys Gly Phe Arg Asp Thr
        275                 280                 285

Gly Asn Gly Arg Arg Glu Lys Arg Lys Gln Leu Thr Leu Gln Ser Met
    290                 295                 300

Arg Val Tyr Asp Glu Arg Gln Lys Lys Glu Asn Pro Thr Ser Asp Glu
305                 310                 315                 320

Ser Ser Asn Glu Gln Thr Ala Phe Lys Cys Phe Ala Gln Ser Ser Cys
                325                 330                 335

Pro Ala Val Pro Ala Val Gly Thr Ser Ser Leu Lys Asp Leu Cys Pro
            340                 345                 350

Ser Glu Gly Asp Ser Asp Ala Asp Ser Lys Asp Asp Pro Leu Leu Glu
        355                 360                 365

Ala Ser Glu Ser Gly Lys Ile Ser Thr Thr Thr Ala Thr Thr Pro Ala
    370                 375                 380
```

```
Pro Ala Ser Ser Gly Ala Ala Ala Ser Asp Asp Pro Arg Asp Lys Gly
385                 390                 395                 400

Gly Ser Pro Ser Lys Ser His Phe Phe Pro Ser Asp Ser Ala Thr Ser
                405                 410                 415

Arg Ser Arg Glu Arg Thr Glu Lys Ala Pro Pro Asp Ser Arg His Ser
            420                 425                 430

Pro Ala Thr Ile Ser Ser Ser Ser Arg Gly Gly Gly Leu Ser Gly Glu
        435                 440                 445

Glu Leu Lys Ser Pro Leu Arg Asp Gly Pro Lys Val Asp Glu Asn Arg
    450                 455                 460

Leu Leu Gly Lys Glu Pro Phe Ala Pro Leu Thr Val Gln Thr Asp Ser
465                 470                 475                 480

Thr Ala His Leu Ser Gln Gly His Leu Gln Asn Leu Gly Phe Pro Pro
                485                 490                 495

Ala Leu Ala Gly Gln Gln Phe Phe Asn Pro Leu Gly Ser Gly His Pro
            500                 505                 510

Leu Leu Leu His Pro Gly Gln Phe Ala Met Gly Gly Ala Phe Ser Gly
        515                 520                 525

Met Ala Ala Gly Met Gly Pro Leu Leu Ala Thr Val Ser Gly Ala Ser
    530                 535                 540

Ala Gly Gly Ser Gly Leu Asp Ser Thr Val Met Ala Thr Ala Ala Ala
545                 550                 555                 560

Gln Gly Leu Ser Gly Ala Ser Thr Ala Ala Leu Pro Phe His Leu Gln
                565                 570                 575

Gln His Val Leu Ala Ser Gln Gly Leu Ala Met Ser Pro Phe Gly Ser
            580                 585                 590

Leu Phe Pro Tyr Pro Tyr Thr Tyr Met Ala Ala Ala Ala Ala Ala Ser
        595                 600                 605

Ser Ala Ala Ser Asn Ser Val His Arg His Pro Phe Leu Asn Ala Val
    610                 615                 620

Arg Pro Arg Leu Arg Tyr Ser Pro Tyr Pro Leu Pro Val Pro Leu Pro
625                 630                 635                 640

Asp Gly Ser Ser Leu Leu Thr Thr Ala Met Pro Gly Ala Leu Ala Ala
                645                 650                 655

Thr Ser Gly Glu Thr Lys Gly Ser Ala Leu Ala Ser Ser Pro Gly Ala
            660                 665                 670

Val Pro Leu Asp Ser Ala Ser Asp Leu Thr Ser Arg Ser Ser Thr Leu
        675                 680                 685

Ser Ser Gly Ser Val Ser Leu Ser Pro Lys Leu Gly Ala Asp Lys Glu
    690                 695                 700

Ala Ala Thr Ser Glu Leu Gln Asn Ile Gln Arg Leu Val Ser Gly Leu
705                 710                 715                 720

Asp Pro Lys Gln Asp Arg Ser Arg Ser Gly Ser Pro
                725                 730


<210> SEQ ID NO 6
<211> LENGTH: 724
<212> TYPE: PRT
<213> ORGANISM: Canis lupus familiaris

<400> SEQUENCE: 6

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
```

```
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Lys Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Asp Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Ser Arg Asp Lys Gly Ser Pro Ala Leu Lys Ala His Leu
                405                 410                 415

Phe Ala Ala Glu Pro Gly Gly Arg Pro Arg Asp Gly Gly Arg Pro Asp
            420                 425                 430

Lys Ala Ser Pro Asp Ser Arg His Ser Pro Ala Thr Ile Ser Ser Ser
        435                 440                 445
```

```
Thr Arg Gly Leu Gly Ala Asp Glu Arg Arg Ser Pro Gly Arg Glu Gly
    450                 455                 460

Ala Ala Pro Ser Lys Ala Glu Glu Ala Arg Ala Leu Pro Gly Lys Glu
465                 470                 475                 480

Ala Phe Ala Pro Leu Thr Val Gln Thr Asp Ala Ala Ala Ala His Leu
                485                 490                 495

Gly Gln Gly Pro Leu Pro Gly Leu Gly Phe Ala Pro Gly Leu Ala Gly
            500                 505                 510

Gln Gln Phe Phe Asn Gly His Pro Leu Phe Leu His Pro Gly Gln Phe
        515                 520                 525

Ala Met Gly Gly Ala Phe Ser Gly Met Ala Ala Gly Met Gly Pro Leu
    530                 535                 540

Leu Ala Thr Val Ser Gly Ala Ser Thr Gly Val Ser Gly Leu Asp Ser
545                 550                 555                 560

Thr Ala Met Ala Ser Ala Ala Ala Ala Gln Gly Leu Ser Gly Ala Ser
                565                 570                 575

Ala Ala Thr Leu Pro Phe His Leu Gln Gln His Val Leu Ala Ser Gln
            580                 585                 590

Val Arg Arg Gly Pro Cys Leu Pro Trp Gly Arg Arg Pro Ser Pro Gly
        595                 600                 605

Ser Ser Ala Tyr Pro Phe Met Arg Pro Arg Leu Arg Tyr Ser Pro Tyr
    610                 615                 620

Ser Ile Phe Met Pro Val Pro Asp Gly Ser Ser Leu Leu Thr Thr Ala
625                 630                 635                 640

Leu Pro Ala Met Ala Ala Ala Ala Gly Pro Leu Asp Ala Lys Ala Ala
                645                 650                 655

Ala Leu Ala Ala Ser Pro Ala Ser Val Ala Val Asp Ser Gly Ser Glu
            660                 665                 670

Leu Asn Ser Arg Ser Ser Thr Leu Ser Ser Ser Ser Val Ser Leu Ser
        675                 680                 685

Pro Lys Leu Cys Pro Glu Lys Glu Ala Ala Thr Ser Glu Leu Gln Ser
    690                 695                 700

Ile Gln Arg Leu Val Ser Gly Leu Glu Ala Lys Pro Asp Arg Ser Arg
705                 710                 715                 720

Ser Gly Ser Pro


<210> SEQ ID NO 7
<211> LENGTH: 689
<212> TYPE: PRT
<213> ORGANISM: Danio rerio

<400> SEQUENCE: 7

Met Arg Asp Pro Val Ile Gln Gly Ser Ser Met Ala Tyr His Pro Phe
1               5                   10                  15

Leu Pro His Arg Gly Pro Glu Phe Ala Met Ser Ala Met Leu Gly His
            20                  25                  30

Gln Pro Pro Phe Phe Pro Ala Leu Ala Leu Pro Pro Asn Gly Ser Leu
        35                  40                  45

Ser Leu Pro Gly Ala Leu Gly Lys Pro Ile Met Glu Gln Leu Met Gly
    50                  55                  60

Ala Ala Glu Thr Gly Leu His Phe Ser Ser Leu Gly His Gln Ala Ala
65                  70                  75                  80

His Leu Arg Pro Leu Lys Thr Leu Glu Pro Glu Glu Glu Val Glu Asp
                85                  90                  95
```

```
Asp Pro Lys Val His Leu Glu Ala Lys Glu Leu Trp Glu Leu Phe His
            100                 105                 110

Lys Arg Gly Thr Glu Met Val Ile Thr Lys Ser Gly Arg Arg Met Phe
        115                 120                 125

Pro Pro Phe Lys Val Arg Cys Thr Gly Leu Asp Lys Lys Ala Lys Tyr
    130                 135                 140

Ile Leu Leu Met Asp Ile Val Ala Ala Asp Asp Cys Arg Tyr Lys Phe
145                 150                 155                 160

His Asn Ser Arg Trp Met Val Ala Gly Lys Ala Asp Pro Glu Met Pro
                165                 170                 175

Lys Arg Met Tyr Ile His Pro Asp Ser Pro Ala Thr Gly Glu Gln Trp
            180                 185                 190

Met Ser Lys Val Val Asn Phe His Lys Leu Lys Leu Thr Asn Asn Ile
        195                 200                 205

Ser Asp Lys His Gly Phe Thr Ile Leu Asn Ser Met His Lys Tyr Gln
    210                 215                 220

Pro Arg Phe His Ile Val Arg Ala Asn Asp Ile Leu Lys Leu Pro Tyr
225                 230                 235                 240

Ser Thr Phe Arg Thr Tyr Val Phe Pro Glu Thr Asp Phe Ile Ala Val
                245                 250                 255

Thr Ala Tyr Gln Asn Asp Lys Ile Thr Gln Leu Lys Ile Asp His Asn
            260                 265                 270

Pro Phe Ala Lys Gly Phe Arg Asp Thr Gly Asn Gly Arg Arg Glu Lys
        275                 280                 285

Arg Lys Gln Leu Ala Leu Gln Ser Met Arg Ser Tyr Glu Glu Gln Gln
    290                 295                 300

Lys Lys Glu Asn Gly Thr Ser Asp Asp Ser Ser Gly Glu Gln Ala Ser
305                 310                 315                 320

Phe Lys Cys Phe Arg Gln Ala Ser Ser Pro Ala Val Ser Thr Ala Gly
                325                 330                 335

His Asn His Leu Lys Asp Phe Cys Asp Ser Asp Glu Asp Ser Asp Glu
            340                 345                 350

Glu Asp Lys Asp Ala Asn Ala Lys Glu Gly Pro Asp Ser Ser Lys Ile
        355                 360                 365

Ser Thr Thr Thr Glu Asp Ser Lys Asp Gln Asp Ala Gly Leu Gly Lys
    370                 375                 380

Ser Val Phe Gly Glu Ser Asp Ser Ser Ser Gly Arg Arg Ser Glu Lys
385                 390                 395                 400

Thr Arg Ala Asp Ser Arg Ser Pro Ile Thr Leu Ile Ser Ser Thr Thr
                405                 410                 415

Arg Ser Gly Glu Glu Leu Lys Ser Pro Val Arg Glu Pro Ala Lys Thr
            420                 425                 430

Thr Asp Asp Cys Arg Thr Val Ser Lys Glu Asn Tyr Met Pro Leu Thr
        435                 440                 445

Val Gln Thr Asp Gly Ala Ala His Leu Asn Gln Asn His Leu His Asn
    450                 455                 460

Phe Gly Phe Pro Pro Gly Leu Ala Gly Gln Gln Phe Phe Asn His Leu
465                 470                 475                 480

Gly Gly Ala His Pro Phe Leu Leu His Pro Ser Gln Phe Asn Met Gly
                485                 490                 495

Gly Ala Phe Ser Asn Met Ala Ala Gly Met Gly Pro Ile Leu Ala Ala
            500                 505                 510
```

-continued

Val Ser Ser Gly Gly Val Gly Ser Leu Asp Gly Ser Ser Leu Pro Ser
515 520 525

Pro Ser Gln Ser Leu Thr Gly Ala Pro Met Pro Phe His Leu Gln Gln
530 535 540

His Val Leu Ala Ser Gln Gly Leu Ala Met Ser Pro Phe Gly Gly Leu
545 550 555 560

Phe Pro Tyr Pro Tyr Thr Tyr Met Ala Ala Ala Ala Ala Ala Ser Ser
565 570 575

Ala Ala Ser Ser Ser Val His Arg His Pro Phe Leu Ser Ala Val Arg
580 585 590

Pro Arg Leu Arg Tyr Ser Pro Tyr Ser Leu Pro Ser Val Pro Asp Ser
595 600 605

Thr Leu Leu Thr Thr Ala Met Gln Pro Met Ala Ser Ser Gly Leu Glu
610 615 620

Val Lys Gly Asp Gly Met Asn Thr Ser Pro Ala Ser Ala Ala Leu Asp
625 630 635 640

Ser Glu Val Thr Ser Arg Ser Ser Gly Ser Val Ser Leu Ser Pro Lys
645 650 655

Thr Cys Thr Glu Lys Asp Ser Ser Ser Glu Leu Gln Ser Ile Gln Arg
660 665 670

Leu Val Ser Gly Leu Glu Pro Lys Pro Asp Arg Ala Arg Ser Val Ser
675 680 685

Pro

<210> SEQ ID NO 8
<211> LENGTH: 701
<212> TYPE: PRT
<213> ORGANISM: Xenopus tropicalis

<400> SEQUENCE: 8

Met Asn Leu Pro Met Arg Asp Pro Val Ile Ser Gly Ser Ala Met Ala
1 5 10 15

Tyr His Pro Phe Leu Ser His Arg Ala Pro Asp Phe Ala Met Ser Ala
20 25 30

Val Leu Gly His Gln Pro Pro Phe Phe Pro Ala Leu Ala Leu Pro Pro
35 40 45

Asn Gly Ala Ala Leu Ser Leu Pro Gly Ala Leu Ala Lys Pro Ile Met
50 55 60

Asp Gln Leu Val Gly Ala Ala Glu Thr Gly Ile Pro Phe Ser Ser Leu
65 70 75 80

Gly His Gln Ala Ala Ala His Leu Arg Pro Leu Lys Thr Leu Glu Pro
85 90 95

Glu Glu Glu Val Glu Asp Asp Pro Lys Val His Leu Glu Gly Lys Asp
100 105 110

Leu Trp Glu Gln Phe His Lys Arg Gly Thr Glu Met Val Ile Thr Lys
115 120 125

Ser Gly Arg Arg Met Phe Pro Pro Phe Lys Val Arg Cys Ser Gly Leu
130 135 140

Asp Lys Lys Ala Lys Tyr Ile Leu Leu Met Asp Ile Val Ala Ala Asp
145 150 155 160

Asp Cys Arg Tyr Lys Phe His Asn Ser Arg Trp Met Val Ala Gly Lys
165 170 175

Ala Asp Pro Glu Met Pro Lys Arg Met Tyr Ile His Pro Asp Ser Pro
180 185 190

```
Ala Thr Gly Glu Gln Trp Met Ser Lys Val Val Thr Phe His Lys Leu
        195                 200                 205

Lys Leu Thr Asn Asn Ile Ser Asp Lys His Gly Phe Thr Ile Leu Asn
    210                 215                 220

Ser Met His Lys Tyr Gln Pro Arg Phe His Ile Val Arg Ala Asn Asp
225                 230                 235                 240

Ile Leu Lys Leu Pro Tyr Ser Thr Phe Arg Thr Tyr Val Phe Pro Glu
                245                 250                 255

Thr Glu Phe Ile Ala Val Thr Ala Tyr Gln Asn Asp Lys Ile Thr Gln
            260                 265                 270

Leu Lys Ile Asp Asn Asn Pro Phe Ala Lys Gly Phe Arg Asp Thr Gly
        275                 280                 285

Asn Gly Arg Arg Glu Lys Arg Lys Gln Leu Ala Leu Gln Ser Met Arg
    290                 295                 300

Pro Tyr Asp Asp His Gln Lys Lys Asp Asn Gly Ser Ser Asp Glu Ser
305                 310                 315                 320

Ser Ser Glu Gln Thr Ala Tyr Lys Cys Phe Ala Gln Thr Ser Ser Pro
                325                 330                 335

Thr Ala Pro Ala Val Gly Thr Ser Ser Leu Lys Gly Val Pro Pro Ser
            340                 345                 350

Asp Gly Glu Ser Asp Glu Glu Ser Arg Asp Glu Gly Gly Pro Asp Thr
        355                 360                 365

Gly Glu Ser Thr Lys Ile Ser Thr Thr Thr Ser Glu Asp Cys Arg Glu
    370                 375                 380

Leu Ala Ser Pro Pro Arg Ala Pro His Ser Asp Leu Gly Ser Arg Ser
385                 390                 395                 400

Arg Glu Gln Ser Ser Arg Thr Gly Lys Ser Ser Pro Asp Ser Arg His
                405                 410                 415

Ser Pro Gly His Ile Ser Ser Ser Ser Ser Gly Arg Ile Leu Ser Ile
            420                 425                 430

Glu Glu Leu Lys Ser Pro Ala Arg Asp Ser His Lys Ala Glu Glu Ser
        435                 440                 445

Gln Arg Ser Lys Glu Ala Phe Pro Pro Leu Thr Val Gln Thr Asp Ser
    450                 455                 460

Ser Ala His Leu Leu Ser Gln Gly His Leu Gln Asn Leu Gly Phe Pro
465                 470                 475                 480

Pro Gly Leu Thr Gly Gln Gln Phe Phe Asn Pro Leu Gly Ala Ser His
                485                 490                 495

Pro Leu Leu Phe His Pro Ser His Phe Ala Met Gly Gly Ala Phe Ser
            500                 505                 510

Ser Met Ala Ala Gly Met Asn Pro Leu Leu Ala Ser Val Ser Gly Ala
        515                 520                 525

Ser Ser Gly Val Asn Ser Ile Asp Ser Thr Val Met Ala Ser Ser Ser
    530                 535                 540

Gln Gly Leu Ala Gly Ser Ser Ala Leu Pro Phe His Leu Gln Gln Gln
545                 550                 555                 560

Val Leu Ala Ser Gln Gly Leu Ala Met Ser Pro Phe Gly Gly Leu Phe
                565                 570                 575

Ser Tyr Pro Tyr Thr Tyr Met Ala Ala Ala Ala Ala Ala Ser Ser Ala
            580                 585                 590

Val His Arg His Pro Phe Leu Asn Ala Val Arg Pro Arg Leu Arg Tyr
        595                 600                 605

Ser Pro Tyr Ser Phe Pro Met Pro Phe Ala Glu Gly Ser Ser Leu Leu
```

```
    610                 615                 620

Thr Thr Ala Leu His Ser Leu Asp Gly Lys Ala Ser Leu Leu Ser Ser
625                 630                 635                 640

Pro Ala Ala Thr Ala Leu Asp Thr Glu Leu Ser Ser Arg Thr Pro Thr
                645                 650                 655

Leu Ser Ser Gly Ser Val Ser Leu Ser Pro Lys Leu Cys Pro Glu Lys
            660                 665                 670

Glu Ala Ser Ser Glu Leu Gln Asn Ile Gln Arg Leu Val Ser Gly Leu
        675                 680                 685

Asp Ser Lys Gln Glu Arg Ser Arg Ser Gly Ser Pro Asp
    690                 695                 700


<210> SEQ ID NO 9
<211> LENGTH: 743
<212> TYPE: PRT
<213> ORGANISM: Macaca mulatta

<400> SEQUENCE: 9

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285
```

-continued

```
Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Glu Arg His Lys Lys Glu Asn Gly Thr Ser
                325                 330                 335

Asp Glu Ser Ser Ser Glu Gln Ala Ala Phe Asn Cys Phe Ala Gln Ala
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Cys Arg Asp Lys Gly Ser Pro Ala Val Lys Ala His Leu
                405                 410                 415

Phe Ala Ala Glu Arg Pro Arg Asp Ser Gly Arg Leu Asp Lys Ala Ser
            420                 425                 430

Pro Asp Ser Arg His Ser Pro Ala Thr Ile Ser Ser Ser Thr Arg Gly
        435                 440                 445

Leu Gly Ala Glu Glu Arg Arg Ser Pro Gly Arg Glu Gly Ala Ala Pro
    450                 455                 460

Ala Lys Val Glu Glu Ala Arg Ala Leu Pro Gly Lys Glu Ala Phe Ala
465                 470                 475                 480

Pro Leu Thr Val Gln Ser Asp Ala Ala Ala Ala His Leu Ala Gln Gly
                485                 490                 495

Pro Leu Pro Gly Leu Gly Phe Ala Pro Gly Leu Ala Gly Gln Gln Phe
            500                 505                 510

Phe Asn Gly His Pro Leu Phe Leu His Pro Ser Gln Phe Ala Met Gly
        515                 520                 525

Gly Ala Phe Ser Ser Met Ala Ala Ala Gly Met Gly Pro Leu Leu Ala
    530                 535                 540

Thr Val Ser Gly Ala Ser Thr Gly Val Ser Gly Leu Asp Ser Thr Ala
545                 550                 555                 560

Met Ala Ser Ala Ala Ala Ala Gln Gly Leu Ser Gly Ala Ser Ala Ala
                565                 570                 575

Thr Leu Pro Phe His Leu Gln Gln His Val Leu Ala Ser Gln Gly Leu
            580                 585                 590

Ala Met Ser Pro Phe Gly Ser Leu Phe Pro Tyr Pro Tyr Thr Tyr Met
        595                 600                 605

Ala Ala Ala Ala Ala Ala Ser Ser Ala Ala Ala Ser Ser Ser Val His
    610                 615                 620

Arg His Pro Phe Leu Asn Leu Asn Thr Met Arg Pro Arg Leu Arg Tyr
625                 630                 635                 640

Ser Pro Tyr Ser Ile Pro Val Pro Val Pro Asp Gly Ser Ser Leu Leu
                645                 650                 655

Thr Thr Ala Leu Pro Ser Met Ala Ala Ala Ala Gly Pro Leu Asp Gly
            660                 665                 670

Lys Val Ala Ala Leu Ala Ala Ser Pro Ala Ser Val Ala Val Asp Ser
        675                 680                 685

Gly Ser Glu Leu Asn Ser Arg Ser Ser Thr Leu Ser Ser Ser Ser Val
    690                 695                 700

Ser Leu Ser Pro Lys Leu Cys Ala Glu Lys Glu Ala Ala Thr Ser Glu
```

```
705                 710                 715                 720

Leu Gln Ser Ile Gln Arg Leu Val Ser Gly Leu Glu Ala Lys Pro Asp
                725                 730                 735

Arg Ser Arg Ser Ala Ser Pro
            740


<210> SEQ ID NO 10
<211> LENGTH: 743
<212> TYPE: PRT
<213> ORGANISM: Pan troglodytes

<400> SEQUENCE: 10

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Glu Arg His Lys Lys Glu Asn Gly Thr Ser
                325                 330                 335
```

```
Asp Glu Ser Ser Ser Glu Gln Ala Ala Phe Asn Cys Phe Ala Gln Ala
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Cys Arg Asp Lys Gly Ser Pro Ala Val Lys Ala His Leu
                405                 410                 415

Phe Ala Ala Glu Arg Pro Arg Asp Ser Gly Arg Leu Asp Lys Ala Ser
            420                 425                 430

Pro Asp Ser Arg His Ser Pro Ala Thr Ile Ser Ser Ser Thr Arg Gly
        435                 440                 445

Leu Gly Ala Glu Glu Arg Arg Ser Pro Val Arg Glu Gly Thr Ala Pro
    450                 455                 460

Ala Lys Val Glu Glu Ala Arg Ala Leu Pro Gly Lys Glu Ala Phe Ala
465                 470                 475                 480

Pro Leu Thr Val Gln Thr Asp Ala Ala Ala Ala His Leu Ala Gln Gly
                485                 490                 495

Pro Leu Pro Gly Leu Gly Phe Ala Pro Gly Leu Ala Gly Gln Gln Phe
            500                 505                 510

Phe Asn Gly His Pro Leu Phe Leu His Pro Ser Gln Phe Ala Met Gly
        515                 520                 525

Gly Ala Phe Ser Ser Met Ala Ala Ala Gly Met Gly Pro Leu Leu Ala
    530                 535                 540

Thr Val Ser Gly Ala Ser Thr Gly Val Ser Gly Leu Asp Ser Thr Ala
545                 550                 555                 560

Met Ala Ser Ala Ala Ala Ala Gln Gly Leu Ser Gly Ala Ser Ala Ala
                565                 570                 575

Thr Leu Pro Phe His Leu Gln Gln His Val Leu Ala Ser Gln Gly Leu
            580                 585                 590

Ala Met Ser Pro Phe Gly Ser Leu Phe Pro Tyr Pro Tyr Thr Tyr Met
        595                 600                 605

Ala Ala Ala Ala Ala Ala Ser Ser Ala Ala Ala Ser Ser Ser Val His
    610                 615                 620

Arg His Pro Phe Leu Asn Leu Asn Thr Met Arg Pro Arg Leu Arg Tyr
625                 630                 635                 640

Ser Pro Tyr Ser Ile Pro Val Pro Val Pro Asp Gly Ser Ser Leu Leu
                645                 650                 655

Thr Thr Ala Leu Pro Ser Met Ala Ala Ala Ala Gly Pro Leu Asp Gly
            660                 665                 670

Lys Val Ala Ala Leu Ala Ala Ser Pro Ala Ser Val Ala Val Asp Ser
        675                 680                 685

Gly Ser Glu Leu Asn Ser Arg Ser Ser Thr Leu Ser Ser Ser Ser Val
    690                 695                 700

Ser Leu Ser Pro Lys Leu Cys Ala Glu Lys Glu Ala Ala Thr Ser Glu
705                 710                 715                 720

Leu Gln Ser Ile Gln Arg Leu Val Ser Gly Leu Glu Ala Lys Pro Asp
                725                 730                 735

Arg Ser Arg Ser Ala Ser Pro
            740
```

<210> SEQ ID NO 11
<211> LENGTH: 748
<212> TYPE: PRT
<213> ORGANISM: Bos taurus

<400> SEQUENCE: 11

```
Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Thr His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp Gln Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Lys Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Asp Ser Lys Glu Glu
    370                 375                 380
```

His Gly Pro Glu Ala Cys Asp Thr Ala Lys Ile Ser Thr Thr Thr Ser
385 390 395 400

Glu Asp Pro Cys Arg Asp Lys Gly Ser Pro Ala Val Lys Ala His Leu
405 410 415

Phe Ala Ala Glu Pro Gly Gly Arg Ala Arg Asp Ser Gly Arg Leu Asp
420 425 430

Lys Ala Ser Pro Asp Ser Arg His Ser Pro Ala Thr Ile Ser Ser Ser
435 440 445

Thr Arg Gly Leu Gly Ala Glu Glu Arg Arg Ser Pro Gly Arg Asp Ser
450 455 460

Ala Ala Thr Ser Lys Ala Ala Glu Glu Ala Arg Val Leu Pro Gly Lys
465 470 475 480

Glu Ala Phe Ala Pro Leu Thr Val Gln Thr Asp Pro Ala Ala Ala His
485 490 495

Leu Gly Gln Gly Pro Leu Pro Gly Leu Gly Phe Ala Pro Gly Leu Ala
500 505 510

Gly Gln Gln Phe Phe Asn Gly His Pro Leu Phe Leu His Pro Gly Gln
515 520 525

Phe Ala Met Gly Gly Ala Phe Ser Ser Met Ala Ala Gly Met Gly Pro
530 535 540

Leu Leu Ala Thr Val Ser Gly Ala Ser Thr Gly Val Ser Gly Leu Asp
545 550 555 560

Ser Thr Ala Met Ala Ser Ala Ala Ala Ala Gln Gly Leu Ser Gly Ala
565 570 575

Ser Ala Thr Leu Pro Phe His Leu Gln Gln His Val Leu Ala Ser Gln
580 585 590

Gly Leu Ala Met Ser Pro Phe Gly Ser Leu Phe Pro Tyr Pro Tyr Thr
595 600 605

Tyr Met Ala Ala Ala Ala Ala Ala Ser Ser Ala Ala Ala Ser Ser Ser
610 615 620

Val His Arg His Pro Phe Leu Asn Leu Asn Thr Met Arg Pro Arg Leu
625 630 635 640

Arg Tyr Ser Pro Tyr Ser Ile Pro Leu Pro Val Pro Asp Ser Ser Gly
645 650 655

Leu Leu Thr Thr Ala Leu Pro Ser Met Ala Ala Ala Ala Ala Thr Ala
660 665 670

Gly Pro Leu Asp Gly Lys Ala Ala Ala Leu Ala Ala Ser Pro Ala Ser
675 680 685

Val Ala Val Asp Ser Gly Ser Glu Leu Asn Ser Arg Ser Ser Thr Leu
690 695 700

Ser Ser Ser Ser Val Ser Leu Ser Pro Lys Leu Cys Pro Glu Lys Glu
705 710 715 720

Ala Ala Thr Ser Glu Leu Gln Asn Ile Gln Arg Leu Val Ser Gly Leu
725 730 735

Glu Ala Lys Pro Asp Arg Ser Arg Ser Ala Ser Pro
740 745

<210> SEQ ID NO 12
<211> LENGTH: 719
<212> TYPE: PRT
<213> ORGANISM: Oryzias latipes

<400> SEQUENCE: 12

Met Asn Phe Leu Met Arg Asp Pro Val Ile Gln Gly Ser Ser Met Ala
1 5 10 15

```
Tyr His Pro Phe Ile Pro His Arg Gly Pro Glu Phe Ala Met Ser Ala
            20                  25                  30

Met Leu Gly His Gln Pro Pro Phe Phe Pro Ala Leu Ala Leu Pro Pro
        35                  40                  45

Asn Gly Ser Leu Ser Leu Pro Gly Ala Leu Gly Lys Pro Ile Met Asp
    50                  55                  60

Gln Leu Met Gly Ala Ala Glu Thr Gly Leu His Phe Ser Ser Leu Gly
65                  70                  75                  80

His Gln Ala Ala Ala Ala His Leu Arg Pro Met Lys Ser Leu Glu Pro
                85                  90                  95

Glu Glu Glu Val Glu Asp Asp Pro Lys Val His Leu Glu Ala Lys Glu
            100                 105                 110

Leu Trp Glu Leu Phe His Lys Lys Gly Thr Glu Met Val Ile Thr Lys
        115                 120                 125

Ser Gly Arg Arg Met Phe Pro Pro Phe Lys Val Arg Cys Thr Gly Leu
    130                 135                 140

Asp Lys Lys Ala Lys Tyr Ile Leu Leu Met Asp Ile Val Ala Ala Asp
145                 150                 155                 160

Asp Cys Arg Tyr Lys Phe His Asn Ser Arg Trp Met Val Ala Gly Lys
                165                 170                 175

Ala Asp Pro Glu Met Pro Lys Arg Met Tyr Ile His Pro Asp Ser Pro
            180                 185                 190

Ala Thr Gly Glu Gln Trp Met Ser Lys Val Val Asn Phe His Lys Leu
        195                 200                 205

Lys Leu Thr Asn Asn Ile Ser Asp Lys His Gly Phe Val Ser Ser Thr
    210                 215                 220

Asn Thr Ile Leu Asn Ser Met His Lys Tyr Gln Pro Arg Phe His Ile
225                 230                 235                 240

Val Arg Ala Asn Asp Ile Leu Lys Leu Pro Tyr Ser Thr Phe Arg Thr
                245                 250                 255

Tyr Val Phe Pro Glu Thr Asp Phe Ile Ala Val Thr Ala Tyr Gln Asn
            260                 265                 270

Asp Lys Ile Thr Gln Leu Lys Ile Asp His Asn Pro Phe Ala Lys Gly
        275                 280                 285

Phe Arg Asp Thr Gly Asn Gly Arg Arg Glu Lys Arg Lys Gln Leu Ala
    290                 295                 300

Leu Gln Ser Met Arg Ser Tyr Glu Glu Gln Gln Lys Lys Glu Asn Gly
305                 310                 315                 320

Ala Ser Asp Asp Ser Ser Gly Glu Gln Ala Pro Phe Lys Cys Phe Gly
                325                 330                 335

Gln Ala Ser Ser Pro Ala Val Ser Thr Val Pro Pro Pro His Leu Lys
            340                 345                 350

Asp Phe Cys Asp Ser Asp Glu Asp Ser Asp Asp Glu Ser Lys Asp Gly
        355                 360                 365

His Asn Lys Asp Gly Pro Asp Ser Ser Lys Ile Ser Thr Thr Thr Glu
    370                 375                 380

Asp Gly Lys Asp His Glu Ala Ser Pro Met Lys Gln Gly Gly Asn Ala
385                 390                 395                 400

Leu Thr Thr Asp Ser Ala Gly Arg Ile Arg Glu Arg Gly Pro Arg Thr
                405                 410                 415

Glu Lys Thr Pro Ala Asp Ser Arg Gln Ser Pro Ile Thr Val Ile Ser
            420                 425                 430
```

```
Ser Thr Thr Arg Ser Gly Glu Asp Leu Lys Ser Pro Asn Leu Asp Gln
        435                 440                 445

Ser Lys Pro Asp Glu Cys Arg Ser Ile Asn Lys Glu Ser Phe Met Pro
    450                 455                 460

Leu Thr Val Gln Thr Asp Ser Ala His Leu Gly His Asn His Leu His
465                 470                 475                 480

Asn Phe Gly Phe Pro Pro Gly Leu Thr Gly Gln Gln Phe Phe Asn His
            485                 490                 495

Leu Gly Ser Ala His Pro Phe Leu Leu His Pro Ser Gln Phe Asn Met
            500                 505                 510

Gly Gly Ala Phe Ser Asn Met Ala Ala Gly Met Gly Pro Leu Leu Ala
        515                 520                 525

Ala Val Ser Ser Gly Gly Val Ser Thr Met Asp Thr Thr Ser Met Ala
    530                 535                 540

Ser Pro Ser Gln Ser Leu Ala Gly Thr Pro Gly Leu Pro Phe His Leu
545                 550                 555                 560

Gln Gln His Val Leu Ala Ser Gln Gly Ile Ala Met Ser Pro Phe Gly
                565                 570                 575

Ser Leu Phe Pro Tyr Pro Tyr Thr Tyr Met Ala Ala Ala Ala Ala Ala
            580                 585                 590

Ser Ser Ala Ala Ser Ser Ser Val His Arg His Pro Phe Leu Asn Ala
        595                 600                 605

Val Arg Pro Arg Leu Arg Tyr Ser Pro Tyr Pro Leu Pro Met Thr Val
    610                 615                 620

Pro Asp Ser Thr Leu Leu Thr Thr Ala Met Pro Ser Met Gly Gly Gly
625                 630                 635                 640

Gly Gly Val Gly Thr Glu Leu Lys Pro Asp Gly Leu Val Pro Ala Ser
                645                 650                 655

Pro Val Ser Ala Val Thr Leu Asp Ser Thr Ser Glu Val Thr Ser His
            660                 665                 670

Ser Ser Thr Val Ser Ser Gly Ser Val Ser Met Ser Pro Lys Ala Cys
        675                 680                 685

Ala Glu Lys Glu Ala Ala Asn Glu Leu Gln Ser Ile Gln Arg Leu Val
    690                 695                 700

Ser Gly Leu Asp Ser Ser Gln Asp Arg Ala Arg Ser Gly Ser Pro
705                 710                 715
```

```
<210> SEQ ID NO 13
<211> LENGTH: 745
<212> TYPE: PRT
<213> ORGANISM: Equus caballus

<400> SEQUENCE: 13

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Leu Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95
```

```
Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Arg Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Arg Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

Pro Gly Pro Glu Ala Cys Asp Ala Ala Lys Ile Ser Thr Thr Thr Ser
385                 390                 395                 400

Glu Glu Pro Ser Arg Asp Lys Gly Ser Pro Ala Val Lys Ala His Leu
                405                 410                 415

Phe Ala Ala Glu Pro Gly Gly Arg Pro Arg Asp Ser Gly Arg Leu Gly
            420                 425                 430

Lys Ala Ser Pro Asp Ser Arg His Ser Pro Ala Thr Ile Ser Ser Ser
        435                 440                 445

Thr Arg Gly Leu Gly Ala Glu Glu Arg Arg Ser Pro Gly Arg Glu Gly
    450                 455                 460

Ala Ala Thr Ala Lys Ala Glu Glu Ala Arg Ala Leu Ala Gly Lys Asp
465                 470                 475                 480

Ala Phe Ala Pro Leu Thr Val Gln Thr Asp Ala Ala Ala Ala His Leu
                485                 490                 495

Gly Gln Gly Pro Leu Pro Gly Leu Gly Phe Ala Pro Gly Leu Ala Gly
            500                 505                 510
```

```
Gln Gln Phe Phe Asn Gly His Pro Leu Phe Leu His Pro Gly Gln Phe
        515                 520                 525

Ala Met Gly Gly Ala Phe Ser Ser Met Ala Ala Gly Met Gly Pro Leu
    530                 535                 540

Leu Ala Thr Val Ser Gly Ala Ser Thr Gly Val Ser Gly Leu Asp Ser
545                 550                 555                 560

Thr Ala Met Ala Ser Ala Ala Ala Ala Gln Gly Leu Ser Gly Ala Ser
                565                 570                 575

Ala Ala Ala Leu Pro Phe His Leu Gln Gln His Val Leu Ala Ser Gln
            580                 585                 590

Gly Leu Ala Met Ser Pro Phe Gly Ser Leu Phe Pro Tyr Pro Tyr Thr
        595                 600                 605

Tyr Met Ala Ala Ala Ala Ala Ala Ser Ser Ala Ala Ala Ser Ser Ser
    610                 615                 620

Val His Arg His Pro Phe Leu Asn Leu Asn Ser Met Arg Pro Arg Leu
625                 630                 635                 640

Arg Tyr Ser Pro Tyr Ser Ile Pro Met Pro Val Pro Asp Ser Ser Ser
                645                 650                 655

Leu Leu Thr Thr Ala Leu Pro Ser Met Ala Val Ala Ala Gly Pro Leu
            660                 665                 670

Asp Gly Lys Ala Ala Ala Leu Ala Ala Ser Pro Ala Ser Val Ala Val
        675                 680                 685

Asp Ser Gly Ser Glu Leu Asn Ser Arg Ser Ser Thr Leu Ser Ser Ser
    690                 695                 700

Ser Val Ser Leu Ser Pro Lys Leu Cys Pro Glu Lys Glu Ala Ala Thr
705                 710                 715                 720

Ser Glu Leu Gln Ser Ile Gln Arg Leu Val Ser Gly Leu Glu Ala Lys
                725                 730                 735

Pro Asp Arg Ser Arg Ser Ala Ser Pro
            740                 745


<210> SEQ ID NO 14
<211> LENGTH: 745
<212> TYPE: PRT
<213> ORGANISM: Sus scrofa

<400> SEQUENCE: 14

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Thr His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140
```

```
Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp Gln Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Lys Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Gly Arg Glu Ala Cys Asp Ala Ala Lys Ile Ser Thr Thr Thr Ser
385                 390                 395                 400

Glu Asp Pro Cys Arg Asp Lys Gly Ser Pro Ala Val Lys Ala His Leu
                405                 410                 415

Phe Ala Ala Glu Pro Pro Ser Arg Pro Arg Asp Ser Gly Arg Leu Asp
            420                 425                 430

Lys Ala Ser Pro Asp Ser Arg His Ser Pro Ala Thr Ile Ser Ser Ser
        435                 440                 445

Thr Arg Val Leu Gly Ala Glu Glu Arg Arg Ser Pro Gly Arg Glu Gly
    450                 455                 460

Ala Ala Thr Ser Lys Ala Glu Glu Ala Arg Ala Leu Pro Gly Lys Glu
465                 470                 475                 480

Ala Phe Ala Pro Leu Thr Val Gln Thr Asp Ala Ala Ala Ala His Leu
                485                 490                 495

Gly Gln Gly Pro Leu Pro Gly Leu Gly Phe Ala Pro Gly Leu Ala Gly
            500                 505                 510

Gln Gln Phe Phe Asn Gly His Pro Leu Phe Leu His Pro Ser Gln Phe
        515                 520                 525

Ala Met Gly Gly Ala Phe Ser Ser Met Ala Ala Gly Met Gly Pro Leu
    530                 535                 540

Leu Ala Thr Val Ser Gly Ala Ser Thr Gly Val Ser Ser Leu Asp Ser
545                 550                 555                 560
```

```
Thr Ala Met Ala Ser Ala Ala Ala Ala Gln Gly Leu Ser Gly Ala Ser
                565                 570                 575

Ala Ala Thr Leu Pro Phe His Leu Gln Gln His Val Leu Ala Ser Gln
            580                 585                 590

Gly Leu Ala Met Ser Pro Phe Gly Ser Leu Phe Pro Tyr Pro Tyr Thr
        595                 600                 605

Tyr Met Ala Ala Ala Ala Ala Ala Ser Ser Ala Ala Ala Ser Ser Ser
    610                 615                 620

Val His Arg His Pro Phe Leu Asn Leu Asn Ser Met Arg Pro Arg Leu
625                 630                 635                 640

Arg Tyr Ser Pro Tyr Ser Ile Pro Val Pro Val Pro Asp Ser Ser Ser
                645                 650                 655

Leu Leu Thr Thr Ala Leu Pro Thr Met Ala Ala Ala Ala Gly Pro Leu
            660                 665                 670

Asp Ser Lys Ala Ala Ala Leu Ala Ala Ser Pro Ala Ser Val Ala Val
        675                 680                 685

Asp Ser Gly Ser Glu Leu Asn Ser Arg Ser Ser Thr Leu Ser Ser Ser
    690                 695                 700

Ser Val Ser Leu Ser Pro Lys Leu Cys Pro Glu Lys Glu Ala Ala Thr
705                 710                 715                 720

Ser Glu Leu Gln Asn Ile Gln Arg Leu Val Ser Gly Leu Glu Ala Lys
                725                 730                 735

Pro Asp Arg Ala Arg Ser Thr Ser Pro
            740                 745


<210> SEQ ID NO 15
<211> LENGTH: 741
<212> TYPE: PRT
<213> ORGANISM: Mustela putorius furo

<400> SEQUENCE: 15

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Leu Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190
```

```
Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Lys Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Asp Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Cys Arg Asp Lys Gly Ser Pro Ala Val Lys Ala His Leu
                405                 410                 415

Phe Ala Ala Glu Pro Gly Gly Asp Ala Gly Arg Leu Asp Lys Ala Ser
            420                 425                 430

Pro Asp Ser Arg His Ser Pro Ala Thr Ile Ser Ser Ser Thr Arg Gly
        435                 440                 445

Leu Gly Ala Glu Glu Arg Arg Ser Pro Gly Arg Glu Gly Ala Ala Thr
    450                 455                 460

Ser Lys Ala Glu Glu Ala Arg Ala Leu Pro Gly Lys Glu Ala Phe Ala
465                 470                 475                 480

Pro Leu Thr Val Gln Thr Asp Ala Ala Ala Ala His Leu Gly Gln Gly
                485                 490                 495

Pro Leu Pro Gly Leu Gly Phe Ala Pro Gly Leu Ala Gly Gln Gln Phe
            500                 505                 510

Phe Asn Gly His Pro Leu Phe Leu His Pro Gly Gln Phe Ala Met Gly
        515                 520                 525

Gly Ala Phe Ser Ser Met Ala Ala Gly Met Gly Pro Leu Leu Ala Thr
    530                 535                 540

Val Ser Gly Ala Ser Thr Gly Val Ser Gly Leu Asp Ser Thr Ala Met
545                 550                 555                 560

Ala Ser Ala Ala Ala Gln Gly Leu Ser Gly Ala Ser Ala Ala Thr Leu
                565                 570                 575

Pro Phe His Leu Gln Pro His Val Leu Ala Ser Gln Gly Leu Ala Met
            580                 585                 590

Ser Pro Phe Gly Ser Leu Phe Pro Tyr Pro Tyr Thr Tyr Met Ala Ala
        595                 600                 605
```

```
Ala Ala Ala Ala Ser Ser Ala Ala Ala Ser Ser Ser Val His Arg His
    610                 615                 620

Pro Phe Leu Asn Leu Asn Thr Met Arg Pro Arg Leu Arg Tyr Ser Pro
625                 630                 635                 640

Tyr Ser Ile Pro Met Pro Val Pro Asp Ser Ser Ser Leu Leu Ala Thr
                645                 650                 655

Ala Leu Pro Ser Met Ala Ala Ala Ala Gly Pro Leu Asp Gly Lys Ala
            660                 665                 670

Ala Ala Leu Ala Ala Ser Pro Ala Ser Val Ala Val Asp Ser Gly Ser
        675                 680                 685

Glu Leu Asn Ser Arg Ala Ser Thr Leu Ser Ser Ser Ser Val Ser Leu
    690                 695                 700

Ser Pro Lys Leu Cys Pro Glu Lys Glu Ala Ala Thr Ser Glu Leu Gln
705                 710                 715                 720

Asn Ile Gln Arg Leu Val Ser Gly Leu Glu Ala Lys Pro Asp Arg Ser
                725                 730                 735

Arg Ser Gly Ser Pro
            740


<210> SEQ ID NO 16
<211> LENGTH: 745
<212> TYPE: PRT
<213> ORGANISM: Camelus ferus

<400> SEQUENCE: 16

Met Ser Leu Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Ser Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Thr His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp Gln Ala Thr Trp Gln Gly Asn Tyr Ser Phe Gly Thr Gln Thr
225                 230                 235                 240
```

-continued

```
Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285

Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Glu Asp Arg His Lys Lys Glu Asn Gly Thr Ser
                325                 330                 335

Asp Glu Ser Ser Ser Glu Gln Ala Ala Phe Asn Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Gly Pro Glu Ala Cys Asp Ala Ala Lys Ile Ser Thr Thr Thr Ser
385                 390                 395                 400

Glu Glu Pro Cys Arg Asp Lys Gly Ser Pro Ala Val Lys Ala His His
                405                 410                 415

Tyr Thr Ala Glu Pro Gly Gly Arg Pro Arg Asp Ser Gly Arg Leu Asp
            420                 425                 430

Lys Ala Ser Pro Asp Ser Arg His Ser Pro Ala Thr Ile Ser Ser Ser
        435                 440                 445

Thr Arg Gly Leu Gly Ala Glu Glu Arg Arg Ser Pro Gly Arg Glu Ser
    450                 455                 460

Ala Ala Thr Ser Lys Ala Glu Glu Ala Arg Ala Leu Pro Gly Lys Glu
465                 470                 475                 480

Ala Phe Ala Pro Leu Thr Val Gln Thr Asp Ala Ala Ala Ala His Leu
                485                 490                 495

Gly Gln Gly Pro Leu Pro Gly Leu Gly Phe Ala Pro Gly Leu Ala Gly
            500                 505                 510

Gln Gln Phe Phe Asn Gly His Pro Leu Phe Leu His Pro Gly Gln Phe
        515                 520                 525

Ala Met Gly Gly Ala Phe Ser Ser Met Ala Ala Gly Met Gly Pro Leu
    530                 535                 540

Leu Ala Thr Val Ser Gly Ala Ser Thr Gly Val Ser Gly Leu Asp Ser
545                 550                 555                 560

Thr Ala Met Ala Ser Ala Ala Ala Ala Gln Gly Leu Ser Gly Ala Ser
                565                 570                 575

Ala Ala Thr Leu Pro Phe His Leu Gln Gln His Val Leu Ala Ser Gln
            580                 585                 590

Gly Leu Ala Met Ser Pro Phe Gly Ser Leu Phe Pro Tyr Pro Tyr Thr
        595                 600                 605

Tyr Met Ala Ala Ala Ala Ala Ala Ser Ser Ala Ala Ala Ser Ser Ser
    610                 615                 620

Val His Arg His Pro Phe Leu Asn Leu Asn Thr Met Arg Pro Arg Leu
625                 630                 635                 640

Arg Tyr Ser Pro Tyr Ser Ile Pro Val Pro Val Pro Asp Ser Ser Ser
                645                 650                 655
```

```
Leu Leu Thr Thr Ala Leu Pro Ser Met Ala Ala Ala Ala Gly Pro Leu
            660                 665                 670

Asp Gly Lys Ala Ala Ala Leu Ala Ala Ser Pro Ala Ser Val Ala Val
        675                 680                 685

Asp Ser Gly Ser Glu Leu Asn Ser Arg Ser Ser Thr Leu Ser Ser Ser
    690                 695                 700

Ser Val Ser Leu Ser Pro Lys Leu Cys Pro Glu Lys Glu Ala Ala Thr
705                 710                 715                 720

Ser Glu Leu Gln Asn Ile Gln Arg Leu Val Ser Gly Leu Glu Ala Lys
                725                 730                 735

Pro Asp Arg Ser Arg Ser Ala Ser Pro
            740                 745


<210> SEQ ID NO 17
<211> LENGTH: 746
<212> TYPE: PRT
<213> ORGANISM: Pteropus alecto

<400> SEQUENCE: 17

Met Ser Phe Ser Met Arg Asp Pro Val Ile Pro Gly Thr Ser Met Ala
1               5                   10                  15

Tyr His Pro Phe Leu Pro His Arg Ala Pro Asp Phe Ala Met Ser Ala
            20                  25                  30

Val Leu Gly His Gln Pro Pro Phe Phe Pro Ala Leu Thr Leu Pro Pro
        35                  40                  45

Asn Gly Ala Ala Ala Leu Pro Leu Pro Gly Ala Leu Ala Lys Pro Ile
    50                  55                  60

Met Asp Gln Leu Val Gly Ala Ala Glu Thr Gly Ile Pro Phe Ser Ser
65                  70                  75                  80

Leu Gly Pro Gln Ala His Leu Arg Pro Leu Lys Thr Met Glu Pro Glu
                85                  90                  95

Glu Glu Val Glu Asp Asp Pro Lys Val His Leu Glu Ala Lys Glu Leu
            100                 105                 110

Trp Asp Gln Phe His Lys Arg Gly Thr Glu Met Val Ile Thr Lys Ser
        115                 120                 125

Gly Arg Arg Met Phe Pro Pro Phe Lys Val Arg Cys Ser Gly Leu Asp
    130                 135                 140

Lys Lys Ala Lys Tyr Ile Leu Leu Met Asp Ile Ile Ala Ala Asp Asp
145                 150                 155                 160

Cys Arg Tyr Lys Phe His Asn Ser Arg Trp Met Val Ala Gly Lys Ala
                165                 170                 175

Asp Pro Glu Met Pro Lys Arg Met Tyr Ile His Pro Asp Ser Pro Ala
            180                 185                 190

Thr Gly Glu Gln Trp Met Ser Lys Val Val Thr Phe His Lys Leu Lys
        195                 200                 205

Leu Thr Asn Asn Ile Ser Asp Lys His Gly Phe Thr Leu Ala Phe Pro
    210                 215                 220

Ser Asp His Ala Thr Trp Gln Gly Asn Tyr Ser Phe Gly Thr Gln Thr
225                 230                 235                 240

Ile Leu Asn Ser Met His Lys Tyr Gln Pro Arg Phe His Ile Val Arg
                245                 250                 255

Ala Asn Asp Ile Leu Lys Leu Pro Tyr Ser Thr Phe Arg Thr Tyr Leu
            260                 265                 270

Phe Pro Glu Thr Glu Phe Ile Ala Val Thr Ala Tyr Gln Asn Asp Lys
        275                 280                 285
```

-continued

```
Ile Thr Gln Leu Lys Ile Asp Asn Asn Pro Phe Ala Lys Gly Phe Arg
    290                 295                 300

Asp Thr Gly Asn Gly Arg Arg Glu Lys Arg Lys Gln Leu Thr Leu Gln
305                 310                 315                 320

Ser Met Arg Val Phe Asp Asp Arg His Lys Lys Glu Asn Gly Thr Ser
                325                 330                 335

Asp Glu Ser Ser Ser Glu Gln Ala Ala Phe Ser Cys Phe Ala Gln Ser
            340                 345                 350

Ser Ser Pro Ala Val Ser Thr Val Gly Thr Ser Asn Leu Lys Asp Leu
        355                 360                 365

Cys Pro Ser Glu Gly Glu Ser Asp Ala Glu Ala Glu Ser Lys Glu Glu
    370                 375                 380

His Ala Pro Glu Gly Cys Asp Ala Ala Lys Ile Ser Thr Thr Thr Ser
385                 390                 395                 400

Glu Glu Pro Ser Arg Asp Lys Gly Ser Pro Ala Val Lys Ala His Val
                405                 410                 415

Phe Ala Ala Glu Pro Gly Gly Arg Pro Arg Asp Ser Gly Arg Met Asp
            420                 425                 430

Lys Ala Ser Pro Asp Ser Arg His Ser Pro Ala Thr Ile Ser Ser Ser
        435                 440                 445

Thr Arg Gly Leu Gly Ala Glu Glu Arg Arg Ser Pro Gly Arg Glu Gly
    450                 455                 460

Ala Ala Thr Ser Lys Ala Glu Glu Ala Arg Ala Leu Pro Gly Lys Glu
465                 470                 475                 480

Ser Phe Ala Pro Leu Thr Val Gln Thr Asp Val Ala Ala Ala His Leu
                485                 490                 495

Gly Gln Gly Pro Leu Pro Gly Leu Gly Phe Ala Pro Gly Leu Ala Gly
            500                 505                 510

Gln Gln Phe Phe Asn Gly His Pro Leu Phe Leu His Pro Gly Gln Phe
        515                 520                 525

Ala Met Gly Gly Ala Phe Ser Ser Met Ala Ala Gly Met Gly Pro Leu
    530                 535                 540

Leu Ala Thr Val Ser Gly Ala Ser Thr Gly Val Ser Gly Leu Asp Ser
545                 550                 555                 560

Thr Ala Met Ala Ser Ala Ala Ala Ala Gln Gly Leu Ser Gly Ala Thr
                565                 570                 575

Ala Ala Thr Leu Pro Phe His Leu Gln Gln His Val Leu Ala Ser Gln
            580                 585                 590

Gly Leu Ala Met Ser Pro Phe Gly Ser Leu Phe Pro Tyr Pro Tyr Thr
        595                 600                 605

Tyr Met Ala Ala Ala Ala Ala Ala Ser Ser Ala Ala Ala Ser Ser Ser
    610                 615                 620

Val His Arg His Pro Phe Leu Asn Leu Asn Thr Met Arg Pro Arg Leu
625                 630                 635                 640

Arg Tyr Ser Pro Tyr Ser Ile Pro Leu Pro Val Pro Asp Ser Ser Ser
                645                 650                 655

Leu Leu Thr Thr Ala Leu Pro Ser Met Ala Ala Ala Ala Gly Pro Leu
            660                 665                 670

Asp Ala Lys Ala Ala Ala Leu Ala Ala Ala Ser Pro Ala Ser Val Ala
        675                 680                 685

Val Asp Ser Gly Ser Glu Leu Asn Ser Arg Ser Ser Thr Leu Ser Ser
    690                 695                 700
```

Ser Ser Val Ser Leu Ser Pro Lys Leu Cys Pro Glu Lys Glu Ala Ala
705 710 715 720

Thr Ser Glu Leu Gln Ser Ile Gln Arg Leu Val Ser Gly Leu Glu Ala
725 730 735

Lys Pro Asp Arg Ser Arg Ser Ala Ser Pro
740 745

<210> SEQ ID NO 18
<211> LENGTH: 714
<212> TYPE: PRT
<213> ORGANISM: Ictalurus punctatus

<400> SEQUENCE: 18

Met Gln Tyr Leu Asp Phe Trp Met Asn Phe Leu Met Arg Asp Pro Val
1 5 10 15

Ile Gln Gly Ser Ser Met Ala Tyr His Pro Phe Leu Pro Asn Arg Gly
20 25 30

Pro Glu Phe Ala Met Ser Ala Met Leu Gly His Gln Pro Pro Phe Phe
35 40 45

Pro Ala Leu Ala Leu Pro Pro Asn Gly Ser Leu Ser Leu Pro Gly Thr
50 55 60

Leu Gly Lys Pro Ile Met Glu Gln Leu Met Gly Thr Ala Asp Ser Gly
65 70 75 80

Leu His Phe Ser Ser Leu Gly His Gln Ala Ala Ala Ala His Leu Arg
85 90 95

Pro Leu Lys Thr Leu Glu Pro Glu Glu Glu Val Glu Asp Asp Pro Lys
100 105 110

Val His Leu Glu Ala Lys Glu Leu Trp Glu Leu Phe His Lys Cys Gly
115 120 125

Thr Glu Met Val Ile Thr Lys Ser Gly Arg Arg Met Phe Pro Pro Phe
130 135 140

Lys Val Arg Cys Thr Gly Leu Asp Lys Lys Ala Lys Tyr Ile Leu Leu
145 150 155 160

Met Asp Ile Val Ala Ala Asp Asp Cys Arg Tyr Lys Phe His Asn Ser
165 170 175

Arg Trp Met Val Ala Gly Lys Ala Asp Pro Glu Met Pro Lys Arg Met
180 185 190

Tyr Ile His Pro Asp Ser Pro Ala Thr Gly Glu Gln Trp Met Ser Lys
195 200 205

Val Val Asn Phe His Lys Leu Lys Leu Thr Asn Asn Ile Ser Asp Lys
210 215 220

His Gly Phe Ala Leu Phe Ser Leu Gln Thr Ile Leu Asn Ser Met His
225 230 235 240

Lys Tyr Gln Pro Arg Phe His Ile Val Arg Ala Asn Asp Ile Leu Lys
245 250 255

Leu Pro Tyr Ser Thr Phe Arg Thr Tyr Val Phe Pro Glu Thr Asp Phe
260 265 270

Ile Ala Val Thr Ala Tyr Gln Asn Asp Lys Ile Thr Gln Leu Lys Ile
275 280 285

Asp His Asn Pro Phe Ala Lys Gly Phe Arg Asp Thr Gly Asn Gly Arg
290 295 300

Arg Glu Lys Arg Lys Gln Leu Ala Leu Gln Ser Leu Arg Ser Tyr Glu
305 310 315 320

Glu Pro Gln Lys Lys Glu Asn Gly Thr Ser Asp Asp Ser Ser Gly Glu
325 330 335

```
Gln Thr Ser Phe Lys Cys Phe Arg Gln Ala Ser Ser Pro Ala Val Ala
            340                 345                 350

Thr Val Gly Arg Gln Ser Phe Lys Asp Phe Cys Asp Ser Asp Glu Asp
        355                 360                 365

Ser Asp Glu Asp Asp Arg Asp Ala Asn Pro Lys Glu Gly Pro Glu Ser
    370                 375                 380

Ser Lys Ile Ser Thr Thr Thr Ser Glu Asp Ala Lys Glu Arg Glu Gly
385                 390                 395                 400

Ala Leu Asn Lys Leu Ser Ser Phe Gly Asp Gly Asp Ser Arg Leu Arg
                405                 410                 415

Glu Ser Arg Thr Glu Lys Ser Arg Ala Asp Ser Arg Gln Ser Pro Val
            420                 425                 430

Thr Leu Ile Ser Ser Thr Thr Arg Ser Gly Glu Glu Leu Lys Ser Pro
        435                 440                 445

Ala Gly Glu Gln Pro Lys Leu Asp Glu Cys Arg Ser Val Ser Lys Glu
    450                 455                 460

Ser Tyr Thr Thr Pro Leu Thr Val Gln Thr Asp Ala Gly Ala His Leu
465                 470                 475                 480

His Gln Ser His Leu His Ser Phe Gly Phe Pro Pro Gly Leu Ala Gly
                485                 490                 495

Gln Gln Phe Phe Asn His Leu Gly Ser Ala His Pro Phe Leu Leu His
            500                 505                 510

Pro Ser Gln Phe Asn Leu Gly Gly Ala Phe Ser Asn Met Ala Ala Gly
        515                 520                 525

Met Gly Pro Leu Leu Ala Ala Val Ser Ser Gly Gly Val Thr Ser Met
    530                 535                 540

Asp Thr Thr Ser Met Ala Ser Pro Ser Gln Ser Leu Ala Gly Ala Pro
545                 550                 555                 560

Gly Val Pro Phe His Leu Gln Gln His Val Leu Ala Ser Gln Gly Leu
                565                 570                 575

Ala Met Ser Pro Phe Gly Gly Leu Phe Pro Tyr Pro Tyr Thr Tyr Met
            580                 585                 590

Ala Ala Ala Ala Ala Ala Ser Ser Ala Ala Thr Ser Ser Val His Arg
        595                 600                 605

His Pro Phe Leu Asn Ala Val Arg Pro Arg Leu Arg Tyr Ser Pro Tyr
    610                 615                 620

Ser Leu Pro Ser Val Pro Asp Ser Thr Leu Leu Thr Thr Ala Ile Pro
625                 630                 635                 640

Pro Ile Asp Leu Lys Gly Asp Val Met Ala Ser Ser Pro Val Ser Ala
                645                 650                 655

Thr Leu Asp Ser Thr Ser Glu Val Thr Ser Arg Ser Ser Thr Ile Ser
            660                 665                 670

Ser Gly Ser Val Ser Leu Ser Pro Lys Thr Gly Ser Asp Lys Asp Ser
        675                 680                 685

Asn Asn Asp Leu Gln Ser Ile Gln Arg Leu Val Ser Gly Leu Asp Ser
    690                 695                 700

Lys Gln Asp Arg Ala Arg Ser Val Ser Pro
705                 710
```

<210> SEQ ID NO 19
<211> LENGTH: 745
<212> TYPE: PRT
<213> ORGANISM: Hipposideros armiger

<400> SEQUENCE: 19

Met Ser Leu Ser Met Arg Asp Pro Val Ile Pro Gly Thr Ser Met Ala
1 5 10 15

Tyr His Pro Phe Leu Pro His Arg Ala Pro Asp Phe Ala Met Ser Ala
20 25 30

Val Leu Gly His Gln Pro Pro Phe Phe Pro Ala Leu Thr Leu Pro Pro
35 40 45

Asn Gly Ala Ala Ala Leu Ser Leu Pro Gly Ala Leu Ala Lys Pro Ile
50 55 60

Met Asp Gln Leu Val Gly Ala Ala Glu Thr Gly Ile Pro Phe Ser Ser
65 70 75 80

Leu Gly Pro Gln Ala His Leu Arg Pro Leu Lys Thr Met Glu Pro Glu
85 90 95

Glu Glu Val Glu Asp Asp Pro Lys Val His Leu Glu Ala Lys Glu Leu
100 105 110

Trp Asp Gln Phe His Lys Arg Gly Thr Glu Met Val Ile Thr Lys Ser
115 120 125

Gly Arg Arg Met Phe Pro Pro Phe Lys Val Arg Cys Ser Gly Leu Asp
130 135 140

Lys Lys Ala Lys Tyr Ile Leu Leu Met Asp Ile Ile Ala Ala Asp Asp
145 150 155 160

Cys Arg Tyr Lys Phe His Asn Ser Arg Trp Met Val Ala Gly Lys Ala
165 170 175

Asp Pro Glu Met Pro Lys Arg Met Tyr Ile His Pro Asp Ser Pro Ala
180 185 190

Thr Gly Glu Gln Trp Met Ser Lys Val Val Thr Phe His Lys Leu Lys
195 200 205

Leu Thr Asn Asn Ile Ser Asp Lys His Gly Phe Thr Leu Ala Phe Pro
210 215 220

Ser Asp His Ala Thr Trp Gln Gly Asn Tyr Ser Phe Gly Ile Gln Thr
225 230 235 240

Ile Leu Asn Ser Met His Lys Tyr Gln Pro Arg Phe His Ile Val Arg
245 250 255

Ala Asn Asp Ile Leu Lys Leu Pro Tyr Ser Thr Phe Arg Thr Tyr Leu
260 265 270

Phe Pro Glu Thr Glu Phe Ile Ala Val Thr Ala Tyr Gln Asn Asp Lys
275 280 285

Ile Thr Gln Leu Lys Ile Asp Asn Asn Pro Phe Ala Lys Gly Phe Arg
290 295 300

Asp Thr Gly Asn Gly Arg Arg Glu Lys Arg Lys Gln Leu Thr Leu Gln
305 310 315 320

Ser Met Arg Val Phe Asp Asp Arg His Lys Lys Glu Asn Gly Thr Ser
325 330 335

Asp Glu Ser Ser Ser Glu Gln Ala Ala Phe Ser Cys Phe Ala Gln Ser
340 345 350

Ser Ser Pro Ala Val Ser Thr Val Gly Thr Ser Asn Leu Lys Asp Leu
355 360 365

Cys Ala Ser Glu Gly Glu Ser Asp Ala Glu Ala Glu Ser Lys Glu Glu
370 375 380

Pro Gly Pro Glu Ala Cys Asp Ala Ala Lys Ile Ser Thr Thr Thr Ser
385 390 395 400

Glu Glu Pro Ser Arg Asp Lys Gly Ser Pro Ala Val Lys Ala His Leu
405 410 415

```
Phe Ser Ala Glu Pro Gly Gly Arg Pro Arg Asp Ser Gly Arg Met Asp
            420                 425                 430

Lys Ala Ser Pro Asp Ser Arg His Ser Pro Ala Thr Ile Ser Ser Ser
        435                 440                 445

Thr Arg Gly Leu Gly Ala Glu Asp Arg Arg Ser Pro Gly Arg Glu Gly
    450                 455                 460

Ala Ala Thr Ser Lys Ala Glu Glu Ala Arg Ala Leu Pro Gly Lys Glu
465                 470                 475                 480

Ala Phe Ala Pro Leu Thr Val Gln Thr Asp Ala Ala Thr Ala His Leu
                485                 490                 495

Gly Gln Gly Pro Leu Pro Gly Leu Gly Phe Ala Pro Gly Leu Ala Gly
            500                 505                 510

Gln Gln Phe Phe Asn Gly His Pro Leu Phe Leu His Pro Gly Gln Phe
        515                 520                 525

Ala Met Gly Gly Ala Phe Ser Ser Met Ala Ala Gly Met Gly Pro Leu
    530                 535                 540

Leu Ala Thr Val Ser Gly Ala Ser Thr Gly Val Ser Gly Leu Asp Ser
545                 550                 555                 560

Thr Ala Met Ala Ser Ala Ala Ala Ala Gln Gly Leu Ser Gly Ala Ser
                565                 570                 575

Ala Ala Thr Leu Pro Phe His Leu Gln Gln His Val Leu Ala Ser Gln
            580                 585                 590

Gly Leu Ala Met Ser Pro Phe Gly Ser Leu Phe Pro Tyr Pro Tyr Thr
        595                 600                 605

Tyr Met Ala Ala Ala Ala Ala Ala Ser Ser Ala Ala Ala Ser Ser Ser
    610                 615                 620

Val His Arg His Pro Phe Leu Asn Leu Asn Thr Met Arg Pro Arg Leu
625                 630                 635                 640

Arg Tyr Ser Pro Tyr Ser Ile Pro Leu Pro Val Pro Asp Ser Ser Ser
                645                 650                 655

Leu Leu Thr Thr Ala Leu Pro Ser Met Ala Gly Val Ala Gly Pro Leu
            660                 665                 670

Asp Ala Lys Ala Ala Ala Leu Ala Ala Ser Pro Ala Ser Val Ala Val
        675                 680                 685

Asp Ser Gly Ser Glu Leu Asn Ser Arg Ser Ser Thr Leu Ser Ser Ser
    690                 695                 700

Ser Val Ser Leu Ser Pro Lys Leu Cys Pro Glu Lys Glu Ala Ala Thr
705                 710                 715                 720

Ser Glu Leu Gln Ser Ile Gln Arg Leu Val Ser Gly Leu Glu Ala Lys
                725                 730                 735

Pro Asp Arg Ser Arg Ser Ala Ser Pro
            740                 745
```

<210> SEQ ID NO 20
<211> LENGTH: 825
<212> TYPE: PRT
<213> ORGANISM: Homo sapiens

<400> SEQUENCE: 20

```
Met Leu Asp Ile Cys Leu Glu Lys Arg Val Gly Thr Thr Leu Ala Ala
1               5                   10                  15

Pro Lys Cys Asn Ser Ser Thr Val Arg Phe Gln Gly Leu Ala Glu Gly
            20                  25                  30

Thr Lys Gly Thr Met Lys Met Asp Met Glu Asp Ala Asp Met Thr Leu
```

```
        35                  40                  45

Trp Thr Glu Ala Glu Phe Glu Glu Lys Cys Thr Tyr Ile Val Asn Asp
    50                  55                  60

His Pro Trp Asp Ser Gly Ala Asp Gly Gly Thr Ser Val Gln Ala Glu
65                  70                  75                  80

Ala Ser Leu Pro Arg Asn Leu Leu Phe Lys Tyr Ala Thr Asn Ser Glu
                85                  90                  95

Glu Val Ile Gly Val Met Ser Lys Glu Tyr Ile Pro Lys Gly Thr Arg
            100                 105                 110

Phe Gly Pro Leu Ile Gly Glu Ile Tyr Thr Asn Asp Thr Val Pro Lys
        115                 120                 125

Asn Ala Asn Arg Lys Tyr Phe Trp Arg Ile Tyr Ser Arg Gly Glu Leu
    130                 135                 140

His His Phe Ile Asp Gly Phe Asn Glu Glu Lys Ser Asn Trp Met Arg
145                 150                 155                 160

Tyr Val Asn Pro Ala His Ser Pro Arg Glu Gln Asn Leu Ala Ala Cys
                165                 170                 175

Gln Asn Gly Met Asn Ile Tyr Phe Tyr Thr Ile Lys Pro Ile Pro Ala
            180                 185                 190

Asn Gln Glu Leu Leu Val Trp Tyr Cys Arg Asp Phe Ala Glu Arg Leu
        195                 200                 205

His Tyr Pro Tyr Pro Gly Glu Leu Thr Met Met Asn Leu Thr Gln Thr
    210                 215                 220

Gln Ser Ser Leu Lys Gln Pro Ser Thr Glu Lys Asn Glu Leu Cys Pro
225                 230                 235                 240

Lys Asn Val Pro Lys Arg Glu Tyr Ser Val Lys Glu Ile Leu Lys Leu
                245                 250                 255

Asp Ser Asn Pro Ser Lys Gly Lys Asp Leu Tyr Arg Ser Asn Ile Ser
            260                 265                 270

Pro Leu Thr Ser Glu Lys Asp Leu Asp Asp Phe Arg Arg Arg Gly Ser
        275                 280                 285

Pro Glu Met Pro Phe Tyr Pro Arg Val Val Tyr Pro Ile Arg Ala Pro
    290                 295                 300

Leu Pro Glu Asp Phe Leu Lys Ala Ser Leu Ala Tyr Gly Ile Glu Arg
305                 310                 315                 320

Pro Thr Tyr Ile Thr Arg Ser Pro Ile Pro Ser Ser Thr Thr Pro Ser
                325                 330                 335

Pro Ser Ala Arg Ser Ser Pro Asp Gln Ser Leu Lys Ser Ser Ser Pro
            340                 345                 350

His Ser Ser Pro Gly Asn Thr Val Ser Pro Val Gly Pro Gly Ser Gln
        355                 360                 365

Glu His Arg Asp Ser Tyr Ala Tyr Leu Asn Ala Ser Tyr Gly Thr Glu
    370                 375                 380

Gly Leu Gly Ser Tyr Pro Gly Tyr Ala Pro Leu Pro His Leu Pro Pro
385                 390                 395                 400

Ala Phe Ile Pro Ser Tyr Asn Ala His Tyr Pro Lys Phe Leu Leu Pro
                405                 410                 415

Pro Tyr Gly Met Asn Cys Asn Gly Leu Ser Ala Val Ser Ser Met Asn
            420                 425                 430

Gly Ile Asn Asn Phe Gly Leu Phe Pro Arg Leu Cys Pro Val Tyr Ser
        435                 440                 445

Asn Leu Leu Gly Gly Gly Ser Leu Pro His Pro Met Leu Asn Pro Thr
    450                 455                 460
```

```
Ser Leu Pro Ser Ser Leu Pro Ser Asp Gly Ala Arg Arg Leu Leu Gln
465                 470                 475                 480

Pro Glu His Pro Arg Glu Val Leu Val Pro Ala Pro His Ser Ala Phe
                485                 490                 495

Ser Phe Thr Gly Ala Ala Ala Ser Met Lys Asp Lys Ala Cys Ser Pro
            500                 505                 510

Thr Ser Gly Ser Pro Thr Ala Gly Thr Ala Ala Thr Ala Glu His Val
        515                 520                 525

Val Gln Pro Lys Ala Thr Ser Ala Ala Met Ala Ala Pro Ser Ser Asp
    530                 535                 540

Glu Ala Met Asn Leu Ile Lys Asn Lys Arg Asn Met Thr Gly Tyr Lys
545                 550                 555                 560

Thr Leu Pro Tyr Pro Leu Lys Lys Gln Asn Gly Lys Ile Lys Tyr Glu
                565                 570                 575

Cys Asn Val Cys Ala Lys Thr Phe Gly Gln Leu Ser Asn Leu Lys Val
            580                 585                 590

His Leu Arg Val His Ser Gly Glu Arg Pro Phe Lys Cys Gln Thr Cys
        595                 600                 605

Asn Lys Gly Phe Thr Gln Leu Ala His Leu Gln Lys His Tyr Leu Val
    610                 615                 620

His Thr Gly Glu Lys Pro His Glu Cys Gln Val Cys His Lys Arg Phe
625                 630                 635                 640

Ser Ser Thr Ser Asn Leu Lys Thr His Leu Arg Leu His Ser Gly Glu
                645                 650                 655

Lys Pro Tyr Gln Cys Lys Val Cys Pro Ala Lys Phe Thr Gln Phe Val
            660                 665                 670

His Leu Lys Leu His Lys Arg Leu His Thr Arg Glu Arg Pro His Lys
        675                 680                 685

Cys Ser Gln Cys His Lys Asn Tyr Ile His Leu Cys Ser Leu Lys Val
    690                 695                 700

His Leu Lys Gly Asn Cys Ala Ala Ala Pro Ala Pro Gly Leu Pro Leu
705                 710                 715                 720

Glu Asp Leu Thr Arg Ile Asn Glu Glu Ile Glu Lys Phe Asp Ile Ser
                725                 730                 735

Asp Asn Ala Asp Arg Leu Glu Asp Val Glu Asp Asp Ile Ser Val Ile
            740                 745                 750

Ser Val Val Glu Lys Glu Ile Leu Ala Val Val Arg Lys Glu Lys Glu
        755                 760                 765

Glu Thr Gly Leu Lys Val Ser Leu Gln Arg Asn Met Gly Asn Gly Leu
    770                 775                 780

Leu Ser Ser Gly Cys Ser Leu Tyr Glu Ser Ser Asp Leu Pro Leu Met
785                 790                 795                 800

Lys Leu Pro Pro Ser Asn Pro Leu Pro Leu Val Pro Val Lys Val Lys
                805                 810                 815

Gln Glu Thr Val Glu Pro Met Asp Pro
            820                 825
```

<210> SEQ ID NO 21
<211> LENGTH: 823
<212> TYPE: PRT
<213> ORGANISM: Mus musculus

<400> SEQUENCE: 21

```
Met Leu Asp Leu Leu Leu Glu Lys Arg Val Gly Thr Thr Leu Ala Ala
```

-continued

```
1               5                   10                  15

Pro Lys Ser Ser Ser Gly Ser Val Lys Phe Gln Gly Leu Ala Glu Thr
            20                  25                  30

Gly Ile Met Lys Met Asp Met Glu Asp Ala Asp Met Thr Leu Trp Thr
        35                  40                  45

Glu Ala Glu Phe Glu Glu Lys Cys Thr Tyr Ile Val Asn Asp His Pro
    50                  55                  60

Trp Asp Ser Gly Ala Asp Gly Gly Thr Ser Val Gln Ala Glu Ala Ser
65                  70                  75                  80

Leu Pro Arg Asn Leu Leu Phe Lys Tyr Ala Ala Asn Asn Ser Lys Glu
                85                  90                  95

Val Ile Gly Val Val Ser Lys Glu Tyr Ile Pro Lys Gly Thr Arg Phe
            100                 105                 110

Gly Pro Leu Ile Gly Glu Val Tyr Thr Asn Asp Thr Val Pro Lys Asn
        115                 120                 125

Ala Asn Arg Lys Tyr Phe Trp Arg Ile Tyr Ser Arg Glu Glu Phe His
    130                 135                 140

His Phe Ile Asp Gly Phe Asn Glu Glu Lys Ser Asn Trp Met Arg Tyr
145                 150                 155                 160

Val Asn Pro Ala His Ser Ala Arg Glu Gln Asn Leu Ala Ala Cys Gln
                165                 170                 175

Asn Gly Met Asn Ile Tyr Phe Tyr Thr Ile Lys Pro Ile Pro Ala Asn
            180                 185                 190

Gln Glu Leu Leu Val Trp Tyr Cys Arg Asp Phe Ala Glu Arg Leu His
        195                 200                 205

Tyr Pro Tyr Pro Gly Glu Leu Thr Val Ile Asn Leu Thr Gln Thr Glu
    210                 215                 220

Ser Asn Pro Lys Gln Tyr Ser Ser Glu Lys Asn Glu Leu Tyr Pro Lys
225                 230                 235                 240

Ser Val Pro Lys Arg Glu Tyr Ser Val Lys Glu Ile Leu Lys Leu Asp
                245                 250                 255

Ser Asn Pro Ser Lys Arg Lys Asp Ile Tyr Arg Ser Asn Ile Ser Pro
            260                 265                 270

Phe Thr Leu Glu Lys Asp Met Asp Gly Phe Arg Lys Asn Gly Ser Pro
        275                 280                 285

Asp Met Pro Phe Tyr Pro Arg Val Val Tyr Pro Ile Arg Ala Pro Leu
    290                 295                 300

Pro Glu Asp Phe Leu Lys Ala Ser Leu Ala Tyr Gly Met Glu Arg Pro
305                 310                 315                 320

Thr Tyr Ile Thr His Ser Pro Leu Pro Ser Ser Thr Thr Pro Ser Pro
                325                 330                 335

Pro Ala Ser Ser Ser Pro Glu Gln Ser Leu Lys Ser Ser Ser Pro His
            340                 345                 350

Ser Ser Pro Gly Asn Thr Val Ser Pro Leu Ala Pro Gly Leu Pro Glu
        355                 360                 365

His Arg Asp Ser Tyr Ser Tyr Leu Asn Val Ser Tyr Gly Ser Glu Gly
    370                 375                 380

Leu Gly Ser Tyr Pro Gly Tyr Ala Pro Ala Pro His Leu Pro Pro Ala
385                 390                 395                 400

Phe Ile Pro Ser Tyr Asn Ala His Tyr Pro Lys Phe Leu Leu Pro Pro
                405                 410                 415

Tyr Gly Ile Ser Ser Asn Gly Leu Ser Thr Met Asn Asn Ile Asn Gly
            420                 425                 430
```

```
Ile Asn Asn Phe Ser Leu Phe Pro Arg Leu Tyr Pro Val Tyr Ser Asn
        435                 440                 445

Leu Leu Ser Gly Ser Ser Leu Pro His Pro Met Leu Asn Pro Ala Ser
    450                 455                 460

Leu Pro Ser Ser Leu Pro Thr Asp Gly Ala Arg Arg Leu Leu Pro Pro
465                 470                 475                 480

Glu His Pro Lys Glu Val Leu Ile Pro Ala Pro His Ser Ala Phe Ser
                485                 490                 495

Leu Thr Gly Ala Ala Ala Ser Met Lys Asp Glu Ser Ser Pro Pro Ser
            500                 505                 510

Gly Ser Pro Thr Ala Gly Thr Ala Ala Thr Ser Glu His Val Val Gln
        515                 520                 525

Pro Lys Ala Thr Ser Ser Val Met Ala Ala Pro Ser Thr Asp Gly Ala
    530                 535                 540

Met Asn Leu Ile Lys Asn Lys Arg Asn Met Thr Gly Tyr Lys Thr Leu
545                 550                 555                 560

Pro Tyr Pro Leu Lys Lys Gln Asn Gly Lys Ile Lys Tyr Glu Cys Asn
                565                 570                 575

Val Cys Ala Lys Thr Phe Gly Gln Leu Ser Asn Leu Lys Val His Leu
            580                 585                 590

Arg Val His Ser Gly Glu Arg Pro Phe Lys Cys Gln Thr Cys Asn Lys
        595                 600                 605

Gly Phe Thr Gln Leu Ala His Leu Gln Lys His Tyr Leu Val His Thr
    610                 615                 620

Gly Glu Lys Pro His Glu Cys Gln Val Cys His Lys Arg Phe Ser Ser
625                 630                 635                 640

Thr Ser Asn Leu Lys Thr His Leu Arg Leu His Ser Gly Glu Lys Pro
                645                 650                 655

Tyr Gln Cys Lys Val Cys Pro Ala Lys Phe Thr Gln Phe Val His Leu
            660                 665                 670

Lys Leu His Lys Arg Leu His Thr Arg Glu Arg Pro His Lys Cys Ala
        675                 680                 685

Gln Cys His Lys Ser Tyr Ile His Leu Cys Ser Leu Lys Val His Leu
    690                 695                 700

Lys Gly Asn Cys Pro Ala Gly Pro Ala Ala Gly Leu Pro Leu Glu Asp
705                 710                 715                 720

Leu Thr Arg Ile Asn Glu Glu Ile Glu Arg Phe Asp Ile Ser Asp Asn
                725                 730                 735

Ala Asp Arg Leu Glu Asp Met Glu Asp Ser Val Asp Val Thr Ser Met
            740                 745                 750

Val Glu Lys Glu Ile Leu Ala Val Val Arg Lys Glu Lys Glu Glu Thr
        755                 760                 765

Ser Leu Lys Val Ser Leu Gln Arg Asn Met Gly Asn Gly Leu Leu Ser
    770                 775                 780

Ser Gly Cys Ser Leu Tyr Glu Ser Ser Asp Leu Ser Leu Met Lys Leu
785                 790                 795                 800

Pro His Ser Asn Pro Leu Pro Leu Val Pro Val Lys Val Lys Gln Glu
                805                 810                 815

Thr Val Glu Pro Met Asp Pro
            820

<210> SEQ ID NO 22
<211> LENGTH: 857
```

<212> TYPE: PRT
<213> ORGANISM: Rattus norvegicus

<400> SEQUENCE: 22

```
Met Ser Glu Ala Tyr Leu Arg Cys Trp Ile Phe Ser Trp Lys Ser Val
1               5                   10                  15

Trp Val Arg Pro Cys Gln Gly Leu His Phe Lys Thr Arg Leu Leu Gln
            20                  25                  30

Gly Ser Leu Leu Tyr Thr Ala Leu Asp Ser Tyr Ser Thr Val Gln Ala
        35                  40                  45

Ala Pro Lys Cys Asn Ser Gly Ser Val Lys Phe Gln Gly Leu Ala Glu
    50                  55                  60

Thr Ser Gly Ile Met Lys Met Asp Met Glu Asp Ala Asp Met Thr Leu
65                  70                  75                  80

Trp Thr Glu Ala Glu Phe Glu Glu Lys Cys Thr Tyr Ile Val Asn Asp
                85                  90                  95

His Pro Trp Asp Ser Ser Ala Asp Gly Gly Thr Ser Val Gln Ala Glu
            100                 105                 110

Ala Ser Leu Pro Arg Asn Leu Leu Phe Lys Tyr Ala Ala Asn Asn Ser
        115                 120                 125

Lys Glu Val Ile Gly Val Val Ser Lys Glu Tyr Ile Pro Lys Gly Thr
    130                 135                 140

Arg Phe Gly Pro Leu Ile Gly Glu Val Tyr Thr Asn Asp Thr Val Pro
145                 150                 155                 160

Lys Asn Ala Asn Arg Lys Tyr Phe Trp Arg Ile Tyr Ser Arg Glu Glu
                165                 170                 175

Phe His His Phe Ile Asp Gly Phe Asn Glu Glu Lys Ser Asn Trp Met
            180                 185                 190

Arg Tyr Val Asn Pro Ala His Ser Ala Arg Glu Gln Asn Leu Ala Ala
        195                 200                 205

Cys Gln Asn Gly Met Asn Ile Tyr Phe Tyr Thr Ile Lys Pro Ile Pro
    210                 215                 220

Ala Asn Gln Glu Leu Leu Val Trp Tyr Cys Arg Asp Phe Ala Glu Arg
225                 230                 235                 240

Leu His Tyr Pro Tyr Pro Gly Glu Leu Thr Val Met Asn Leu Thr Gln
                245                 250                 255

Thr Glu Ser Asn Pro Lys Gln Tyr Ser Ser Glu Lys Asn Glu Leu Tyr
            260                 265                 270

Pro Lys Ser Val Pro Lys Arg Glu Tyr Ser Val Lys Glu Ile Leu Lys
        275                 280                 285

Leu Asp Ser Asn Pro Ser Lys Arg Lys Asp Ser Tyr Arg Ser Asn Ile
    290                 295                 300

Ser Pro Tyr Thr Ser Glu Lys Asp Met Asp Gly Phe Arg Lys Asn Gly
305                 310                 315                 320

Ser Pro Asp Met Pro Phe Tyr Pro Arg Val Val Tyr Pro Ile Arg Ala
                325                 330                 335

Pro Leu Pro Glu Asp Phe Leu Lys Ala Ser Leu Ala Tyr Gly Met Glu
            340                 345                 350

Arg Pro Thr Tyr Ile Thr His Ser Pro Leu Pro Ser Ser Thr Thr Pro
        355                 360                 365

Ser Pro Pro Ala Ser Ser Ser Pro Glu Gln Ser Leu Lys Ser Ala Ser
    370                 375                 380

Pro His Gly Ser Pro Gly Asn Thr Val Ser Pro Val Val Pro Gly Pro
385                 390                 395                 400
```

```
Pro Glu His Arg Asp Ser Tyr Ser Tyr Leu Asn Val Ser Tyr Gly Ser
                405                 410                 415

Glu Gly Leu Gly Ser Tyr Pro Gly Tyr Ala Pro Ala Pro His Leu Pro
            420                 425                 430

Pro Ala Phe Ile Pro Ser Tyr Asn Ala His Tyr Pro Lys Phe Leu Leu
        435                 440                 445

Pro Pro Tyr Gly Ile Ser Ser Asn Gly Leu Ser Thr Met Asn Asn Ile
    450                 455                 460

Asn Gly Ile Asn Asn Phe Ser Leu Phe Pro Arg Leu Tyr Pro Val Tyr
465                 470                 475                 480

Ser Asn Leu Leu Ser Gly Gly Asn Leu Pro His Pro Met Leu Asn Pro
                485                 490                 495

Ala Ser Leu Pro Ser Ser Leu Pro Thr Asp Gly Ala Arg Arg Leu Leu
            500                 505                 510

Pro Pro Glu His Pro Arg Glu Val Leu Val Pro Ala Pro His Ser Ala
        515                 520                 525

Phe Ser Leu Thr Gly Ala Ala Ala Ser Met Lys Asp Glu Ser Ser Pro
    530                 535                 540

Pro Ser Gly Ser Pro Thr Ala Gly Thr Ala Ala Thr Ser Glu His Val
545                 550                 555                 560

Val Gln Pro Lys Ala Thr Ser Ser Val Met Ala Ala Pro Ser Thr Asp
                565                 570                 575

Gly Ala Met Asn Leu Ile Lys Asn Lys Arg Asn Met Thr Gly Tyr Lys
            580                 585                 590

Thr Leu Pro Tyr Pro Leu Lys Lys Gln Asn Gly Lys Ile Lys Tyr Glu
        595                 600                 605

Cys Asn Val Cys Ala Lys Thr Phe Gly Gln Leu Ser Asn Leu Lys Val
    610                 615                 620

His Leu Arg Val His Ser Gly Glu Arg Pro Phe Lys Cys Gln Thr Cys
625                 630                 635                 640

Asn Lys Gly Phe Thr Gln Leu Ala His Leu Gln Lys His Tyr Leu Val
                645                 650                 655

His Thr Gly Glu Lys Pro His Glu Cys Gln Val Cys His Lys Arg Phe
            660                 665                 670

Ser Ser Thr Ser Asn Leu Lys Thr His Leu Arg Leu His Ser Gly Glu
        675                 680                 685

Lys Pro Tyr Gln Cys Lys Val Cys Pro Ala Lys Phe Thr Gln Phe Val
    690                 695                 700

His Leu Lys Leu His Lys Arg Leu His Thr Arg Asp Arg Pro His Lys
705                 710                 715                 720

Cys Ala Gln Cys His Lys Ser Tyr Ile His Leu Cys Ser Leu Lys Val
                725                 730                 735

His Leu Lys Gly Asn Cys Pro Val Val Pro Ala Pro Gly Leu Pro Leu
            740                 745                 750

Glu Asp Leu Thr Arg Ile Asn Glu Glu Ile Glu Arg Phe Asp Leu Ser
        755                 760                 765

Asp Asn Ala Asp Arg Leu Glu Asp Met Glu Asp Ser Val Asp Val Thr
    770                 775                 780

Ser Met Val Glu Lys Glu Ile Leu Ala Ile Val Arg Lys Glu Lys Glu
785                 790                 795                 800

Glu Thr Gly Leu Lys Met Ser Leu Gln Lys Thr Met Gly Ser Arg Leu
                805                 810                 815
```

```
Pro Ser Ser Gly Cys Ser Leu Tyr Glu Ser Ser Asp Leu Ser Leu Met
            820                 825                 830

Lys Leu Pro His Ser Asn Ser Leu Pro Leu Val Pro Val Lys Val Lys
        835                 840                 845

Gln Glu Thr Val Glu Pro Met Asp Pro
    850                 855


<210> SEQ ID NO 23
<211> LENGTH: 776
<212> TYPE: PRT
<213> ORGANISM: Danio rerio

<400> SEQUENCE: 23

Met Cys Gly Trp Asp Gln Ser Val Leu Ala Pro Tyr Gln Asn Ser Ala
1               5                   10                  15

Met Leu Thr Thr Glu Ala Ala Pro Tyr Thr Ala Asp Asn Glu Glu Leu
            20                  25                  30

Lys Met Asp Val Glu Asp Val Asp Met Thr Lys Trp Thr Glu Asp Glu
        35                  40                  45

Phe Glu Glu Lys Cys Thr Tyr Ile Val Lys Asp His Thr Trp Glu Gly
    50                  55                  60

Pro Leu Glu Asn Thr Asp Leu Thr Arg Ala Glu Ala Ser Leu Pro Arg
65                  70                  75                  80

Asn Leu Ala Phe Lys His Pro Ala Asp Ser Lys Glu Val Ile Gly Val
                85                  90                  95

Val Ser Arg Glu Tyr Ile Pro Lys Gly Thr Arg Phe Gly Pro Leu Val
            100                 105                 110

Gly Glu Ser Tyr Thr Ala Glu Asn Val Pro Lys Asp Ala Asn Arg Lys
        115                 120                 125

Tyr Phe Trp Arg Ile Tyr Ser Asp Gly Glu Phe His His Phe Val Asp
    130                 135                 140

Gly Leu Asp Glu Glu Lys Ser Asn Trp Met Arg Tyr Val Asn Pro Ala
145                 150                 155                 160

His Ser Gln Gln Glu Gln Asn Leu Ala Ala Cys Gln Asn Gly Met Asn
                165                 170                 175

Ile Tyr Phe Tyr Thr Val Lys Ala Ile Pro Ala Asp Gln Glu Leu Leu
            180                 185                 190

Val Trp Tyr Cys Pro Glu Phe Ala Arg Arg Leu Asn Tyr Pro Ala Ser
        195                 200                 205

Gly Glu Ile Met Met Gln Lys Leu Lys Gln Ser Leu Ile Glu Ala Lys
    210                 215                 220

Gln Gln Ala Thr Glu Val Lys His Pro Val Lys Arg Glu His Ser Val
225                 230                 235                 240

Ser Glu Ile Leu Lys Asp Val Leu Gln Glu Pro Ser Arg Pro Leu Pro
                245                 250                 255

Thr Arg Pro Arg Cys Pro Lys Ser Pro Asp Arg Pro Leu Tyr Pro Ser
            260                 265                 270

Ala Val Tyr Pro Pro Arg Pro Ser Leu Asn Glu Asp Phe Leu Lys Ser
        275                 280                 285

Thr Thr Val Phe Gly Leu Pro Thr Arg Ser His Thr Gln Cys Ser Val
    290                 295                 300

Thr Pro Ser Pro Ser Ala His Ser Ser Pro Glu Arg Ser Pro Gly Ser
305                 310                 315                 320

Ser Pro Thr Ser Ala Ser Ile Glu Pro Arg Glu Ala Phe Leu Pro Phe
                325                 330                 335
```

```
Ser Pro Ala Leu Tyr Asn Arg Gly Leu Asn His Tyr Pro Gly Tyr Ser
            340                 345                 350

Pro Ala Gly Ser Met Pro Phe Tyr Pro Asn Pro His Tyr Ser Arg Tyr
        355                 360                 365

Leu Met His His Tyr Pro Val Ser Ser Leu Ser Gly Pro Ser Thr Leu
    370                 375                 380

Gly Gly Ile Phe Pro His Met Tyr Pro Phe Tyr Ser Ser Leu Val Pro
385                 390                 395                 400

Pro His Val Pro Phe Pro Pro Ser Met Leu Ser Ser Glu Gly Ser Arg
                405                 410                 415

Gln Phe Met Leu Pro Pro Asp Ser Pro Ala Pro Arg Asp Ile Leu Leu
            420                 425                 430

Pro Ala Ala Thr Ser Ala Phe Ser Ala Ala Thr Ser Leu Lys Asp Lys
        435                 440                 445

Pro Leu His Gly His Gly His Pro Tyr Ala Pro Ala Gly Gly Ser Pro
    450                 455                 460

Thr Ala Gly Ser Ala Ala Ser Thr Gly Cys Ile Pro Thr Lys Pro Thr
465                 470                 475                 480

Ser Ala Ile Leu Ser Thr Ser Arg Ser Glu Asp Glu Ala Ile Asn Leu
                485                 490                 495

Ser Lys Met Lys Arg Gly Ser Thr Gly Tyr Lys Ser Leu Asp Tyr Pro
            500                 505                 510

Leu Lys Lys Gln Asn Gly Lys Ile Lys Tyr Glu Cys Asn Val Cys Thr
        515                 520                 525

Lys Thr Phe Gly Gln Leu Ser Asn Leu Lys Val His Leu Arg Val His
    530                 535                 540

Ser Gly Glu Arg Pro Phe Lys Cys Gln Thr Cys Asn Lys Gly Phe Thr
545                 550                 555                 560

Gln Leu Ala His Leu Gln Lys His Tyr Leu Val His Thr Gly Glu Lys
                565                 570                 575

Pro His Glu Cys Gln Val Cys His Lys Arg Phe Ser Ser Thr Ser Asn
            580                 585                 590

Leu Lys Thr His Leu Arg Leu His Ser Gly Glu Lys Pro Tyr Gln Cys
        595                 600                 605

Lys Ile Cys Pro Ala Lys Phe Thr Gln Phe Val His Leu Lys Leu His
    610                 615                 620

Lys Arg Leu His Thr Arg Glu Arg Pro His Gln Cys Pro His Cys His
625                 630                 635                 640

His Asn Tyr Ile His Leu Ser Ser Leu Arg Phe His Leu Lys Gly Tyr
                645                 650                 655

Cys Leu Ala Val Ser Pro Ser Pro Ser Cys Ser Leu Asp Glu Leu Asn
            660                 665                 670

Arg Val Asn Glu Glu Ile Glu Arg Phe Asp Ile Ser Asp Asn Ala Asp
        675                 680                 685

Arg Leu Glu Glu Met Glu Gly Phe Asp Val Glu Gly Met Val Glu Lys
    690                 695                 700

Gln Ile Phe Gly Leu Leu Trp Gln Glu Met Asp Phe Lys Ala Ser Tyr
705                 710                 715                 720

His Lys Gly Ser Thr Gly Gly Asp Leu His Pro Arg Ala Pro Ala Leu
                725                 730                 735

Ser Ala Tyr His Leu Asn Glu His Asp Ser Glu Ala Ser Val Ile Lys
            740                 745                 750
```

```
Val His Arg Ser Ser Pro Ile Gln Leu Leu Pro Ile Lys Val Lys Lys
        755                 760                 765

Glu Thr Glu Glu Ala Met Asp Thr
    770                 775


<210> SEQ ID NO 24
<211> LENGTH: 813
<212> TYPE: PRT
<213> ORGANISM: Gallus gallus

<400> SEQUENCE: 24

Met Lys Ala Ala Thr Arg Cys Ser Ser Asp Ala Val Ser Phe Lys Asn
1               5                   10                  15

Leu Val Lys Gly Arg Glu Trp Thr Met Lys Met Asp Met Glu Asp Ala
            20                  25                  30

Asp Met Thr Leu Trp Thr Glu Ala Asp Phe Glu Glu Lys Cys Thr Tyr
        35                  40                  45

Ile Val Asn Asp His Pro Trp Asp Pro Ser Ala Asp Gly Gly Thr Leu
    50                  55                  60

Thr Gln Ala Glu Ala Ser Leu Pro Arg Asn Leu Thr Phe Lys Tyr Ala
65                  70                  75                  80

Ser Asn Cys Lys Glu Val Thr Gly Val Ile Ser Lys Glu Tyr Ile Pro
                85                  90                  95

Lys Gly Thr Arg Phe Gly Pro Leu Val Gly Glu Ile Tyr Thr Ser Asp
            100                 105                 110

Thr Val Pro Lys Asn Ala Asn Arg Lys Tyr Phe Trp Arg Ile Tyr Ser
        115                 120                 125

Ser Gly Glu Leu His His Phe Ile Asp Gly Phe Asn Glu Asp Lys Ser
    130                 135                 140

Asn Trp Met Arg Tyr Val Asn Pro Gly Tyr Ser Val Gln Glu Gln Asn
145                 150                 155                 160

Leu Ala Ala Cys Gln Asn Gly Met Asn Ile Tyr Phe Tyr Thr Ile Lys
                165                 170                 175

Pro Ile Pro Ala Asn Gln Glu Leu Leu Val Trp Tyr Cys Arg Asp Phe
            180                 185                 190

Ala Glu Arg Leu His Tyr Pro Ser Ser Arg Glu Leu Thr Met Met Asn
        195                 200                 205

Leu Thr Gln Thr His Val Asn Pro Lys Gln His Ser Ala Asp Lys Asp
    210                 215                 220

Glu Leu Tyr Gln Lys Ser Val Pro Lys Lys Glu His Ser Val Lys Glu
225                 230                 235                 240

Ile Leu Lys Met Glu Ser Ser Pro Pro Lys Gly Lys Asp Phe Phe Gln
                245                 250                 255

Thr Asn Ile Ser Pro Val Thr Pro Glu Lys Asp Leu Asp Asp Leu Arg
            260                 265                 270

Lys Asn Tyr Ser Pro Glu Arg Cys Phe Phe Pro Arg Val Val Tyr Pro
        275                 280                 285

Ile Arg Pro His Ile Pro Glu Asp Tyr Leu Lys Ala Ser Leu Ala Tyr
    290                 295                 300

Gly Met Asp Arg Pro Ser Tyr Ile Thr His Ser Pro Ile Gln Ser Ser
305                 310                 315                 320

Thr Thr Pro Ser Pro Ser Gly Arg Ser Ser Pro Asp Gln Ser Leu Lys
                325                 330                 335

Ser Ser Ser Pro His Ser Ser Pro Gly Val Thr Val Ser Pro Leu Ala
            340                 345                 350
```

Pro Thr Ser Gln Glu His Arg Glu Ser Tyr Ser Tyr Leu Asn Gly Ser
355 360 365

Tyr Gly Ser Glu Gly Leu Gly Ser Tyr Pro Gly Tyr Ala Pro Pro Ser
370 375 380

His Leu Pro Ser Ala Phe Leu Pro Ser Tyr Asn Pro His Tyr Pro Lys
385 390 395 400

Phe Leu Leu Pro Pro Phe Asn Met Ser Cys Asn Asn Leu Ser Ala Leu
405 410 415

Asn Asn Ile Asn Gly Ile Asn Asn Phe Asn Leu Phe Pro Arg Met Tyr
420 425 430

Pro Leu Tyr Gly Asn Leu Leu Ser Gly Gly Ser Leu Ser His His Met
435 440 445

Leu Asn Pro Thr Thr Leu Pro Ser Ser Leu Pro Ser Glu Gly Gly Arg
450 455 460

Arg Leu Leu Gln Pro Asp His Pro Arg Asp Phe Leu Ile Pro Ala Pro
465 470 475 480

Asn Ser Ala Phe Ser Ile Thr Gly Ala Ala Ala Ser Met Lys Asp Lys
485 490 495

Pro Cys Ser Pro Thr Ser Gly Ser Pro Thr Ala Gly Thr Ala Ala Ser
500 505 510

Ser Glu His Ile Met Gln Pro Lys Pro Thr Ser Val Val Leu Ala Ala
515 520 525

Thr Gly Gly Glu Glu Ala Met Asn Leu Ile Lys Ser Lys Arg Asn Val
530 535 540

Thr Gly Tyr Lys Thr Leu Pro Tyr Pro Leu Lys Lys Gln Asn Gly Lys
545 550 555 560

Ile Lys Tyr Glu Cys Asn Val Cys Ser Lys Thr Phe Gly Gln Leu Ser
565 570 575

Asn Leu Lys Val His Leu Arg Val His Ser Gly Glu Arg Pro Phe Lys
580 585 590

Cys Gln Thr Cys Asn Lys Gly Phe Thr Gln Leu Ala His Leu Gln Lys
595 600 605

His Tyr Leu Val His Thr Gly Glu Lys Pro His Glu Cys Gln Val Cys
610 615 620

His Lys Arg Phe Ser Ser Thr Ser Asn Leu Lys Thr His Leu Arg Leu
625 630 635 640

His Ser Gly Glu Lys Pro Tyr Gln Cys Lys Leu Cys Pro Ala Lys Phe
645 650 655

Thr Gln Phe Val His Leu Lys Leu His Lys Arg Leu His Thr Arg Glu
660 665 670

Arg Pro His Lys Cys Ile His Cys His Lys Ser Tyr Ile His Leu Cys
675 680 685

Ser Leu Gln Val His Leu Lys Gly Asn Cys Pro Val Ala Pro Ala Ser
690 695 700

Gly Leu Ser Met Glu Asp Leu Asn Arg Ile Asn Glu Glu Ile Glu Lys
705 710 715 720

Phe Asp Ile Ser Asp Asn Ala Asp Lys Leu Glu Glu Val Glu Asp Asn
725 730 735

Ile Asp Leu Thr Ser Ile Val Glu Lys Asp Ile Leu Thr Val Leu Arg
740 745 750

Arg Glu Met Glu Gly Ala Asn Leu Lys Val Ser Leu Gln Arg Asn Leu
755 760 765

Gly Asn Gly Leu Ile Ser Ser Gly Cys Asn Leu Tyr Glu Ser Ser Asp
770 775 780

Met Ser Ile Met Lys Leu Pro His Ser His Pro Leu Pro Leu Leu Pro
785 790 795 800

Val Lys Val Lys Gln Glu Thr Val Glu Pro Met Asp Pro
805 810

<210> SEQ ID NO 25
<211> LENGTH: 822
<212> TYPE: PRT
<213> ORGANISM: Canis lupus familiaris

<400> SEQUENCE: 25

Met Arg Asp Leu Cys Ser Glu Thr Arg Ala Gly Thr Pro Ser Ala Ala
1 5 10 15

Pro Lys Cys Ser Ser Ser Ala Val Arg Ser Pro Arg Leu Ser Asp Gly
20 25 30

Thr Met Lys Met Asp Met Glu Asp Ala Asp Met Thr Leu Trp Thr Glu
35 40 45

Ala Glu Phe Glu Glu Lys Cys Thr Tyr Ile Val Asn Asp His Pro Trp
50 55 60

Asp Cys Gly Ala Asp Gly Gly Ala Ser Val Gln Ala Glu Ala Ser Leu
65 70 75 80

Pro Arg Asn Leu Leu Phe Lys Tyr Gly Pro Ser Ser Lys Glu Val Ile
85 90 95

Gly Val Val Ser Lys Glu Tyr Ile Pro Lys Gly Thr Arg Phe Gly Pro
100 105 110

Leu Ile Gly Glu Ile Tyr Thr Asn Asp Thr Val Pro Lys Asn Ala Asn
115 120 125

Arg Ile Tyr Phe Trp Arg Ile Tyr Ser Arg Gly Glu Leu Leu His Phe
130 135 140

Ile Asp Gly Phe Asn Glu Glu Lys Ser Asn Trp Met Arg Tyr Val Asn
145 150 155 160

Pro Ala Arg Ser Ala Arg Glu Gln Asn Leu Ala Ala Cys Gln Asn Gly
165 170 175

Met Asn Ile Tyr Phe Tyr Thr Ile Lys Pro Ile Pro Ala Asn Gln Glu
180 185 190

Leu Leu Val Trp Tyr Cys Arg Asp Phe Ala Glu Arg Leu His Tyr Pro
195 200 205

Tyr Pro Gly Glu Leu Thr Met Met Ser Leu Thr Gln Thr Gln Ser His
210 215 220

Pro Lys Gln Pro Gly Ala Glu Lys Asn Asp Leu Cys Pro Lys Asn Ala
225 230 235 240

Pro Lys Arg Glu Tyr Ser Val Lys Glu Ile Leu Lys Leu Asp Ser His
245 250 255

Pro Pro Arg Gly Lys Asp Cys Tyr Arg Ser Asn Ile Ser Pro Phe Ala
260 265 270

Ala Glu Arg Asp Ala Asp Asp Leu Gly Lys Asn Gly Ser Pro Glu Met
275 280 285

Pro Phe Tyr Pro Arg Ala Val Tyr Pro Ser Arg Val Pro Leu Pro Glu
290 295 300

Asp Phe Leu Lys Ala Tyr Gly Met Glu Arg Pro Thr Tyr Ile Ala Arg
305 310 315 320

Ser Pro Leu Pro Ser Ser Thr Thr Pro Ser Pro Ser Ala Arg Ser Ser
325 330 335

```
Pro Asp Gln Ser Leu Gln Ser Cys Ser Pro His Ser Ser Pro Gly Asp
            340                 345                 350

Thr Val Ser Pro Leu Ala Pro Cys Gly Pro Asp His Arg Asp Ser Tyr
        355                 360                 365

Ala Tyr Leu Asn Ala Pro Tyr Gly Pro Glu Gly Leu Gly Ala Tyr Pro
    370                 375                 380

Gly Phe Ala Pro Gly Pro Pro Leu Pro Pro Ala Phe Leu Pro Ser Tyr
385                 390                 395                 400

Asn Ala His Tyr Pro Lys Phe Leu Leu Pro Pro Tyr Gly Val Gly Cys
                405                 410                 415

Pro Gly Leu Gly Gly Val Gly Gly Val Gly Gly Leu Ser Leu Phe Pro
            420                 425                 430

Arg Leu Tyr Pro Val Tyr Gly Gly Leu Leu Gly Gly Gly Gly Gly Gly
        435                 440                 445

Gly Gly Gly Gly Gly Gly Leu Pro His Pro Leu Leu Gly Pro Ala Ser
    450                 455                 460

Leu Pro Gly Ser Leu Pro Ser Asp Ala Ala Arg Arg Pro Leu Gln Pro
465                 470                 475                 480

Asp His Ala Arg Gln Val Leu Ile Pro Ala Pro His Ser Ala Phe Ser
                485                 490                 495

Leu Pro Ala Ala Ala Ala Ser Met Lys Asp Arg Ala Ser Ser Pro Ala
            500                 505                 510

Ser Gly Ser Pro Thr Ala Gly Thr Ala Ala Ser Ala Glu His Val Val
        515                 520                 525

Gln Pro His Ala Thr Ser Ala Ala Leu Ala Ala Pro Gly Gly Asp Glu
    530                 535                 540

Ala Val Asn Leu Met Lys Ser Lys Arg Asn Met Thr Gly Tyr Lys Thr
545                 550                 555                 560

Leu Pro Tyr Pro Leu Lys Lys Gln Asn Gly Lys Ile Lys Tyr Glu Cys
                565                 570                 575

Asn Val Cys Ala Lys Thr Phe Gly Gln Leu Ser Asn Leu Lys Val His
            580                 585                 590

Leu Arg Val His Ser Gly Glu Arg Pro Phe Lys Cys Gln Thr Cys Asn
        595                 600                 605

Lys Gly Phe Thr Gln Leu Ala His Leu Gln Lys His Tyr Leu Val His
    610                 615                 620

Thr Gly Glu Lys Pro His Glu Cys Gln Val Cys His Lys Arg Phe Ser
625                 630                 635                 640

Ser Thr Ser Asn Leu Lys Thr His Leu Arg Leu His Ser Gly Glu Lys
                645                 650                 655

Pro Tyr Gln Cys Lys Val Cys Pro Ala Lys Phe Thr Gln Phe Val His
            660                 665                 670

Leu Lys Leu His Lys Arg Leu His Thr Arg Glu Arg Pro His Lys Cys
        675                 680                 685

Ala His Cys His Lys Ser Tyr Ile His Leu Cys Ser Leu Lys Val His
    690                 695                 700

Leu Lys Gly Asn Cys Pro Val Ala Pro Ala Thr Gly Met Pro Leu Glu
705                 710                 715                 720

Asp Leu Thr Arg Ile Asn Glu Glu Ile Glu Lys Phe Asp Ile Ser Asp
                725                 730                 735

Asn Ala Asp Arg Leu Glu Asp Met Glu Asp Ile Asp Val Thr Ser Val
            740                 745                 750
```

Val Glu Lys Glu Ile Leu Ala Val Val Arg Lys Glu Lys Glu Glu Thr
755 760 765

Gly Leu Lys Val Ser Leu Gln Arg Asn Met Gly Asn Gly Leu Leu Ser
770 775 780

Gly Cys Ser Leu Tyr Glu Ser Ser Asp Pro Ser Leu Met Lys Leu Ala
785 790 795 800

His Ser Asn Pro Leu Pro Leu Gly Pro Val Lys Val Lys Gln Glu Thr
805 810 815

Val Glu Pro Met Asp Pro
820

<210> SEQ ID NO 26
<211> LENGTH: 784
<212> TYPE: PRT
<213> ORGANISM: Xenopus tropicalis

<400> SEQUENCE: 26

Met Lys Met Asp Met Glu Gly Ile Asp Met Thr Leu Trp Ser Glu Thr
1 5 10 15

Glu Phe Glu Glu Lys Cys Thr Tyr Ile Val Lys Asp His Ser Ser Asp
20 25 30

Ser Ser Ser Glu Gly Ser Asn Val Ala Gln Ala Gln Ala Ser Leu Pro
35 40 45

Arg Asn Leu Leu Phe Lys Tyr Ala Ser Gly Cys Lys Glu Val Ile Gly
50 55 60

Val Val Ser Lys Glu Tyr Ile Pro Lys Gly Thr Arg Phe Gly Pro Leu
65 70 75 80

Val Gly Glu Ile Tyr Thr Asn Asp Thr Val Pro Lys Asn Ala Asn Arg
85 90 95

Lys Tyr Phe Trp Arg Ile Tyr Ser Asn Gly Glu Phe Gln His Phe Ile
100 105 110

Asp Gly Tyr Asn Glu Asp Lys Ser Asn Trp Met Arg Tyr Val Asn Pro
115 120 125

Ala His Ser Leu Gln Glu Gln Asn Leu Ala Ala Cys Gln Asn Gly Met
130 135 140

Asn Ile Tyr Phe Tyr Thr Ile Lys Pro Ile Pro Ala Asn Gln Glu Leu
145 150 155 160

Leu Val Trp Tyr Cys Arg Asp Phe Ala Asp Arg Leu His Tyr Pro Thr
165 170 175

Ser Gly Glu Leu Val Val Asn Leu Gln Gln Ser Leu Thr Ile Arg Glu
180 185 190

Glu Lys Arg Lys Glu Leu Thr Gln Gln Lys Asn Thr Pro Lys Lys Glu
195 200 205

His Ser Val Lys Glu Ile Leu Arg Asp Thr Thr Ser His Leu Lys His
210 215 220

Lys Asp Asn Leu Leu Ser Ser Met Ser Ala Ile Thr Pro Glu Lys Glu
225 230 235 240

Lys Val Asp Val His Lys Asn Cys Ser Pro Glu Arg Thr Phe Phe Pro
245 250 255

Arg Val Val Tyr Pro Phe Pro Ser His Ile His Glu Asp Tyr Leu Lys
260 265 270

Ala Ser Val Gly Tyr Asn Met Asp Arg Gln Asn Tyr Leu Met His Ser
275 280 285

Pro Ile Gln Pro Ser Thr Thr Pro Ser Pro Ser Ser Arg Ser Ser Pro
290 295 300

```
Asp Gln Ser Phe Lys Ser Ser Ser Pro His Ser Ser Pro Gly Ser Ala
305                 310                 315                 320

Val Ser Pro His His Pro Leu Gln Asp His Lys Glu Phe Tyr Pro Phe
                325                 330                 335

Ile Asn Arg Pro Tyr Asn Thr Glu Gly Leu Gly Ser Phe Pro Thr Tyr
            340                 345                 350

Ala Pro Pro Thr Ser His Leu Pro Pro Phe Val Ser Ser Tyr Asn Ser
        355                 360                 365

Thr Tyr Ser Lys Tyr Leu Leu Pro Pro Tyr Gly Ile Gly Cys Asn Gly
    370                 375                 380

Leu Asn Ser Leu Asn Asn Ile Asn Ala Ile Asn Asn Phe Asn Pro Phe
385                 390                 395                 400

Ser Arg Met Tyr Pro Val Tyr Ser Ser Met Leu Ala Gly Gly Ser Leu
                405                 410                 415

Pro His His Leu Leu Thr His Ala Ala Leu Pro Gly Ser Leu Pro His
            420                 425                 430

Glu Gly Gly Arg Arg Leu Leu Gln Pro Glu Leu Pro Arg Asp Phe Leu
        435                 440                 445

Ile Pro Ala Pro Asn Ser Ala Phe Ser Ile Thr Gly Ala Ala Ala Ser
    450                 455                 460

Met Lys Asp Lys Gln Ser Ser Pro Thr Ser Gly Ser Pro Thr Ala Gly
465                 470                 475                 480

Thr Ala Ala Ser Leu Glu His Ile Met Gln Pro Lys Pro Thr Ser Ala
                485                 490                 495

Val Met Ser Thr Ser Ser Glu Glu Ala Ile Asn Leu Ile Lys Ser Lys
            500                 505                 510

Arg Asn Met Thr Gly Tyr Lys Thr Leu Pro Tyr Pro Leu Lys Lys Gln
        515                 520                 525

Asn Gly Lys Ile Lys Tyr Glu Cys Asn Val Cys Ser Lys Thr Phe Gly
    530                 535                 540

Gln Leu Ser Asn Leu Lys Val His Leu Arg Val His Ser Gly Glu Arg
545                 550                 555                 560

Pro Phe Lys Cys Gln Thr Cys Asn Lys Gly Phe Thr Gln Leu Ala His
                565                 570                 575

Leu Gln Lys His Phe Leu Val His Thr Gly Glu Lys Pro His Glu Cys
            580                 585                 590

Gln Val Cys His Lys Arg Phe Ser Ser Thr Ser Asn Leu Lys Thr His
        595                 600                 605

Leu Arg Leu His Ser Gly Glu Lys Pro Tyr Gln Cys Lys Leu Cys Pro
    610                 615                 620

Ala Lys Phe Thr Gln Phe Val His Leu Lys Leu His Lys Arg Leu His
625                 630                 635                 640

Thr Arg Glu Arg Pro His Lys Cys Ile His Cys His Lys Ser Tyr Ile
                645                 650                 655

His Leu Cys Ser Leu Asn Phe His Met Lys Gly Asn Cys Pro Val Ser
            660                 665                 670

Pro Arg Leu Gly Val Ser Arg Glu Asp Leu Asn Arg Met Asn Glu Glu
        675                 680                 685

Ile Glu Lys Phe Asp Ile Ser Asp Ser Ala Asp Arg Leu Asp Asp Met
    690                 695                 700

Glu Asp Met Asp Met Ser Pro Ala Val Glu Lys Glu Ile Met Thr Leu
705                 710                 715                 720
```

```
Leu Arg Arg Glu Ile Asp Gly Ala Ser Met Lys Met Ser Val Ser Arg
            725                 730                 735

Asn Val Gly Asn Asn Gly Leu Leu Thr Ser Gly Cys Asn Phe Tyr Asp
            740                 745                 750

Arg Ser Asp Ala Val Val Thr Lys Leu Pro Leu Ser Ser Pro Leu Pro
        755                 760                 765

Leu Leu Pro Val Lys Val Lys Gln Glu Ser Ile Asp Gln Met Asp Ser
    770                 775                 780
```

<210> SEQ ID NO 27
<211> LENGTH: 828
<212> TYPE: PRT
<213> ORGANISM: Bos taurus

<400> SEQUENCE: 27

```
Met Leu Asp Ile Cys Leu Glu Lys Arg Val Gly Thr Thr Leu Ala Ala
1               5                   10                  15

Pro Lys Cys Ser Ser Ser Ala Val Lys Val Pro Gly Leu Ala Glu Gly
            20                  25                  30

Thr Glu Gly Thr Met Lys Met Asp Met Glu Asp Ala Asp Met Thr Leu
        35                  40                  45

Trp Thr Glu Ala Glu Phe Glu Glu Lys Cys Thr Tyr Ile Val Asn Asp
    50                  55                  60

His Pro Trp Asp Ser Gly Val Glu Gly Gly Thr Ser Val Gln Ala Glu
65                  70                  75                  80

Ala Ser Leu Pro Arg Asn Leu Leu Phe Lys Tyr Ala Thr Asn Ser Lys
                85                  90                  95

Glu Ile Thr Gly Val Val Ser Lys Glu Tyr Ile Pro Lys Gly Thr Arg
            100                 105                 110

Phe Gly Pro Leu Ile Gly Glu Ile Tyr Thr Ser Asp Ala Val Pro Lys
        115                 120                 125

Asn Ala Asn Arg Lys Tyr Phe Trp Arg Ile Tyr Ser Arg Gly Glu Leu
    130                 135                 140

His His Phe Ile Asp Gly Phe Asn Glu Glu Lys Ser Asn Trp Leu Arg
145                 150                 155                 160

Tyr Val Asn Pro Ala His Thr Ala Arg Glu Gln Asn Leu Ala Ala Cys
                165                 170                 175

Gln Asn Gly Met Asn Ile Tyr Phe Tyr Thr Ile Lys Pro Ile Pro Ala
            180                 185                 190

Asn Gln Glu Leu Leu Val Trp Tyr Cys Arg Asp Phe Ala Glu Arg Leu
        195                 200                 205

His Tyr Pro Tyr Ser Gly Glu Leu Thr Met Met Asn Leu Thr Gln Thr
    210                 215                 220

Gln Ser Arg Pro Lys Gln Gln Ser Thr Glu Lys His Glu Leu Cys Pro
225                 230                 235                 240

Lys Ser Val Pro Lys Arg Glu Tyr Ser Val Lys Glu Ile Leu Lys Leu
                245                 250                 255

Asp Ser His Pro Ser Lys Gly Lys Asp Leu Tyr Arg Ser Asn Ile Ser
            260                 265                 270

Pro Leu Thr Ser Glu Lys Asp Ala Glu Asp Phe Arg Lys Asn Gly Ser
        275                 280                 285

Pro Glu Met Pro Phe Tyr Pro Arg Val Val Tyr Pro Ile Arg Ala Pro
    290                 295                 300

Leu Pro Glu Asp Phe Leu Lys Ala Pro Leu Gly Cys Tyr Gly Met Glu
305                 310                 315                 320
```

```
Arg Pro Pro Tyr Ile Thr His Ser Pro Ile Ser Ser Ser Thr Thr Pro
                325                 330                 335

Ser Pro Ser Ala Arg Ser Ser Pro Asp Arg Ser Leu Gln Ser Cys Ser
            340                 345                 350

Pro His Ser Ser Pro Gly Asn Thr Val Ser Pro Arg Ala Pro Gly Pro
        355                 360                 365

Gln Glu Ala Arg Asp Ser Tyr Ala Tyr Leu Asn Ala Pro Tyr Gly Ala
    370                 375                 380

Ala Ala Glu Gly Leu Gly Ser Leu Ala Gly Tyr Gly Pro Pro Thr His
385                 390                 395                 400

Leu Pro Pro Ala Phe Ile Pro Ser Tyr Asn Ala His Tyr Pro Lys Phe
                405                 410                 415

Leu Leu Pro Pro Tyr Gly Met Asn Cys Asn Gly Leu Gly Ala Ala Val
            420                 425                 430

Ser Asn Ile Asn Gly Leu Asn Ser Phe Gly Leu Phe Pro Arg Leu Tyr
        435                 440                 445

Pro Val Tyr Ser Ser Leu Leu Gly Gly Gly Gly Leu Pro Pro Pro Val
    450                 455                 460

Leu Ala Ser Ala Ser Leu Pro Ser Ser Leu Pro Ser Glu Gly Ala Arg
465                 470                 475                 480

Arg Leu Leu Gln Pro Glu His Pro Arg Glu Val Leu Val Pro Ala Pro
                485                 490                 495

His Ser Ala Phe Ser Leu Pro Gly Ala Ala Ala Ser Leu Lys Asp Lys
            500                 505                 510

Ala Cys Thr Pro Thr Ser Gly Ser Pro Thr Ala Gly Thr Ala Ala Thr
        515                 520                 525

Ala Glu His Val Val Gln Pro Lys Ala Thr Ser Ala Ala Ala Ala Ala
    530                 535                 540

Pro Gly Gly Glu Glu Ala Val Asn Leu Ile Lys Asn Lys Arg Asn Met
545                 550                 555                 560

Thr Gly Tyr Lys Thr Leu Pro Tyr Pro Leu Lys Lys Gln Asn Gly Lys
                565                 570                 575

Ile Lys Tyr Glu Cys Asn Val Cys Ala Lys Thr Phe Gly Gln Leu Ser
            580                 585                 590

Asn Leu Lys Val His Leu Arg Val His Ser Gly Glu Arg Pro Phe Lys
        595                 600                 605

Cys Gln Thr Cys Asn Lys Gly Phe Thr Gln Leu Ala His Leu Gln Lys
    610                 615                 620

His Tyr Leu Val His Thr Gly Glu Lys Pro His Glu Cys Gln Val Cys
625                 630                 635                 640

His Lys Arg Phe Ser Ser Thr Ser Asn Leu Lys Thr His Leu Arg Leu
                645                 650                 655

His Ser Gly Glu Lys Pro Tyr Gln Cys Lys Val Cys Pro Ala Lys Phe
            660                 665                 670

Thr Gln Phe Val His Leu Lys Leu His Lys Arg Leu His Thr Arg Glu
        675                 680                 685

Arg Pro His Lys Cys Ala His Cys His Lys Ser Tyr Ile His Phe Cys
    690                 695                 700

Ser Leu Lys Val His Leu Lys Gly His Cys Pro Val Ala Pro Ala Thr
705                 710                 715                 720

Gly Leu Pro Leu Glu Asp Leu Ala Arg Ile Asn Glu Glu Ile Glu Lys
                725                 730                 735
```

```
Phe Asp Ile Ser Asp Asn Ala Asp Arg Leu Glu Asp Met Glu Asp Asn
            740                 745                 750

Ile Asp Met Thr Ser Val Val Glu Asn Glu Ile Leu Ala Val Val Arg
        755                 760                 765

Lys Glu Lys Glu Glu Thr Gly Leu Lys Ala Ser Leu Gln Arg Asn Leu
    770                 775                 780

Gly Asn Gly Leu Leu Ser Gly Tyr Asn Leu Tyr Glu Ser Thr Glu Pro
785                 790                 795                 800

Ser Leu Leu Lys Leu Pro His Ser Asn Pro Leu Pro Leu Gly Pro Val
                805                 810                 815

Lys Val Lys Glu Glu Thr Val Glu Pro Met Asp Pro
            820                 825
```

<210> SEQ ID NO 28
<211> LENGTH: 825
<212> TYPE: PRT
<213> ORGANISM: Macaca mulatta

<400> SEQUENCE: 28

```
Met Leu Asp Ile Cys Leu Glu Lys Arg Val Gly Thr Thr Leu Ala Ala
1               5                   10                  15

Pro Lys Cys Ser Ser Ser Thr Val Arg Phe Gln Gly Leu Ala Glu Gly
            20                  25                  30

Thr Lys Gly Thr Met Lys Met Asp Met Glu Asp Ala Asp Met Thr Leu
        35                  40                  45

Trp Thr Glu Ala Glu Phe Glu Glu Lys Cys Thr Tyr Ile Val Asn Asp
    50                  55                  60

His Pro Trp Asp Ser Gly Ala Asp Gly Gly Thr Ser Val Gln Ala Glu
65                  70                  75                  80

Ala Ser Leu Pro Arg Asn Leu Leu Phe Lys Tyr Ala Thr Asn Ser Arg
                85                  90                  95

Glu Val Ile Gly Val Met Ser Lys Glu Tyr Ile Pro Lys Gly Thr Arg
            100                 105                 110

Phe Gly Pro Leu Ile Gly Glu Ile Tyr Thr Asn Asp Thr Val Pro Lys
        115                 120                 125

Asn Ala Asn Arg Lys Tyr Phe Trp Arg Ile Tyr Ser Arg Gly Glu Leu
    130                 135                 140

His His Phe Ile Asp Gly Phe Asn Glu Glu Lys Ser Asn Trp Met Arg
145                 150                 155                 160

Tyr Val Asn Pro Ala His Ser Pro Arg Glu Gln Asn Leu Ala Ala Cys
                165                 170                 175

Gln Asn Gly Met Asn Ile Tyr Phe Tyr Thr Ile Lys Pro Ile Pro Ala
            180                 185                 190

Asn Gln Glu Leu Leu Val Trp Tyr Cys Arg Asp Phe Ala Glu Arg Leu
        195                 200                 205

His Tyr Pro Tyr Pro Gly Glu Leu Thr Met Met Asn Leu Thr Gln Thr
    210                 215                 220

Gln Ser Asn Leu Lys Gln Pro Ser Thr Glu Lys Asn Glu Leu Cys Pro
225                 230                 235                 240

Lys Asn Val Pro Lys Arg Glu His Ser Val Lys Glu Ile Leu Lys Leu
                245                 250                 255

Asp Ser Asn Pro Ser Lys Gly Lys Asp Leu Tyr Arg Ser Asn Ile Ser
            260                 265                 270

Pro Leu Thr Ser Glu Lys Asp Leu Asp Asp Phe Arg Arg His Gly Ser
        275                 280                 285
```

Pro Glu Met Pro Phe Tyr Pro Arg Val Val Tyr Pro Ile Arg Ala Pro
290 295 300

Leu Pro Glu Asp Phe Leu Lys Ala Ser Leu Ala Tyr Gly Met Glu Arg
305 310 315 320

Pro Thr Tyr Ile Thr Arg Ser Pro Ile Pro Ser Ser Thr Thr Pro Ser
325 330 335

Pro Ser Ala Arg Ser Ser Pro Asp Gln Ser Leu Lys Ser Ser Ser Pro
340 345 350

His Ser Ser Pro Gly Asn Thr Val Ser Pro Val Gly Pro Gly Ser Gln
355 360 365

Glu His Arg Asp Ser Tyr Ala Tyr Leu Asn Ala Pro Tyr Gly Thr Glu
370 375 380

Gly Leu Gly Ser Tyr Pro Gly Tyr Ala Pro Leu Pro His Leu Pro Pro
385 390 395 400

Ala Phe Ile Pro Ser Tyr Asn Ala His Tyr Pro Lys Phe Leu Leu Pro
405 410 415

Pro Tyr Gly Met Asn Cys Asn Gly Leu Ser Ala Val Ser Ser Met Asn
420 425 430

Gly Ile Asn Asn Phe Gly Leu Phe Pro Arg Leu Cys Pro Val Tyr Ser
435 440 445

Asn Leu Leu Gly Gly Gly Ser Leu Pro His Pro Met Leu Asn Pro Thr
450 455 460

Ser Leu Pro Ser Ser Leu Pro Ser Asp Gly Ala Arg Arg Leu Leu Gln
465 470 475 480

Pro Glu His Pro Arg Glu Val Leu Val Pro Ala Pro His Ser Ala Phe
485 490 495

Ser Leu Thr Gly Ala Ala Ala Ser Met Lys Asp Lys Ala Cys Ser Pro
500 505 510

Thr Ser Gly Ser Pro Thr Ala Gly Thr Ala Ala Thr Ala Glu His Val
515 520 525

Val Gln Pro Lys Ala Thr Ser Ala Ala Met Ala Ala Pro Ser Ser Asp
530 535 540

Glu Ala Met Asn Leu Ile Lys Asn Lys Arg Asn Met Thr Gly Tyr Lys
545 550 555 560

Thr Leu Pro Tyr Pro Leu Lys Lys Gln Asn Gly Lys Ile Lys Tyr Glu
565 570 575

Cys Asn Val Cys Ala Lys Thr Phe Gly Gln Leu Ser Asn Leu Lys Val
580 585 590

His Leu Arg Val His Ser Gly Glu Arg Pro Phe Lys Cys Gln Thr Cys
595 600 605

Asn Lys Gly Phe Thr Gln Leu Ala His Leu Gln Lys His Tyr Leu Val
610 615 620

His Thr Gly Glu Lys Pro His Glu Cys Gln Val Cys His Lys Arg Phe
625 630 635 640

Ser Ser Thr Ser Asn Leu Lys Thr His Leu Arg Leu His Ser Gly Glu
645 650 655

Lys Pro Tyr Gln Cys Lys Val Cys Pro Ala Lys Phe Thr Gln Phe Val
660 665 670

His Leu Lys Leu His Lys Arg Leu His Thr Arg Glu Arg Pro His Lys
675 680 685

Cys Ser Gln Cys His Lys Asn Tyr Ile His Leu Cys Ser Leu Lys Val
690 695 700

```
His Leu Lys Gly Asn Cys Ala Ala Ala Pro Ala Pro Gly Leu Pro Leu
705                 710                 715                 720

Glu Asp Leu Thr Arg Ile Asn Glu Glu Ile Glu Lys Phe Asp Ile Ser
                725                 730                 735

Asp Asn Ala Asp Arg Leu Glu Asp Val Glu Asp Asp Ile Ser Val Ile
            740                 745                 750

Ser Val Val Glu Lys Glu Ile Leu Ala Val Val Arg Lys Glu Lys Glu
        755                 760                 765

Glu Thr Gly Leu Lys Val Ser Leu Gln Arg Asn Met Gly Asn Gly Leu
    770                 775                 780

Leu Ser Ser Gly Cys Ser Leu Tyr Glu Ser Ser Asp Leu Pro Leu Met
785                 790                 795                 800

Lys Leu Pro Pro Ser Asn Pro Leu Pro Leu Val Pro Val Lys Val Lys
                805                 810                 815

Gln Glu Thr Val Glu Pro Met Asp Pro
            820                 825


<210> SEQ ID NO 29
<211> LENGTH: 821
<212> TYPE: PRT
<213> ORGANISM: Camelus ferus

<400> SEQUENCE: 29

Met Leu Asp Ile Cys Leu Glu Lys Arg Val Gly Thr Thr Leu Ala Ala
1               5                   10                  15

Pro Lys Cys Ser Ser Ser Ala Val Lys Phe Pro Gly Leu Ala Glu Gly
            20                  25                  30

Thr Met Lys Met Asp Met Glu Asp Thr Asp Met Thr Leu Trp Thr Glu
        35                  40                  45

Ala Glu Phe Glu Glu Lys Cys Thr Tyr Ile Val Asn Asp His Pro Trp
    50                  55                  60

Asp Ser Gly Ala Asp Gly Gly Thr Ser Val Gln Ala Glu Ala Ser Leu
65                  70                  75                  80

Pro Arg Asn Leu Leu Phe Lys Tyr Ala Thr Asn Ser Lys Glu Val Ile
                85                  90                  95

Gly Val Val Ser Lys Glu Tyr Ile Pro Lys Gly Thr Arg Phe Gly Pro
            100                 105                 110

Leu Ile Gly Glu Ile Tyr Thr Asn Asp Thr Val Pro Lys Asn Ala Asn
        115                 120                 125

Arg Gln Tyr Phe Trp Arg Ile Tyr Cys Gly Gly Glu Leu His His Phe
    130                 135                 140

Ile Asp Gly Phe Asn Glu Glu Lys Ser Asn Trp Leu Arg Tyr Val Asn
145                 150                 155                 160

Pro Ala His Ser Ala Arg Glu Gln Asn Leu Ala Ala Cys Gln Asn Gly
                165                 170                 175

Met Asn Ile Tyr Phe Tyr Thr Ile Lys Pro Ile Pro Ala Asn Gln Glu
            180                 185                 190

Leu Leu Val Trp Tyr Cys Arg Asp Phe Ala Glu Arg Leu His His Pro
        195                 200                 205

Tyr Pro Gly Glu Leu Thr Met Met Asn Leu Thr Gln Thr Gln Ser His
    210                 215                 220

Pro Lys Gln Gln Ser Thr Glu Lys His Asp Leu Cys Pro Lys Asn Gly
225                 230                 235                 240

Pro Lys Arg Glu Tyr Ser Val Lys Glu Ile Leu Lys Leu Asp Ser His
                245                 250                 255
```

```
Pro Tyr Lys Gly Lys Asp Leu His Arg Ser Asn Ile Ser Leu Leu Thr
            260                 265                 270

Ser Glu Lys Asp Thr Glu Asp Tyr Arg Lys Asn Arg Ser Pro Glu Met
        275                 280                 285

Pro Phe Tyr Pro Arg Val Val Tyr Pro Ile Arg Ala Pro Leu Pro Glu
    290                 295                 300

Asp Phe Leu Lys Ala Ser Leu Ala Tyr Gly Met Glu Arg Pro Thr Tyr
305                 310                 315                 320

Ile Thr Gln Ser Pro Ile Pro Ser Ser Thr Thr Pro Ser Pro Ser Ala
                325                 330                 335

Arg Ser Ser Pro Asp Arg Ser Leu Gln Ser Ala Ser Pro His Ser Ser
            340                 345                 350

Pro Gly Asn Thr Val Ser Pro Leu Ala Pro Gly Ser Gln Glu His Arg
        355                 360                 365

Asp Ser Tyr Ala Tyr Leu Asn Ala Pro Tyr Gly Pro Glu Gly Leu Gly
    370                 375                 380

Ser Tyr Pro Gly Tyr Ala Pro Pro Ser His Leu Gln Pro Ala Phe Val
385                 390                 395                 400

Pro Ser Tyr Asn Ala His Tyr Pro Lys Phe Leu Leu Pro Pro Tyr Gly
                405                 410                 415

Met His Cys Asn Ser Leu Gly Ala Val Gly Asn Ile Asn Gly Gly Ile
            420                 425                 430

Asn Asn Phe Gly Leu Phe Pro Arg Leu Tyr Pro Val Tyr Ser Ser Leu
        435                 440                 445

Leu Gly Gly Gly Gly Leu Pro Pro Pro Leu Leu Ala Pro Ala Ser Leu
    450                 455                 460

Pro Ser Ser Leu Pro Ser Glu Gly Ala Arg Arg Leu Leu Pro Glu His
465                 470                 475                 480

Pro Arg Glu Val Leu Val Pro Ala Pro His Ser Ala Phe Ser Leu Pro
                485                 490                 495

Gly Ala Ala Ala Ser Leu Lys Asp Lys Ala Cys Ser Pro Thr Ser Gly
            500                 505                 510

Ser Pro Thr Ala Gly Thr Ala Ala Ser Ala Glu His Val Val Gln Pro
        515                 520                 525

Lys Ala Thr Ser Ala Ala Met Ala Thr Pro Gly Gly Asp Glu Ala Val
    530                 535                 540

Asn Leu Ile Lys Asn Lys Arg Ser Met Thr Gly Tyr Lys Thr Leu Pro
545                 550                 555                 560

Tyr Pro Leu Lys Lys Gln Asn Gly Lys Ile Lys Tyr Glu Cys Asn Val
                565                 570                 575

Cys Ala Lys Thr Phe Gly Gln Leu Ser Asn Leu Lys Val His Leu Arg
            580                 585                 590

Val His Ser Gly Glu Arg Pro Phe Lys Cys Gln Thr Cys Asn Lys Gly
        595                 600                 605

Phe Thr Gln Leu Ala His Leu Gln Lys His Tyr Leu Val His Thr Gly
    610                 615                 620

Glu Lys Pro His Glu Cys Gln Val Cys His Lys Arg Phe Ser Ser Thr
625                 630                 635                 640

Ser Asn Leu Lys Thr His Leu Arg Leu His Ser Gly Glu Lys Pro Tyr
                645                 650                 655

Gln Cys Lys Val Cys Pro Ala Lys Phe Thr Gln Phe Val His Leu Lys
            660                 665                 670
```

```
Leu His Lys Arg Leu His Thr Arg Glu Arg Pro His Lys Cys Ala Gln
        675                 680                 685

Cys His Lys Ser Tyr Ile His Leu Cys Ser Leu Lys Val His Leu Lys
    690                 695                 700

Gly His Cys Pro Met Ala Pro Ala Thr Gly Leu Pro Leu Asp Asp Leu
705                 710                 715                 720

Thr Arg Ile Asn Glu Glu Ile Glu Lys Phe Asp Ile Ser Asp Asn Ala
                725                 730                 735

Asp Arg Leu Glu Asp Met Glu Asp Thr Val Asp Val Ala Ser Val Val
            740                 745                 750

Glu Lys Glu Ile Leu Ala Val Val Arg Lys Glu Lys Glu Glu Thr Gly
        755                 760                 765

Leu Lys Met Ser Leu Gln Arg Asn Leu Gly Asn Gly Leu Leu Ser Gly
    770                 775                 780

Cys Ser Leu Tyr Glu Ser Thr Asp Pro Ser Leu Leu Lys Leu Pro Pro
785                 790                 795                 800

Ser Asn Pro Leu Pro Leu Gly Pro Val Lys Val Lys Gln Glu Thr Val
                805                 810                 815

Glu Pro Val Asp Pro
            820
```

<210> SEQ ID NO 30
<211> LENGTH: 397
<212> TYPE: PRT
<213> ORGANISM: Homo sapiens

<400> SEQUENCE: 30

```
Met Tyr Gln Ser Leu Ala Leu Ala Ala Ser Pro Arg Gln Ala Ala Tyr
1               5                   10                  15

Ala Asp Ser Gly Ser Phe Leu His Ala Pro Gly Ala Gly Ser Pro Met
            20                  25                  30

Phe Val Pro Pro Ala Arg Val Pro Ser Met Leu Ser Tyr Leu Ser Gly
        35                  40                  45

Cys Glu Pro Ser Pro Gln Pro Pro Glu Leu Ala Ala Arg Pro Gly Trp
    50                  55                  60

Ala Gln Thr Ala Thr Ala Asp Ser Ser Ala Phe Gly Pro Gly Ser Pro
65                  70                  75                  80

His Pro Pro Ala Ala His Pro Pro Gly Ala Thr Ala Phe Pro Phe Ala
                85                  90                  95

His Ser Pro Ser Gly Pro Gly Ser Gly Gly Ser Ala Gly Gly Arg Asp
            100                 105                 110

Gly Ser Ala Tyr Gln Gly Ala Leu Leu Pro Arg Glu Gln Phe Ala Ala
        115                 120                 125

Pro Leu Gly Arg Pro Val Gly Thr Ser Tyr Ser Ala Thr Tyr Pro Ala
    130                 135                 140

Tyr Val Ser Pro Asp Val Ala Gln Ser Trp Thr Ala Gly Pro Phe Asp
145                 150                 155                 160

Gly Ser Val Leu His Gly Leu Pro Gly Arg Arg Pro Thr Phe Val Ser
                165                 170                 175

Asp Phe Leu Glu Glu Phe Pro Gly Glu Gly Arg Glu Cys Val Asn Cys
            180                 185                 190

Gly Ala Leu Ser Thr Pro Leu Trp Arg Arg Asp Gly Thr Gly His Tyr
        195                 200                 205

Leu Cys Asn Ala Cys Gly Leu Tyr His Lys Met Asn Gly Val Asn Arg
    210                 215                 220
```

Pro Leu Val Arg Pro Gln Lys Arg Leu Ser Ser Ser Arg Arg Ala Gly
225 230 235 240

Leu Cys Cys Thr Asn Cys His Thr Thr Asn Thr Thr Leu Trp Arg Arg
245 250 255

Asn Ser Glu Gly Glu Pro Val Cys Asn Ala Cys Gly Leu Tyr Met Lys
260 265 270

Leu His Gly Val Pro Arg Pro Leu Ala Met Lys Lys Glu Ser Ile Gln
275 280 285

Thr Arg Lys Arg Lys Pro Lys Thr Ile Ala Lys Ala Arg Gly Ser Ser
290 295 300

Gly Ser Thr Arg Asn Ala Ser Ala Ser Pro Ser Ala Val Ala Ser Thr
305 310 315 320

Asp Ser Ser Ala Ala Thr Ser Lys Ala Lys Pro Ser Leu Ala Ser Pro
325 330 335

Val Cys Pro Gly Pro Ser Met Ala Pro Gln Ala Ser Gly Gln Glu Asp
340 345 350

Asp Ser Leu Ala Pro Gly His Leu Glu Phe Lys Phe Glu Pro Glu Asp
355 360 365

Phe Ala Phe Pro Ser Thr Ala Pro Ser Pro Gln Ala Gly Leu Arg Gly
370 375 380

Ala Leu Arg Gln Glu Ala Trp Cys Ala Leu Ala Leu Ala
385 390 395

<210> SEQ ID NO 31
<211> LENGTH: 404
<212> TYPE: PRT
<213> ORGANISM: Mus musculus

<400> SEQUENCE: 31

Met Tyr Gln Ser Leu Ala Leu Ala Gln Ser Pro Gly Gln Gly Thr Tyr
1 5 10 15

Ala Asp Ser Gly Ala Phe Leu His Ser Ser Gly Thr Gly Ser Pro Val
20 25 30

Phe Val Ala Pro Thr Arg Met Pro Ser Met Leu Pro Tyr Leu Pro Ser
35 40 45

Cys Glu Pro Gly Ser Gln Ala Pro Ala Leu Ala Ala His Ser Ser Trp
50 55 60

Thr Gln Ala Val Ala Ala Asp Ser Ser Ala Phe Gly Ser Gly Ser Pro
65 70 75 80

His Pro Pro Ala Ala His Pro Pro Gly Ala Thr Thr Phe Pro Phe Ala
85 90 95

His Ser Pro Pro Gly Ser Gly Ser Gly Gly Ser Ala Gly Val Arg Asp
100 105 110

Gly Gly Ala Phe Gln Gly Ala Leu Leu Ala Arg Glu Gln Tyr Pro Thr
115 120 125

Pro Leu Gly Arg Pro Met Gly Ala Ser Tyr Pro Thr Thr Tyr Pro Ala
130 135 140

Tyr Met Ser Ser Asp Val Ala Pro Ser Trp Thr Ser Gly Ala Phe Asp
145 150 155 160

Ser Ser Ile Leu His Gly Leu Gln Ala Arg Pro Gly Gly Leu Pro Gly
165 170 175

Arg Arg Thr Ser Phe Val Pro Asp Phe Leu Glu Glu Phe Pro Gly Glu
180 185 190

Gly Arg Glu Cys Val Asn Cys Gly Ala Leu Ser Thr Pro Leu Trp Arg

```
        195                 200                 205

Arg Asp Gly Thr Gly His Tyr Leu Cys Asn Ala Cys Gly Leu Tyr His
    210                 215                 220

Lys Met Asn Gly Val Asn Arg Pro Leu Val Arg Pro Gln Lys Arg Leu
225                 230                 235                 240

Ser Ser Ser Arg Arg Ser Gly Leu Cys Cys Ser Asn Cys His Thr Ala
                245                 250                 255

Thr Thr Thr Leu Trp Arg Arg Asn Ser Glu Gly Glu Pro Val Cys Asn
            260                 265                 270

Ala Cys Gly Leu Tyr Met Lys Leu His Gly Val Pro Arg Pro Leu Ala
        275                 280                 285

Met Lys Lys Glu Ser Ile Gln Thr Arg Lys Arg Lys Pro Lys Asn Pro
    290                 295                 300

Ala Lys Ile Lys Gly Ser Ser Gly Ser Thr Ala Asn Thr Thr Ala Ser
305                 310                 315                 320

Ser Pro Thr Leu Leu Asn Ser Glu Ser Ser Ala Thr Thr Leu Lys Ala
                325                 330                 335

Glu Ser Ser Leu Ala Ser Pro Val Cys Ala Gly Pro Thr Ile Thr Ser
            340                 345                 350

Gln Ala Ser Ser Pro Ala Asp Glu Ser Leu Ala Ser Ser His Leu Glu
        355                 360                 365

Phe Lys Phe Glu Pro Glu Asp Phe Ala Phe Thr Ser Ser Ser Met Ser
    370                 375                 380

Pro Gln Ala Gly Leu Ser Gly Val Leu Arg Gln Glu Thr Trp Cys Ala
385                 390                 395                 400

Leu Ala Leu Ala


<210> SEQ ID NO 32
<211> LENGTH: 383
<212> TYPE: PRT
<213> ORGANISM: Danio rerio

<400> SEQUENCE: 32

Met Tyr Ser Ser Leu Ala Leu Ser Ser Asn Pro Ser Pro Tyr Ala His
1               5                   10                  15

Asp Ser Gly Asn Tyr Ile His Pro Ser Ala Ser Ser Pro Val Tyr Val
            20                  25                  30

Pro Thr Thr Arg Val Pro Ala Met Leu Gln Thr Leu Pro Tyr Leu Gln
        35                  40                  45

Thr Cys Glu Ser Ser His Gln Ala His Gly Ile Ser Ser His His Ala
    50                  55                  60

Trp Pro Gln Thr Gly Thr Asp Asn Ser Ser Phe Asn Pro Gly Ser Pro
65                  70                  75                  80

His Pro Pro Pro Gly Phe Ser Tyr Ser His Ser Pro Pro Val Ser Ser
                85                  90                  95

Ser Thr Gly Arg Asp Ala Ala Tyr Gln Asn Pro Leu Met Leu Ser Asn
            100                 105                 110

Gly Gly Arg Ala Asp Gln Tyr Gly Ser Ala Leu Val Arg Ser Val Gly
        115                 120                 125

Gly Ser Tyr Ser Ser Pro Tyr Ala Ala Tyr Met Ser Pro Glu Met Ala
    130                 135                 140

Thr Ser Trp Thr Pro Gly Pro Phe Asp Gly Gly Met Ile Gly Leu Gln
145                 150                 155                 160

Gly Arg Gln Gly Thr Leu Pro Gly Arg Arg Ser Ser Ile Asp Met Leu
```

```
                165                 170                 175

Asp Asp Leu Pro Cys Glu Gly Arg Glu Cys Val Asn Cys Gly Ser Ile
            180                 185                 190

Ser Thr Pro Leu Trp Arg Arg Asp Gly Thr Gly His Tyr Leu Cys Asn
        195                 200                 205

Ala Cys Gly Leu Tyr His Lys Met Asn Gly Ile Asn Arg Pro Leu Ile
    210                 215                 220

Lys Pro Gln Lys Arg Leu Gln Ser Thr Ser Arg Arg Ala Gly Leu Cys
225                 230                 235                 240

Cys Thr Asn Cys His Thr Ser Thr Thr Thr Leu Trp Arg Arg Asn Ala
                245                 250                 255

Glu Gly Glu Pro Val Cys Asn Ala Cys Gly Leu Tyr Met Lys Leu His
            260                 265                 270

Gly Val Pro Arg Pro Leu Ala Met Lys Lys Glu Ser Ile Gln Thr Arg
        275                 280                 285

Lys Arg Lys Pro Lys Met Pro Lys Thr Lys Ser Ser Ser Gly Ser Thr
    290                 295                 300

Val Ser Gly Ala Thr Ser Pro Thr Ser Leu Pro Val Ser Glu Asn Ala
305                 310                 315                 320

Ser Thr Ile Lys Ser Glu Pro Ser Ile Ala Ala Ser Pro Tyr Ala Gly
                325                 330                 335

Gln Thr Val Val Ser Val Thr Gln Ala Ser Thr Gln Leu Asp Ser Ala
            340                 345                 350

Ser Ser Ala His Val Asp Ile Lys Tyr Glu Asp Tyr Thr Tyr Thr Pro
        355                 360                 365

Thr Ser Ile Ala Pro Gln Asn Ser Trp Cys Ala Leu Ser Gln Ala
    370                 375                 380


<210> SEQ ID NO 33
<211> LENGTH: 391
<212> TYPE: PRT
<213> ORGANISM: Gallus gallus

<400> SEQUENCE: 33

Met Tyr Gln Gly Leu Ala Leu Ala Pro Asn His Gly Gln Ser Ala Tyr
1               5                   10                  15

Ser His Asp Ser Gly Asn Phe Leu His Ser Ser Ala Gly Ser Pro Val
            20                  25                  30

Tyr Val Pro Thr Thr Arg Val Pro Ser Val Leu Gln Thr Leu Pro Tyr
        35                  40                  45

Leu Gln Ser Cys Glu Pro His Gln Ser His Leu Gly Asn Pro Pro Gly
    50                  55                  60

Trp Ala Gln Ser Ser Gly Glu Thr Thr Ala Phe Asn Ala Gly Ser Pro
65                  70                  75                  80

His Pro Pro Ser Gly Phe Ser Tyr Pro His Ser Pro Pro Gly Ser Ser
                85                  90                  95

Pro Pro Gly Arg Asp Gly Ala Tyr Gln Gly Pro Leu Leu Leu Gly Gly
            100                 105                 110

Gly Gly Arg Glu Gln Tyr Gly Asn Ala Leu Val Arg Ser Val Asn Gly
        115                 120                 125

Ser Tyr Ser Ser Pro Tyr Pro Ala Tyr Val Thr Pro Glu Leu Pro Pro
    130                 135                 140

Ser Trp Thr Ala Gly His Phe Glu Ser Ser Val Leu His Ser Leu Gln
145                 150                 155                 160
```

```
Thr Arg Gln Ala Ala Leu Pro Gly Arg Arg Ser Thr Phe Glu Tyr Leu
                165                 170                 175

Glu Glu Phe Pro Gly Asp Gly Arg Glu Cys Val Asn Cys Gly Ala Met
            180                 185                 190

Ser Thr Pro Leu Trp Arg Lys Asp Gly Thr Gly His Tyr Leu Cys Asn
        195                 200                 205

Ala Cys Gly Leu Tyr His Lys Met Asn Gly Ile Asn Arg Pro Leu Lys
    210                 215                 220

Pro Gln Lys Arg Leu Ser Ser Ser Arg Arg Ala Gly Leu Cys Cys Thr
225                 230                 235                 240

Asn Cys His Thr Thr Asn Thr Thr Leu Trp Arg Arg Asn Ala Glu Gly
                245                 250                 255

Glu Pro Val Cys Asn Ala Cys Gly Leu Tyr Met Lys Leu His Gly Val
            260                 265                 270

Pro Arg Pro Leu Ala Met Lys Lys Glu Ser Ile Gln Thr Arg Lys Arg
        275                 280                 285

Lys Pro Lys Asn Ile Thr Lys Gly Lys Thr Ser Thr Gly Ser Thr Thr
    290                 295                 300

Ser Ala Thr Asn Ser Pro Ser Ser Ile Thr Asn Ser Asp Ser Thr Val
305                 310                 315                 320

Thr Leu Lys Ser Glu Pro Ser Thr Thr Ser Gln Tyr Pro Gly Gln Gly
                325                 330                 335

Ile Val Ser Val Ser Gln Ala Gln Ser Gln Ser Asp Glu Ala Leu Ala
            340                 345                 350

Gly Gly Glu Phe Lys Phe Glu Pro Glu Asp Tyr Pro Phe Ser Pro Ser
        355                 360                 365

Ser Met Ala Pro Gln Pro Gly Leu Ser Val Pro Leu Arg Gln Asp Ser
    370                 375                 380

Trp Cys Ala Leu Ala Leu Ala
385                 390
```

<210> SEQ ID NO 34
<211> LENGTH: 400
<212> TYPE: PRT
<213> ORGANISM: Canis lupus familiaris

<400> SEQUENCE: 34

```
Met Tyr Pro Ser Leu Ala Leu Ala Pro Ser Pro Gly Gln Ala Ala Tyr
1               5                   10                  15

Thr Asp Ser Gly Ala Phe Leu Pro Ala Pro Ala Ala Gly Ser Pro Val
            20                  25                  30

Phe Val Pro Pro Ala Arg Val Pro Pro Met Leu Pro Tyr Leu Pro Pro
        35                  40                  45

Cys Glu Pro Gly Pro Gln Ala Pro Gly Arg Gly Ala His Pro Gly Trp
    50                  55                  60

Ala Gln Ala Ala Asp Ser Ala Pro Phe Gly Pro Gly Ser Pro Pro Pro
65                  70                  75                  80

Pro Ala Ala Pro Pro Pro Ala Ala Thr Ala Phe Pro Phe Pro His Ser
                85                  90                  95

Pro Ser Gly Pro Gly Gly Gly Ala Gly Ala Arg Asp Gly Gly Ala Tyr
            100                 105                 110

Gln Gly Ala Leu Leu Ala Arg Glu Gln Tyr Pro Ala Pro Leu Gly Arg
        115                 120                 125

Pro Val Gly Ala Ser Tyr Pro Ala Ala Tyr Pro Ala Tyr Val Ser Pro
    130                 135                 140
```

Glu Gly Ala Pro Ala Trp Thr Ser Gly Pro Phe Glu Gly Ser Val Leu
145 150 155 160

His Gly Leu Gln Ser Arg Pro Ala Gly Leu Pro Gly Arg Arg Ala Thr
165 170 175

Phe Val Ser Asp Phe Leu Glu Glu Leu Pro Gly Glu Gly Arg Glu Cys
180 185 190

Val Asn Cys Gly Ala Leu Ser Thr Pro Leu Trp Arg Arg Asp Gly Thr
195 200 205

Gly His Tyr Leu Cys Asn Ala Cys Gly Leu Tyr His Lys Met Asn Gly
210 215 220

Val Asn Arg Pro Leu Val Arg Pro Gln Lys Arg Leu Ser Ser Ser Arg
225 230 235 240

Arg Ala Gly Leu Cys Cys Thr Asn Cys His Thr Thr Thr Thr Thr Leu
245 250 255

Trp Arg Arg Asn Ala Asp Gly Glu Pro Val Cys Asn Ala Cys Gly Leu
260 265 270

Tyr Met Lys Leu His Gly Val Pro Arg Pro Leu Ala Met Lys Lys Glu
275 280 285

Ser Ile Gln Thr Arg Lys Arg Lys Pro Lys Ser Val Val Lys Thr Lys
290 295 300

Ser Asn Ser Gly Gly Leu Gly Asn Gly Thr Ala Ser Pro Pro Ser Val
305 310 315 320

Pro Asp Pro Glu Ser Pro Ala Ala Thr Leu Lys Pro Lys Pro Ser Leu
325 330 335

Ala Ser Pro Ser Cys Pro Gly Ser Ser Ile Thr Ser Gln Ala Pro Gly
340 345 350

Pro Val Asp Asp Pro Leu Ala Pro Ser His Leu Glu Phe Lys Phe Glu
355 360 365

Pro Glu Asp Phe Ala Phe Pro Ser Ala Ala Leu Gly Pro Gln Ala Gly
370 375 380

Leu Gly Gly Thr Leu Arg Gln Glu Ala Trp Cys Ala Leu Ala Leu Ala
385 390 395 400

<210> SEQ ID NO 35
<211> LENGTH: 437
<212> TYPE: PRT
<213> ORGANISM: Xenopus tropicalis

<400> SEQUENCE: 35

Met Pro Glu Asn Gln His Trp Lys Met Gln Lys Asp Cys Arg Leu Ser
1 5 10 15

Gly Thr Phe Tyr Tyr Asn Thr Thr Ser Ser Ala Asn Leu Pro Gly Val
20 25 30

Ala Gly Arg Lys Ala Gln Pro Val Leu Phe Gly Ser Tyr Arg Arg Ile
35 40 45

Met Tyr Pro Ser Leu Ala Leu Thr Ala Asn His Ala Gln Pro Ala Tyr
50 55 60

Ser His Asp Pro Ser Asn Phe Leu His Ser Thr Gly Ser Pro Pro Val
65 70 75 80

Tyr Val Pro Thr Ser Arg Met Pro Ala Met Leu Gln Ser Leu Pro Tyr
85 90 95

Leu Gln Ser Cys Asp Thr Ala His Gln Gly His His Leu Gly Asn His
100 105 110

Pro Gly Trp Ala Gln Thr Ala Asn Glu Ser His Thr Phe Asn Ala Ser

```
        115                 120                 125

Ser Pro His Thr Pro Ser Gly Phe Pro Tyr Ser His Ser Pro Pro Val
    130                 135                 140

Gly Asn Ala Ser Ala Arg Glu Gly Ala Tyr Gln Ser Pro Leu Ile Met
145                 150                 155                 160

Gly Ser Ser Ala Arg Asp Gln Tyr Gly Asn Ser Leu Val Arg Thr Gly
                165                 170                 175

Ser Tyr Pro Ser Pro Tyr Ser Tyr Val Gly Ala Asp Met Pro Pro Ser
            180                 185                 190

Trp Ala Thr Gly His Phe Glu Gly Ser Met Leu His Ser Leu Gln Gly
        195                 200                 205

Arg Gln Pro Leu Pro Gly Arg Arg Ser Ser Leu Glu Phe Leu Glu Glu
    210                 215                 220

Phe His Gly Glu Gly Arg Glu Cys Val Asn Cys Gly Ala Met Ser Thr
225                 230                 235                 240

Pro Leu Trp Arg Arg Asp Gly Thr Gly His Tyr Leu Cys Asn Ala Cys
                245                 250                 255

Gly Leu Tyr His Lys Met Asn Gly Ile Asn Arg Pro Leu Ile Lys Pro
            260                 265                 270

Gln Lys Arg Leu Ser Ser Ser Arg Arg Ala Gly Leu Cys Cys Thr Asn
        275                 280                 285

Cys His Thr Ser Thr Thr Thr Leu Trp Arg Arg Asn Ser Glu Gly Glu
    290                 295                 300

Pro Val Cys Asn Ala Cys Gly Leu Tyr Met Lys Leu His Gly Val Pro
305                 310                 315                 320

Arg Pro Leu Ala Met Lys Lys Glu Ser Ile Gln Thr Arg Lys Arg Lys
                325                 330                 335

Pro Lys Asn Val Ser Lys Gly Lys Thr Ser Thr Gly Ser Thr Ser Ala
            340                 345                 350

Thr Asn Ser Pro Ser Ser Val Thr Asn Ser Asp Pro Thr Pro Val Leu
        355                 360                 365

Lys Thr Glu Pro Asn Ile Ala Ser Gln Tyr Pro Gly Gln Ala Ile Val
    370                 375                 380

Ala Val Ser Gln Gly Gln Ser Gln Thr Asp Asp Leu Val Asn Gly Ser
385                 390                 395                 400

His Glu Leu Lys Phe Ile Pro Glu Glu Tyr Ala Tyr Ser Pro Thr Ala
                405                 410                 415

Leu Ser Gln Ser Gly Leu Asn Val Pro Leu Arg Gln Glu Ser Trp Cys
            420                 425                 430

Ala Leu Ala Leu Ala
        435


<210> SEQ ID NO 36
<211> LENGTH: 404
<212> TYPE: PRT
<213> ORGANISM: Rattus norvegicus

<400> SEQUENCE: 36

Met Tyr Gln Ser Leu Ala Leu Ala Gln Ser Pro Gly Gln Gly Thr Tyr
1               5                   10                  15

Ala Asp Ser Gly Pro Phe Leu His Ser Ser Gly Ala Gly Ser Pro Val
            20                  25                  30

Phe Val Ala Pro Thr Arg Val Pro Ser Met Leu Pro Tyr Leu Pro Ser
        35                  40                  45
```

```
Cys Glu Pro Gly Ser Gln Pro Pro Ala Leu Ala Ala His Ser Ser Trp
    50                  55                  60

Thr Gln Ala Val Ser Ala Glu Ser Ser Ala Phe Gly Ser Gly Ser Pro
65                  70                  75                  80

His Pro Pro Ala Thr His Pro Pro Gly Ala Thr Ala Phe Pro Phe Ala
                85                  90                  95

His Ser Pro Ser Gly Ser Gly Ser Gly Gly Ser Ala Gly Val Arg Asp
            100                 105                 110

Gly Ala Ala Phe Gln Ser Ala Leu Leu Ala Arg Glu Gln Tyr Pro Thr
        115                 120                 125

Ala Leu Gly Arg Pro Met Ser Ala Ser Tyr Pro Thr Thr Tyr Pro Ala
    130                 135                 140

Tyr Val Ser Pro Asp Val Ala Pro Ser Trp Thr Ser Gly Pro Phe Asp
145                 150                 155                 160

Ser Ser Ile Leu His Gly Leu Gln Gly Arg Pro Gly Gly Leu Pro Gly
                165                 170                 175

Arg Arg Thr Thr Phe Val Pro Asp Phe Leu Glu Glu Phe Pro Gly Glu
            180                 185                 190

Gly Arg Glu Cys Val Asn Cys Gly Ala Leu Ser Thr Pro Leu Trp Arg
        195                 200                 205

Arg Asp Gly Thr Gly His Tyr Leu Cys Asn Ala Cys Gly Leu Tyr His
    210                 215                 220

Lys Met Asn Gly Val Asn Arg Pro Leu Val Arg Pro Gln Lys Arg Leu
225                 230                 235                 240

Ser Ser Ser Arg Arg Ser Gly Leu Cys Cys Ser Asn Cys His Thr Ala
                245                 250                 255

Thr Thr Thr Leu Trp Arg Arg Asn Ala Glu Gly Glu Pro Val Cys Asn
            260                 265                 270

Ala Cys Gly Leu Tyr Met Lys Leu His Gly Val Pro Arg Pro Leu Ala
        275                 280                 285

Met Lys Lys Glu Ser Ile Gln Thr Arg Lys Arg Lys Pro Lys Asn Pro
    290                 295                 300

Ala Lys Ile Lys Gly Ser Ser Gly Ser Thr Ala Asn Ser Thr Ala Ser
305                 310                 315                 320

Ser Pro Thr Leu Leu Asn Thr Glu Ser Ser Ala Thr Thr Leu Lys Ala
                325                 330                 335

Glu Ser Ser Leu Ala Ser Pro Gly Cys Ala Gly Pro Thr Ile Thr Ser
            340                 345                 350

Gln Ala Ser Ser Pro Ala Asp Glu Ser Leu Ala Ser Ser His Leu Glu
        355                 360                 365

Phe Lys Phe Glu Pro Glu Asp Phe Val Phe Thr Ser Ser Ser Leu Ser
    370                 375                 380

Pro Gln Ala Gly Leu Ser Gly Val Leu Arg Gln Glu Ala Trp Cys Ala
385                 390                 395                 400

Leu Ala Leu Ala


<210> SEQ ID NO 37
<211> LENGTH: 403
<212> TYPE: PRT
<213> ORGANISM: Bos taurus

<400> SEQUENCE: 37

Met Tyr Gln Ser Leu Ala Leu Ala Pro Ser Pro Gly Gln Thr Ala Tyr
1               5                   10                  15
```

```
Ala Asp Ser Gly Ala Phe Leu His Thr Pro Gly Ala Gly Ser Pro Val
            20                  25                  30

Phe Val Pro Pro Ala Arg Val Pro Ser Met Leu Pro Tyr Leu Pro Ala
        35                  40                  45

Cys Glu Pro Gly Pro Gln Ala Pro Ala Ile Thr Ala His Pro Gly Trp
    50                  55                  60

Ala Gln Ala Ala Ala Ala Asp Ser Ser Ala Phe Gly Ser Gly Ser Pro
65                  70                  75                  80

His Ala Pro Ala Ala Pro Pro Pro Gly Thr Thr Ala Phe Pro Phe Ala
                85                  90                  95

His Ser Ser Pro Gly Pro Gly Gly Gly Thr Gly Thr Arg Asp Asn Gly
            100                 105                 110

Ala Phe Gln Gly Ala Met Leu Ala Arg Glu Gln Tyr Pro Ala Ala Leu
        115                 120                 125

Gly Arg Pro Val Ser Ser Ser Tyr Pro Thr Ala Tyr Pro Ala Tyr Met
    130                 135                 140

Ser Ala Glu Val Ala Pro Ser Trp Thr Ser Gly Pro Leu Asp Gly Ser
145                 150                 155                 160

Val Leu His Ser Leu Gln Gly Leu Pro Ala Gly Leu Pro Gly Arg Arg
                165                 170                 175

Ala Pro Phe Ala Ala Glu Leu Leu Glu Glu Phe Pro Gly Glu Gly Arg
            180                 185                 190

Glu Cys Val Asn Cys Gly Ala Leu Ser Thr Pro Leu Trp Arg Arg Asp
        195                 200                 205

Gly Thr Gly His Tyr Leu Cys Asn Ala Cys Gly Leu Tyr His Lys Met
    210                 215                 220

Asn Gly Val Asn Arg Pro Leu Val Arg Pro Gln Lys Arg Leu Ser Ser
225                 230                 235                 240

Ser Arg Arg Ala Gly Leu Cys Cys Thr Asn Cys His Thr Thr Thr Thr
                245                 250                 255

Thr Leu Trp Arg Arg Asn Val Asp Gly Glu Pro Val Cys Asn Ala Cys
            260                 265                 270

Gly Leu Tyr Met Lys Leu His Gly Val Pro Arg Pro Leu Ala Met Lys
        275                 280                 285

Lys Glu Ser Ile Gln Thr Arg Lys Arg Lys Pro Lys Asn Ile Ala Lys
    290                 295                 300

Thr Lys Gly Ser Ser Gly Ser Ser Gly His Thr Thr Ala Ser Pro Gln
305                 310                 315                 320

Ala Ser Val Pro Asp Pro Glu Val Ser Ala Ala Thr Leu Lys Pro Glu
                325                 330                 335

Pro Ser Leu Ala Ser Pro Ser Cys Pro Gly Pro Ser Val Thr Ser Gln
            340                 345                 350

Gly Ser Ala Gln Val Asp Asp Pro Leu Ala Pro Ser His Leu Glu Phe
        355                 360                 365

Lys Phe Glu Pro Glu Asp Phe Ala Leu Pro Ser Ala Ala Leu Gly Gln
    370                 375                 380

Gln Ala Gly Leu Gly Gly Ala Leu Arg Gln Glu Ala Trp Cys Ala Leu
385                 390                 395                 400

Ala Leu Ala
```

```
<210> SEQ ID NO 38
<211> LENGTH: 397
<212> TYPE: PRT
<213> ORGANISM: Macaca mulatta
```

<400> SEQUENCE: 38

Met Tyr Gln Ser Leu Ala Leu Ala Ala Ser Pro Ser Gln Ala Ala Tyr
1 5 10 15

Ala Asp Ser Gly Ser Phe Leu His Ala Pro Gly Thr Gly Ser Pro Met
20 25 30

Phe Val Pro Pro Ala Arg Val Pro Ser Met Leu Ser Tyr Leu Ser Gly
35 40 45

Cys Glu Pro Ser Pro Gln Pro Pro Glu Leu Ala Ala Arg Pro Gly Trp
50 55 60

Ala Gln Thr Ala Thr Ala Asp Ser Ser Ala Phe Gly Pro Gly Ser Pro
65 70 75 80

His Pro Pro Ala Ala His Pro Pro Gly Ala Thr Ala Phe Pro Phe Ala
85 90 95

His Ser Pro Ser Gly Pro Gly Ser Gly Gly Ser Val Gly Ala Arg Asp
100 105 110

Gly Ser Ala Tyr Gln Gly Ala Leu Leu Pro Arg Glu Gln Phe Ala Ala
115 120 125

Pro Leu Gly Arg Pro Val Thr Thr Ser Tyr Pro Ala Thr Tyr Pro Ala
130 135 140

Tyr Val Ser Pro Asp Val Ala Pro Ser Trp Thr Ala Gly Pro Phe Asp
145 150 155 160

Gly Ser Val Leu His Gly Leu Pro Gly Arg Arg Pro Thr Phe Val Ser
165 170 175

Asp Phe Leu Glu Glu Phe Pro Gly Glu Gly Arg Glu Cys Val Asn Cys
180 185 190

Gly Ala Leu Ser Thr Pro Leu Trp Arg Arg Asp Gly Thr Gly His Tyr
195 200 205

Leu Cys Asn Ala Cys Gly Leu Tyr His Lys Met Asn Gly Val Asn Arg
210 215 220

Pro Leu Val Arg Pro Gln Lys Arg Leu Ser Ser Ser Arg Arg Ala Gly
225 230 235 240

Leu Cys Cys Thr Asn Cys His Thr Thr Asn Thr Thr Leu Trp Arg Arg
245 250 255

Asn Ser Glu Gly Glu Pro Val Cys Asn Ala Cys Gly Leu Tyr Met Lys
260 265 270

Leu His Gly Val Pro Arg Pro Leu Ala Met Lys Lys Glu Ser Ile Gln
275 280 285

Thr Arg Lys Arg Lys Pro Lys Thr Ile Ala Lys Thr Arg Gly Ser Ser
290 295 300

Gly Ser Thr Thr Asn Ala Ser Ala Ser Pro Ser Ala Val Pro Ser Thr
305 310 315 320

Asp Asn Ser Ala Ala Thr Ser Lys Pro Lys Pro Cys Leu Ala Ser Pro
325 330 335

Met Cys Pro Gly Pro Gly Met Ala Pro Gln Ala Ser Gly Gln Glu Asp
340 345 350

Asp Ser Leu Ala Pro Gly His Leu Glu Phe Lys Phe Glu Pro Glu Asp
355 360 365

Phe Ala Phe Pro Ser Thr Ala Leu Ser Pro Gln Ala Gly Leu Gly Gly
370 375 380

Pro Leu Arg Gln Glu Ala Trp Cys Ala Leu Ala Leu Ala
385 390 395

<210> SEQ ID NO 39
<211> LENGTH: 403
<212> TYPE: PRT
<213> ORGANISM: Ovis aries

<400> SEQUENCE: 39

Met Tyr Gln Ser Leu Ala Leu Ala Pro Ser Pro Gly Gln Thr Ala Tyr
1 5 10 15

Ala Asp Ser Gly Ala Phe Leu His Thr Pro Gly Ala Gly Ser Pro Val
20 25 30

Phe Val Pro Pro Ala Arg Val Pro Ser Met Leu Pro Tyr Leu Pro Ala
35 40 45

Cys Glu Pro Gly Pro Gln Ala Pro Ala Ile Thr Ala His Pro Gly Trp
50 55 60

Ala Gln Ala Ala Ala Ala Asp Ser Ser Ala Phe Gly Ser Gly Ser Pro
65 70 75 80

His Pro Pro Ala Ala Pro Pro Pro Gly Asn Thr Ala Phe Pro Phe Ala
85 90 95

His Ser Ser Pro Gly Pro Gly Gly Gly Thr Gly Thr Arg Asp Asn Gly
100 105 110

Ala Phe Gln Gly Ala Met Leu Ala Arg Glu Gln Tyr Pro Ala Thr Leu
115 120 125

Gly Arg Pro Val Ser Ser Ser Tyr Pro Thr Ala Tyr Pro Ala Tyr Met
130 135 140

Ser Thr Glu Val Ala Pro Ser Trp Thr Ser Gly Pro Leu Asp Gly Ser
145 150 155 160

Val Leu His Ser Leu Gln Gly Leu Pro Ala Gly Leu Pro Gly Arg Arg
165 170 175

Ala Thr Phe Ala Ala Glu Leu Leu Glu Glu Phe Pro Gly Glu Gly Arg
180 185 190

Glu Cys Val Asn Cys Gly Ala Leu Ser Thr Pro Leu Trp Arg Arg Asp
195 200 205

Gly Thr Gly His Tyr Leu Cys Asn Ala Cys Gly Leu Tyr His Lys Met
210 215 220

Asn Gly Val Asn Arg Pro Leu Val Arg Pro Gln Lys Arg Leu Ser Ser
225 230 235 240

Ser Arg Arg Ala Gly Leu Cys Cys Thr Asn Cys His Thr Thr Thr Thr
245 250 255

Thr Leu Trp Arg Arg Asn Ala Asp Gly Glu Pro Val Cys Asn Ala Cys
260 265 270

Gly Leu Tyr Met Lys Leu His Gly Val Pro Arg Pro Leu Ala Met Lys
275 280 285

Lys Glu Ser Ile Gln Thr Arg Lys Arg Lys Pro Lys Asn Ile Ala Lys
290 295 300

Thr Lys Gly Ser Ser Gly Ser Ala Gly His Ala Thr Ala Ser Pro Pro
305 310 315 320

Ala Ser Val Pro Asp Pro Glu Val Ser Ala Ala Thr Leu Lys Pro Glu
325 330 335

Pro Ser Leu Ala Ser Pro Ser Cys Pro Arg Pro Ser Val Thr Ser Gln
340 345 350

Gly Ser Ala Gln Val Asp Asp Pro Leu Ala Pro Ser His Leu Glu Phe
355 360 365

Lys Phe Glu Pro Glu Asp Phe Ala Leu Pro Ser Ala Ala Leu Gly Gln
370 375 380

```
Gln Ala Gly Leu Gly Gly Ala Leu Arg Gln Glu Ala Trp Cys Ala Leu
385                 390                 395                 400

Ala Leu Ala


<210> SEQ ID NO 40
<211> LENGTH: 430
<212> TYPE: PRT
<213> ORGANISM: Homo sapiens

<400> SEQUENCE: 40

Met Asp Glu Gln Pro Arg Leu Met His Ser His Ala Gly Val Gly Met
1               5                   10                  15

Ala Gly His Pro Gly Leu Ser Gln His Leu Gln Asp Gly Ala Gly Gly
            20                  25                  30

Thr Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Thr Ala Thr Asn Val Ser Ala His Gly
305                 310                 315                 320

Ser Gln Ala Asn Ser Pro Ser Thr Pro Asn Ser Ala Gly Ser Ser Ser
                325                 330                 335

Ser Phe Asn Met Ser Asn Ser Gly Asp Leu Phe Met Ser Val Gln Ser
            340                 345                 350
```

```
Leu Asn Gly Asp Ser Tyr Gln Gly Ala Gln Val Gly Ala Asn Val Gln
        355                 360                 365

Ser Gln Val Asp Thr Leu Arg His Val Ile Ser Gln Thr Gly Gly Tyr
    370                 375                 380

Ser Asp Gly Leu Ala Ala Ser Gln Met Tyr Ser Pro Gln Gly Ile Ser
385                 390                 395                 400

Ala Asn Gly Gly Trp Gln Asp Ala Thr Thr Pro Ser Ser Val Thr Ser
                405                 410                 415

Pro Thr Glu Gly Pro Gly Ser Val His Ser Asp Thr Ser Asn
            420                 425                 430


<210> SEQ ID NO 41
<211> LENGTH: 430
<212> TYPE: PRT
<213> ORGANISM: Mus musculus

<400> SEQUENCE: 41

Met Asp Glu Gln Pro Arg Leu Met His Ser His Ala Gly Val Gly Met
1               5                   10                  15

Ala Gly His Pro Gly Leu Ser Gln His Leu Gln Asp Gly Ala Gly Gly
            20                  25                  30

Thr Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300
```

Tyr Ala Ala Lys Thr Ala Val Thr Ala Thr Asn Val Ser Ala His Gly
305 310 315 320

Ser Gln Ala Asn Ser Pro Ser Thr Pro Asn Ser Ala Gly Ser Ser Ser
325 330 335

Ser Phe Asn Met Ser Asn Ser Gly Asp Leu Phe Met Ser Val Gln Ser
340 345 350

Leu Asn Gly Asp Ser Tyr Gln Gly Ala Gln Val Gly Ala Asn Val Gln
355 360 365

Ser Gln Val Asp Thr Leu Arg His Val Ile Ser Gln Thr Gly Gly Tyr
370 375 380

Ser Asp Gly Leu Ala Ala Ser Gln Met Tyr Ser Pro Gln Gly Ile Ser
385 390 395 400

Ala Asn Gly Gly Trp Gln Asp Ala Thr Thr Pro Ser Ser Val Thr Ser
405 410 415

Pro Thr Glu Gly Pro Gly Ser Val His Ser Asp Thr Ser Asn
420 425 430

<210> SEQ ID NO 42
<211> LENGTH: 430
<212> TYPE: PRT
<213> ORGANISM: Rattus norvegicus

<400> SEQUENCE: 42

Met Asp Glu Gln Pro Arg Leu Met His Ser His Ala Gly Val Gly Met
1 5 10 15

Ala Gly His Pro Gly Leu Ser Gln His Leu Gln Asp Gly Ala Gly Gly
20 25 30

Thr Glu Gly Glu Gly Gly Arg Lys Gln Asp Ile Gly Asp Ile Leu Gln
35 40 45

Gln Ile Met Thr Ile Thr Asp Gln Ser Leu Asp Glu Ala Gln Ala Arg
50 55 60

Lys His Ala Leu Asn Cys His Arg Met Lys Pro Ala Leu Phe Asn Val
65 70 75 80

Leu Cys Glu Ile Lys Glu Lys Thr Val Leu Ser Ile Arg Gly Ala Gln
85 90 95

Glu Glu Glu Pro Thr Asp Pro Gln Leu Met Arg Leu Asp Asn Met Leu
100 105 110

Leu Ala Glu Gly Val Ala Gly Pro Glu Lys Gly Gly Gly Ser Ala Ala
115 120 125

Ala Ala Ala Ala Ala Ala Ala Ser Gly Gly Ala Gly Ser Asp Asn Ser
130 135 140

Val Glu His Ser Asp Tyr Arg Ala Lys Leu Ser Gln Ile Arg Gln Ile
145 150 155 160

Tyr His Thr Glu Leu Glu Lys Tyr Glu Gln Ala Cys Asn Glu Phe Thr
165 170 175

Thr His Val Met Asn Leu Leu Arg Glu Gln Ser Arg Thr Arg Pro Ile
180 185 190

Ser Pro Lys Glu Ile Glu Arg Met Val Ser Ile Ile His Arg Lys Phe
195 200 205

Ser Ser Ile Gln Met Gln Leu Lys Gln Ser Thr Cys Glu Ala Val Met
210 215 220

Ile Leu Arg Ser Arg Phe Leu Asp Ala Arg Arg Lys Arg Arg Asn Phe
225 230 235 240

Asn Lys Gln Ala Thr Glu Ile Leu Asn Glu Tyr Phe Tyr Ser His Leu

```
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Thr Ala Thr Asn Val Ser Ala His Gly
305                 310                 315                 320

Ser Gln Ala Asn Ser Pro Ser Thr Pro Asn Ser Ala Gly Ser Ser Ser
                325                 330                 335

Ser Phe Asn Met Ser Asn Ser Gly Asp Leu Phe Met Ser Val Gln Ser
            340                 345                 350

Leu Asn Gly Asp Ser Tyr Gln Gly Ala Gln Val Gly Ala Asn Val Gln
        355                 360                 365

Ser Gln Val Asp Thr Leu Arg His Val Ile Ser Gln Thr Gly Gly Tyr
    370                 375                 380

Ser Asp Gly Leu Ala Ala Ser Gln Met Tyr Ser Pro Gln Gly Ile Ser
385                 390                 395                 400

Ala Asn Gly Gly Trp Gln Asp Ala Thr Thr Pro Ser Ser Val Thr Ser
                405                 410                 415

Pro Thr Glu Gly Pro Gly Ser Val His Ser Asp Thr Ser Asn
            420                 425                 430


<210> SEQ ID NO 43
<211> LENGTH: 436
<212> TYPE: PRT
<213> ORGANISM: Gallus gallus

<400> SEQUENCE: 43

Met Asp Glu Gln Pro Arg Leu Met His Thr His Ser Gly Val Gly Met
1               5                   10                  15

Pro Gly His Pro Gly Leu Ser Gln His Met Gln Asp Gly Pro Gly Gly
            20                  25                  30

Ala Glu Gly Glu Ala Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Leu Phe Leu Pro Ser Gln
                165                 170                 175

Ala Cys Asn Glu Phe Thr Thr His Val Met Asn Leu Leu Arg Glu Gln
            180                 185                 190
```

Ser Arg Thr Arg Pro Ile Ser Pro Lys Glu Ile Glu Arg Met Val Ser
195 200 205

Ile Ile His Arg Lys Phe Ser Ser Ile Gln Met Gln Leu Lys Gln Ser
210 215 220

Thr Cys Glu Ala Val Met Ile Leu Arg Ser Arg Phe Leu Asp Ala Arg
225 230 235 240

Arg Lys Arg Arg Asn Phe Asn Lys Gln Ala Thr Glu Ile Leu Asn Glu
245 250 255

Tyr Phe Tyr Ser His Leu Ser Asn Pro Tyr Pro Ser Glu Glu Ala Lys
260 265 270

Glu Glu Leu Ala Lys Lys Cys Gly Ile Thr Val Ser Gln Val Ser Asn
275 280 285

Trp Phe Gly Asn Lys Arg Ile Arg Tyr Lys Lys Asn Ile Gly Lys Phe
290 295 300

Gln Glu Glu Ala Asn Ile Tyr Ala Ala Lys Thr Ala Val Thr Ala Thr
305 310 315 320

Asn Val Ser Ala His Gly Ser Gln Ala Asn Ser Pro Ser Thr Pro Asn
325 330 335

Ser Ala Gly Ser Ser Ser Ser Phe Asn Met Ser Asn Ser Gly Asp Leu
340 345 350

Phe Met Ser Val Gln Ser Leu Asn Gly Asp Ser Tyr Gln Gly Ala Gln
355 360 365

Val Gly Ala Asn Val Gln Ser Gln Val Asp Thr Leu Arg His Val Ile
370 375 380

Ser Gln Thr Gly Gly Tyr Ser Asp Gly Leu Ala Ala Ser Gln Met Tyr
385 390 395 400

Ser Pro Gln Gly Ile Ser Ala Asn Gly Gly Trp Gln Asp Ala Thr Thr
405 410 415

Pro Ser Ser Val Thr Ser Pro Thr Glu Gly Pro Gly Ser Val His Ser
420 425 430

Asp Thr Ser Asn
435

<210> SEQ ID NO 44
<211> LENGTH: 486
<212> TYPE: PRT
<213> ORGANISM: Pan troglodytes

<400> SEQUENCE: 44

Met Asp Glu Gln Pro Arg Leu Met His Ser His Ala Gly Val Gly Met
1 5 10 15

Ala Gly His Pro Gly Leu Ser Gln His Leu Gln Asp Gly Ala Gly Gly
20 25 30

Thr Glu Gly Glu Gly Gly Arg Lys Gln Asp Ile Gly Asp Ile Leu Gln
35 40 45

Gln Ile Met Thr Ile Thr Asp Gln Ser Leu Asp Glu Ala Gln Ala Arg
50 55 60

Lys His Ala Leu Asn Cys His Arg Met Lys Pro Ala Leu Phe Asn Val
65 70 75 80

Leu Cys Glu Ile Lys Glu Lys Thr Glu Leu Lys Glu Ala Arg Ser Arg
85 90 95

Asn Cys Pro Ser Leu Phe Phe Leu Val Thr Arg Ile Gln Ser Ser Val
100 105 110

Arg His Arg Val Leu Ser Ser Ala Ser Thr Ser Gly Asn Pro Val Thr
115 120 125

Pro Gln Pro Thr His His His Pro Ser Phe Gly Trp Gly Glu Gly Lys
130 135 140

Val Leu Ser Ile Arg Gly Ala Gln Glu Glu Glu Pro Thr Asp Pro Gln
145 150 155 160

Leu Met Arg Leu Asp Asn Met Leu Leu Ala Glu Gly Val Ala Gly Pro
165 170 175

Glu Lys Gly Gly Gly Ser Ala Ala Ala Ala Ala Ala Ala Ala Ala Ser
180 185 190

Gly Gly Ala Gly Ser Asp Asn Ser Val Glu His Ser Asp Tyr Arg Ala
195 200 205

Lys Leu Ser Gln Ile Arg Gln Ile Tyr His Thr Glu Leu Glu Lys Tyr
210 215 220

Glu Gln Ala Cys Asn Glu Phe Thr Thr His Val Met Asn Leu Leu Arg
225 230 235 240

Glu Gln Ser Arg Thr Arg Pro Ile Ser Pro Lys Glu Ile Glu Arg Met
245 250 255

Val Ser Ile Ile His Arg Lys Phe Ser Ser Ile Gln Met Gln Leu Lys
260 265 270

Gln Ser Thr Cys Glu Ala Val Met Ile Leu Arg Ser Arg Phe Leu Asp
275 280 285

Ala Arg Arg Lys Arg Arg Asn Phe Asn Lys Gln Ala Thr Glu Ile Leu
290 295 300

Asn Glu Tyr Phe Tyr Ser His Leu Ser Asn Pro Tyr Pro Ser Glu Glu
305 310 315 320

Ala Lys Glu Glu Leu Ala Lys Lys Cys Gly Ile Thr Val Ser Gln Val
325 330 335

Ser Asn Trp Phe Gly Asn Lys Arg Ile Arg Tyr Lys Lys Asn Ile Gly
340 345 350

Lys Phe Gln Glu Glu Ala Asn Ile Tyr Ala Ala Lys Thr Ala Val Thr
355 360 365

Ala Thr Asn Val Ser Ala His Gly Ser Gln Ala Asn Ser Pro Ser Thr
370 375 380

Pro Asn Ser Ala Gly Ser Ser Ser Ser Phe Asn Met Ser Asn Ser Gly
385 390 395 400

Asp Leu Phe Met Ser Val Gln Ser Leu Asn Gly Asp Ser Tyr Gln Gly
405 410 415

Ala Gln Val Gly Ala Asn Val Gln Ser Gln Val Asp Thr Leu Arg His
420 425 430

Val Ile Ser Gln Thr Gly Gly Tyr Ser Asp Gly Leu Ala Ala Ser Gln
435 440 445

Met Tyr Ser Pro Gln Gly Ile Ser Ala Asn Gly Gly Trp Gln Asp Ala
450 455 460

Thr Thr Pro Ser Ser Val Thr Ser Pro Thr Glu Gly Pro Gly Ser Val
465 470 475 480

His Ser Asp Thr Ser Asn
485

<210> SEQ ID NO 45
<211> LENGTH: 430
<212> TYPE: PRT
<213> ORGANISM: Canis lupus familiaris

<400> SEQUENCE: 45

Met Asp Glu Gln Pro Arg Leu Met His Ser His Ala Gly Val Gly Met

-continued

```
1               5                   10                  15

Ala Gly His Pro Gly Leu Ser Gln His Leu Gln Asp Gly Ala Gly Gly
            20                  25                  30

Thr Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Thr Ala Thr Asn Val Ser Ala His Gly
305                 310                 315                 320

Ser Gln Ala Asn Ser Pro Ser Thr Pro Asn Ser Ala Gly Ser Ser Ser
                325                 330                 335

Ser Phe Asn Met Ser Asn Ser Gly Asp Leu Phe Met Gly Val Gln Ser
            340                 345                 350

Leu Asn Gly Asp Ser Tyr Gln Gly Ala Gln Val Gly Ala Asn Val Gln
        355                 360                 365

Ser Gln Val Asp Thr Leu Arg His Val Ile Ser Gln Thr Gly Gly Tyr
    370                 375                 380

Ser Asp Gly Leu Ala Ala Ser Gln Met Tyr Ser Pro Gln Gly Ile Ser
385                 390                 395                 400

Ala Asn Gly Gly Trp Gln Asp Ala Thr Thr Pro Ser Ser Val Thr Ser
                405                 410                 415

Pro Thr Glu Gly Pro Gly Ser Val His Ser Asp Thr Ser Asn
            420                 425                 430
```

<210> SEQ ID NO 46
<211> LENGTH: 430
<212> TYPE: PRT
<213> ORGANISM: Bos taurus

<400> SEQUENCE: 46

```
Met Asp Glu Gln Pro Arg Leu Met His Ser His Ala Gly Val Gly Met
1               5                   10                  15

Ala Gly His Pro Gly Leu Ser Gln His Leu Gln Asp Gly Ala Gly Gly
            20                  25                  30

Thr Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Thr Ala Thr Asn Val Ser Ala His Gly
305                 310                 315                 320

Ser Gln Ala Asn Ser Pro Ser Thr Pro Asn Ser Ala Gly Ser Ser Ser
                325                 330                 335

Ser Phe Asn Met Ser Asn Ser Gly Asp Leu Phe Met Ser Val Gln Ser
            340                 345                 350

Leu Asn Gly Asp Ser Tyr Gln Gly Ala Gln Val Gly Ala Asn Val Gln
        355                 360                 365

Ser Gln Val Asp Thr Leu Arg His Val Ile Ser Gln Thr Gly Gly Tyr
```

```
    370                 375                 380

Ser Asp Gly Leu Ala Ala Ser Gln Met Tyr Ser Pro Gln Gly Ile Ser
385                 390                 395                 400

Ala Asn Gly Gly Trp Gln Asp Ala Thr Thr Pro Ser Ser Val Thr Ser
                405                 410                 415

Pro Thr Glu Gly Pro Gly Ser Val His Ser Asp Thr Ser Asn
            420                 425                 430


<210> SEQ ID NO 47
<211> LENGTH: 454
<212> TYPE: PRT
<213> ORGANISM: Xenopus tropicalis

<400> SEQUENCE: 47

Met Asp Asp Gln Pro Arg Leu Met His Ser His Pro Gly Val Gly Met
1               5                   10                  15

Ala Gly His Pro Ser Leu Ser Gln His Met Gln Asp Gly Thr Gly Ala
            20                  25                  30

Asn Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Ala Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ala Asp Asn Ser
    130                 135                 140

Ala Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Ala Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Asn Ala Thr Asn Val Ser Val His Gly
305                 310                 315                 320
```

```
Ser Gln Ala Asn Ser Pro Ser Thr Pro Ser Ser Ala Gly Ser Lys Gln
                325                 330                 335

Thr Glu Arg Gly Ala Val Gln Pro Gln Asn Lys Met Gln Phe Leu Ser
            340                 345                 350

Pro Gln Asn Leu Gly Ser Ser Ser Ser Phe Asn Met Ser Asn Ser Gly
        355                 360                 365

Asp Leu Phe Met Ser Val Gln Ser Leu Asn Gly Asp Ser Tyr Gln Gly
    370                 375                 380

Ala Gln Val Gly Ala Asn Val Gln Ser Gln Val Asp Thr Leu Arg His
385                 390                 395                 400

Val Ile Ser Gln Thr Gly Gly Tyr Ser Glu Thr Leu Thr Ala Asn Gln
                405                 410                 415

Met Tyr Ser Pro Gln Gly Ile Ser Ala Asn Gly Gly Trp Gln Asp Ala
            420                 425                 430

Ala Thr Pro Ser Ser Val Thr Ser Pro Thr Glu Gly Pro Gly Ser Val
        435                 440                 445

His Ser Asp Thr Ser Asn
    450


<210> SEQ ID NO 48
<211> LENGTH: 430
<212> TYPE: PRT
<213> ORGANISM: Ovis aries

<400> SEQUENCE: 48

Met Asp Glu Gln Pro Arg Leu Met His Ser His Ala Gly Val Gly Met
1               5                   10                  15

Ala Gly His Pro Gly Leu Ser Gln His Leu Gln Asp Gly Ala Gly Gly
            20                  25                  30

Thr Glu Gly Glu Gly Gly Arg Lys Gln Asp Ile Gly Asp Ile Leu Gln
        35                  40                  45

Gln Ile Met Thr Ile Thr Asp Gln Ser Leu Asp Glu Ala Gln Ala Arg
    50                  55                  60

Lys His Ala Leu Asn Cys His Arg Met Lys Pro Ala Leu Phe Asn Val
65                  70                  75                  80

Leu Cys Glu Ile Lys Glu Lys Thr Val Leu Ser Ile Arg Gly Ala Gln
                85                  90                  95

Glu Glu Glu Pro Thr Asp Pro Gln Leu Met Arg Leu Asp Asn Met Leu
            100                 105                 110

Leu Ala Glu Gly Val Ala Gly Pro Glu Lys Gly Gly Gly Ser Ala Ala
        115                 120                 125

Ala Ala Ala Ala Ala Ala Ala Ser Gly Gly Ala Gly Ser Asp Asn Ser
    130                 135                 140

Val Glu His Ser Asp Tyr Arg Ala Lys Leu Ser Gln Ile Arg Gln Ile
145                 150                 155                 160

Tyr His Thr Glu Leu Glu Lys Tyr Glu Gln Ala Cys Asn Glu Phe Thr
                165                 170                 175

Thr His Val Met Asn Leu Leu Arg Glu Gln Ser Arg Thr Arg Pro Ile
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240
```

Asn Lys Gln Ala Thr Glu Ile Leu Asn Glu Tyr Phe Tyr Ser His Leu
245 250 255

Ser Asn Pro Tyr Pro Ser Glu Glu Ala Lys Glu Glu Leu Ala Lys Lys
260 265 270

Cys Gly Ile Thr Val Ser Gln Val Ser Asn Trp Phe Gly Asn Lys Arg
275 280 285

Ile Arg Tyr Lys Lys Asn Ile Gly Lys Phe Gln Glu Glu Ala Asn Ile
290 295 300

Tyr Ala Ala Lys Thr Ala Val Thr Ala Thr Asn Val Ser Ala His Gly
305 310 315 320

Ser Gln Ala Asn Ser Pro Ser Thr Pro Asn Ser Ala Gly Ser Ser Ser
325 330 335

Ser Phe Asn Met Ser Asn Ser Gly Asp Leu Phe Met Ser Val Gln Ser
340 345 350

Leu Asn Gly Asp Ser Tyr Gln Gly Ala Gln Val Gly Ala Asn Val Gln
355 360 365

Ser Gln Val Asp Thr Leu Arg His Val Ile Ser Gln Thr Gly Gly Tyr
370 375 380

Ser Asp Gly Leu Ala Ala Ser Gln Met Tyr Ser Pro Gln Gly Ile Ser
385 390 395 400

Ala Asn Gly Gly Trp Gln Asp Ala Thr Thr Pro Ser Ser Val Thr Ser
405 410 415

Pro Thr Glu Gly Pro Gly Ser Val His Ser Asp Thr Ser Asn
420 425 430

<210> SEQ ID NO 49
<211> LENGTH: 430
<212> TYPE: PRT
<213> ORGANISM: Camelus ferus

<400> SEQUENCE: 49

Met Asp Glu Gln Pro Arg Leu Met His Ser His Ala Gly Val Gly Met
1 5 10 15

Ala Gly His Pro Gly Leu Ser Gln His Leu Gln Asp Gly Ala Gly Gly
20 25 30

Thr Glu Gly Glu Gly Gly Arg Lys Gln Asp Ile Gly Asp Ile Leu Gln
35 40 45

Gln Ile Met Thr Ile Thr Asp Gln Ser Leu Asp Glu Ala Gln Ala Arg
50 55 60

Lys His Ala Leu Asn Cys His Arg Met Lys Pro Ala Leu Phe Asn Val
65 70 75 80

Leu Cys Glu Ile Lys Glu Lys Thr Val Leu Ser Ile Arg Gly Ala Gln
85 90 95

Glu Glu Glu Pro Thr Asp Pro Gln Leu Met Arg Leu Asp Asn Met Leu
100 105 110

Leu Ala Glu Gly Val Ala Gly Pro Glu Lys Gly Gly Gly Ser Ala Ala
115 120 125

Ala Ala Ala Ala Ala Ala Ala Ser Gly Gly Ala Gly Ser Asp Asn Ser
130 135 140

Val Glu His Ser Asp Tyr Arg Ala Lys Leu Ser Gln Ile Arg Gln Ile
145 150 155 160

Tyr His Thr Glu Leu Glu Lys Tyr Glu Gln Ala Cys Asn Glu Phe Thr
165 170 175

Thr His Val Met Asn Leu Leu Arg Glu Gln Ser Arg Thr Arg Pro Ile

-continued

```
            180                 185                 190

Ser Pro Lys Glu Ile Glu Arg Met Val Ser Ile Ile His Arg Lys Phe
        195                 200                 205

Ser Ser Ile Gln Met Gln Leu Lys Gln Ser Thr Cys Glu Ala Val Met
    210                 215                 220

Ile Leu Arg Ser Arg Phe Leu Asp Ala Arg Arg Lys Arg Arg Asn Phe
225                 230                 235                 240

Asn Lys Gln Ala Thr Glu Ile Leu Asn Glu Tyr Phe Tyr Ser His Leu
                245                 250                 255

Ser Asn Pro Tyr Pro Ser Glu Glu Ala Lys Glu Glu Leu Ala Lys Lys
            260                 265                 270

Cys Gly Ile Thr Val Ser Gln Val Ser Asn Trp Phe Gly Asn Lys Arg
        275                 280                 285

Ile Arg Tyr Lys Lys Asn Ile Gly Lys Phe Gln Glu Glu Ala Asn Ile
    290                 295                 300

Tyr Ala Ala Lys Thr Ala Val Thr Ala Thr Asn Val Ser Ala His Gly
305                 310                 315                 320

Ser Gln Ala Asn Ser Pro Ser Thr Pro Asn Ser Ala Gly Ser Ser Ser
                325                 330                 335

Ser Phe Asn Met Ser Asn Ser Gly Asp Leu Phe Met Gly Val Gln Ser
            340                 345                 350

Leu Asn Gly Asp Ser Tyr Gln Gly Ala Gln Val Gly Ala Asn Val Gln
        355                 360                 365

Ser Gln Val Asp Thr Leu Arg His Val Ile Ser Gln Thr Gly Gly Tyr
    370                 375                 380

Ser Asp Gly Leu Ala Ala Ser Gln Met Tyr Ser Pro Gln Gly Ile Ser
385                 390                 395                 400

Ala Asn Gly Gly Trp Gln Asp Ala Thr Thr Pro Ser Ser Val Thr Ser
                405                 410                 415

Pro Thr Glu Gly Pro Gly Ser Val His Ser Asp Thr Ser Asn
            420                 425                 430
```

GENERATION OF KIDNEY GLOMERULAR SPECIFIC ENDOTHELIAL CELLS AND METHODS OF USE

CROSS REFERENCE TO RELATED APPLICATION

This application claims the benefit of priority from U.S. Provisional Application No. 62/937,982, filed Nov. 20, 2019, the entire contents of which are incorporated herein by reference.

INCORPORATION BY REFERENCE OF SEQUENCE LISTING

The Sequence Listing in an ASCII text file, named as 37940_9220-03-US of 258 KB, created on May 16, 2022, and submitted to the United States Patent and Trademark Office via EFS-Web, is incorporated herein by reference.

BACKGROUND

Endothelial cell (EC) specialization in each organ is essential for executing tissue-specific functions. Kidneys have a unique vasculature to regulate blood pressure (BP), maintain electrolyte homeostasis and pH, and produce red blood cells. Molecular pathways that determine the structural and functional properties of each blood vessel domain in the kidney, as well as the intrinsic and extrinsic cues that enable adaptation of vessels to these tasks are unknown.

Within each human kidney reside approximately one million nephrons, each consisting of a glomerulus and a system of highly distinct tubules. Blood enters the kidney through the renal artery, branches into the interlobular and arcuate arteries that eventually feed into the glomerular capillaries through the afferent arteriole and exit it through the efferent arterioles. The glomerulus is a tuft of fenestrated capillaries, podocytes, and mesangial cells that allow low-molecular weight substances including ions, water, glucose, and nitrogenous waste to pass from the blood into the Bowman's space. The ultrafiltrate of plasma is then trafficked to multiple segments of the nephron in series including the proximal convoluted tubule, the loop of Henle, the distal convoluted tubule, and the collecting duct. The descending vasa recta (DVR) and ascending vasa recta (AVR) blood vessels run parallel with the loop of Henle. The vasa recta slow the rate of blood flow to maintain an osmotic gradient required for water reabsorption. To execute these complex functions, the kidney vasculature has acquired adaptive structural and functional specialization often referred to as vascular zonation. The intrinsic and extrinsic cues that enable adaptation of the kidney vessels to these tasks are not defined.

The development of the kidney vasculature is a major hurdle for the development of kidney organoids in vitro. Kidney organoids provide avenues for studies of kidney development, disease, and regeneration. Although organoids of the kidney have provided significant insights into kidney physiology and disease, they are mainly limited to the study of developmental processes. Kidney organoids are largely avascular, preventing further maturation and the majority of filtration processes that occur in the kidney. In vivo, the regression of vascular development greatly hinders the organogenesis of the kidney. Similarly, kidney organoid protocols are hindered from building complete, mature, and functional nephrogenic structures in the absence of proper vascularization of the nephron. Current efforts to vascularize organoids have utilized methods such as microfluidic chips or putting human kidney organoids into the mouse kidney as capsules. Although several studies have recently mapped morphological mechanisms of vascular development in the kidney, the molecular basis for many of these processes is still largely unknown.

SUMMARY OF THE DISCLOSURE

An aspect of the disclosure is directed to a method of generating human glomeruli endothelial cells (HGECs) from human endothelial cells (ECs), comprising expressing in human ECs an exogenous nucleic acid encoding a T-box transcription factor 3 (Tbx3) polypeptide, or a polypeptide having at least 85% amino acid sequence identity to the Tbx3 polypeptide, thereby generating HGECs.

In some embodiments, the Tbx3 polypeptide comprises an amino acid sequence selected from the group consisting of SEQ ID NO: 1-19.

In some embodiments, the ECs are cultured in serum-free media.

In some embodiments, the ECs are selected from fetal, neonatal, adult, or progenitor ECs.

In some embodiments, the ECs are selected from the group consisting of human umbilical vascular endothelial cells (HUVECs), endothelial cells isolated from adipose tissue, Induced Pluripotent Stem Cells (iPSC)-derived endothelial cells, and adult dermal micro-vascular endothelial cells (hDMECs).

In some embodiments, the ECs are transduced with a vector encoding the Tbx3 polypeptide.

In some embodiments, the method further comprises expressing at least one exogenous nucleic acid encoding at least one transcription factor selected from the group consisting of a PR domain zinc finger protein 1 (Prdm1) polypeptide, a GATA Binding Protein 5 (Gata5) polypeptide and a Pre-B-Cell Leukemia Transcription Factor 1 (Pbx1) polypeptide, wherein the Prdm1 polypeptide is a polypeptide having at least 85% amino acid sequence identity to an amino acid sequence selected from the group consisting of SEQ ID NO: 20-29, and wherein the Gata5 polypeptide is a polypeptide having at least 85% amino acid sequence identity to an amino acid sequence selected from the group consisting of SEQ ID NO: 30-39, and wherein the Pbx1 polypeptide is a polypeptide having at least 85% amino acid sequence identity to an amino acid sequence selected from the group consisting of SEQ ID NO: 40-49.

In some embodiments, the ECs are transduced with a vector encoding the Tbx3 polypeptide, and with one or more of a vector encoding the Prdm1 polypeptide, a vector encoding the Gata5 polypeptide, and a vector encoding the Pbx1 polypeptide. In some embodiments, at least one of the vectors further comprises a selectable marker. In some embodiments, the selectable marker is an antibiotic resistance marker, an enzymatic marker, an epitope marker, or a visual marker.

In some embodiments, the ECs are enriched for expression of the Tbx3 polypeptide, the Prdm1 polypeptide, the Gata5 polypeptide, the Pbx1 polypeptide, or a combination thereof, by selecting cells expressing at least one selectable marker.

In some embodiments, the expression of one or more of the Tbx3 polypeptide, the Prdm1 polypeptide, the Gata5 polypeptide, and the Pbx1 polypeptide is inducible.

In some embodiments, the expression of one or more of the Tbx3 polypeptide, the Prdm1 polypeptide, the Gata5 polypeptide, and the Pbx1 polypeptide is transient.

In some embodiments, wherein the ECs are cultured for at least 2-5 days, but not more than 10-14 days, to generate HGECs.

Another aspect of the disclosure is directed to a substantially pure population of HGECs produced by expressing in human ECs an exogenous nucleic acid encoding a T-box transcription factor 3 (Tbx3) polypeptide, or a polypeptide having at least 85% amino acid sequence identity to the Tbx3 polypeptide. In some embodiments, the substantially pure population of HGECs are produced by further expressing at least one exogenous nucleic acid encoding at least one transcription factor selected from the group consisting of a PR domain zinc finger protein 1 (Prdm1) polypeptide, a GATA Binding Protein 5 (Gata5) polypeptide and a Pre-B-Cell Leukemia Transcription Factor 1 (Pbx1) polypeptide, wherein the Prdm1 polypeptide is a polypeptide having at least 85% amino acid sequence identity to an amino acid sequence selected from the group consisting of SEQ ID NO: 20-29, and wherein the Gata5 polypeptide is a polypeptide having at least 85% amino acid sequence identity to an amino acid sequence selected from the group consisting of SEQ ID NO: 30-39, and wherein the Pbx1 polypeptide is a polypeptide having at least 85% amino acid sequence identity to an amino acid sequence selected from the group consisting of SEQ ID NO: 40-49.

In some embodiments, the HGECs, when transplanted into a subject, restore filtration of solutes, balance acid-base disruption and normalize vasomotor tone.

In some embodiments, the HGECs display a substantially the same characteristics as a human glomeruli cell isolated from a human kidney.

Another aspect of the disclosure is directed to a composition, comprising HGECs produced by expressing in human ECs an exogenous nucleic acid encoding a T-box transcription factor 3 (Tbx3) polypeptide, or a polypeptide having at least 85% amino acid sequence identity to the Tbx3 polypeptide, in a pharmaceutically acceptable carrier. In some embodiments, the HGECs of the composition are produced by further expressing at least one exogenous nucleic acid encoding at least one transcription factor selected from the group consisting of a PR domain zinc finger protein 1 (Prdm1) polypeptide, a GATA Binding Protein 5 (Gata5) polypeptide and a Pre-B-Cell Leukemia Transcription Factor 1 (Pbx1) polypeptide, wherein the Prdm1 polypeptide is a polypeptide having at least 85% amino acid sequence identity to an amino acid sequence selected from the group consisting of SEQ ID NO: 20-29, and wherein the Gata5 polypeptide is a polypeptide having at least 85% amino acid sequence identity to an amino acid sequence selected from the group consisting of SEQ ID NO: 30-39, and wherein the Pbx1 polypeptide is a polypeptide having at least 85% amino acid sequence identity to an amino acid sequence selected from the group consisting of SEQ ID NO: 40-49.

Another aspect of the disclosure is directed to a method of treating a renal disorder, comprising administering HGECs produced by expressing in human ECs an exogenous nucleic acid encoding a T-box transcription factor 3 (Tbx3) polypeptide, or a polypeptide having at least 85% amino acid sequence identity to Tbx3. In some embodiments, the administered HGECs were previously produced by expressing in human ECs an exogenous nucleic acid encoding a T-box transcription factor 3 (Tbx3) polypeptide, or a protein having at least 85% amino acid sequence identity to Tbx3 polypeptide, in a pharmaceutically acceptable carrier. In some embodiments, the administered HGECs were produced by further expressing at least one exogenous nucleic acid encoding at least one transcription factor selected from the group consisting of a PR domain zinc finger protein 1 (Prdm1) polypeptide, a GATA Binding Protein 5 (Gata5) polypeptide and a Pre-B-Cell Leukemia Transcription Factor 1 (Pbx1) polypeptide, wherein the Prdm1 polypeptide is a polypeptide having at least 85% amino acid sequence identity to an amino acid sequence selected from the group consisting of SEQ ID NO: 20-29, and wherein the Gata5 polypeptide is a polypeptide having at least 85% amino acid sequence identity to an amino acid sequence selected from the group consisting of SEQ ID NO: 30-39, and wherein the Pbx1 polypeptide is a polypeptide having at least 85% amino acid sequence identity to an amino acid sequence selected from the group consisting of SEQ ID NO: 40-49.

In some embodiments, the renal disorder is selected from chronic kidney failure and acute kidney failure.

In some embodiments, the HGECs are autologous to said recipient.

In some embodiments, the HGECs do not cause malignant transformation in said recipient.

In some embodiments, the HGECs are administered intravenously.

In some embodiments, the HGECs are mixed with kidney organoids before administration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figures 1A, 1B, 1C, 1D, 1E:
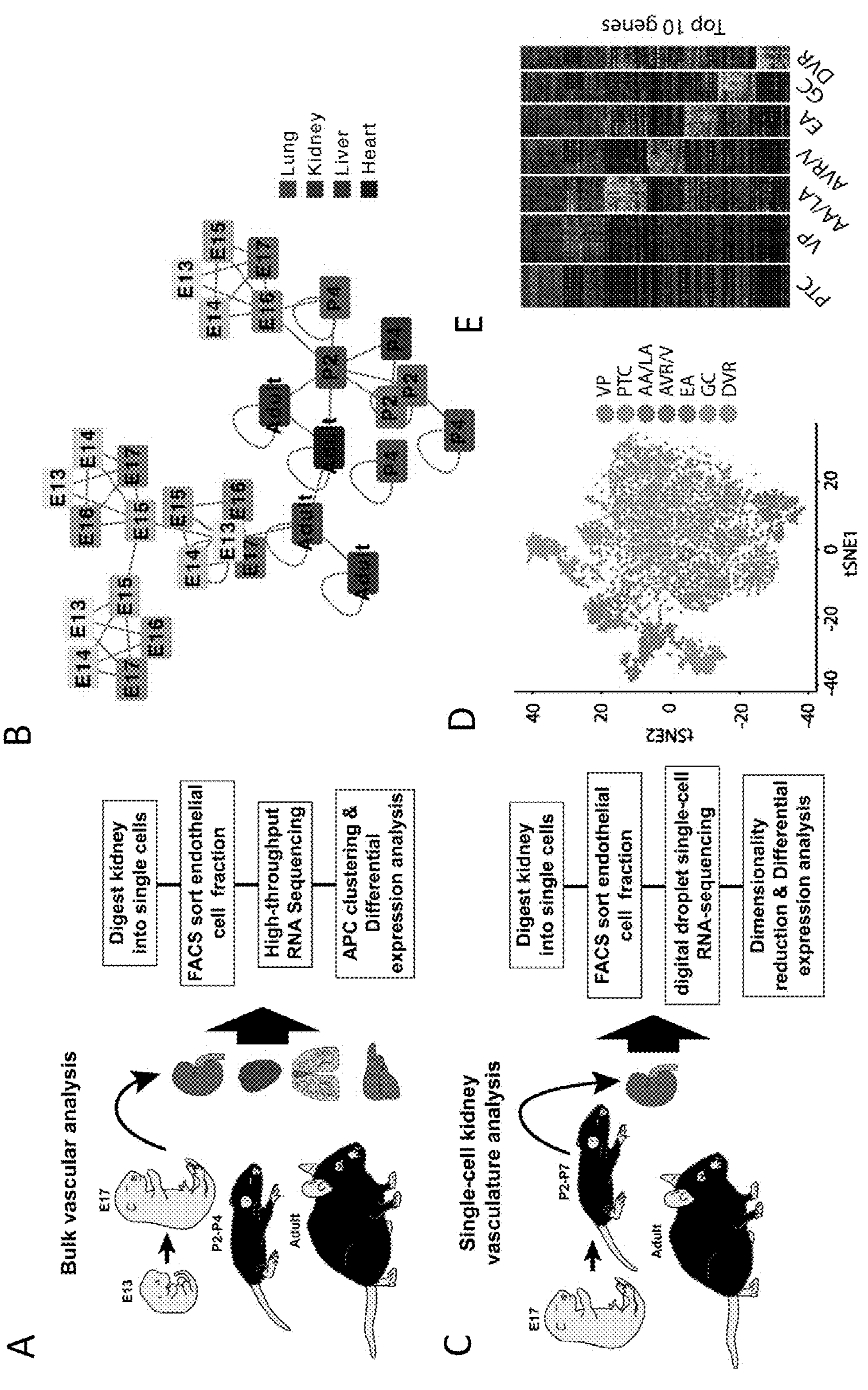
FIGS. 1A-1O. RNA sequencing analysis of kidney vascular endothelium throughout development. (A) Diagram denoting the workflow to sequence the bulk transcriptome of the vasculature throughout development. (B) Affinity propagation clustering (APC) cluster of each stage. Edge lengths are proportional to Euclidean distances. Stages are color-coded according to the organ. (C) Diagram denoting the workflow to sequence the transcriptome of the vasculature at single-cell resolution. (D) Clustering of single-cell RNA expression according to a reduced dimensionality (t-SNE) for endothelial cells isolated from the kidneys of (E) E17 (F) P2 (G) P7 and (H) adult mice. All populations are merged in (I). VP, vascular progenitor; PTC, peritubular capillary; AA/LA, afferent arteriole/large arteries (pre-glomerular); AVR/V, ascending vasa recta/venous blood vessels; EA, efferent arteriole; GC, glomerular capillaries; DVR, descending vasa recta. (E) Heat map denoting genes enriched in each single-cell cluster. (F) Violin plots of normalized scRNA expression profiles of kidney endothelial cells. (G) Staining validation of Sox17 enriched in arteries in E15 kidneys. Scale bar 50 μm. (H) Staining validation of Gja5 in arteries except for the efferent arteriole in E15 kidneys. Scale bar 50 μm. (I) Flk1-eGFP reporter showing lower expression of VEGFR2 in arteries. Images were taken at the same exposure. Scale bar 50 μm. (J) Aqp1 staining in adult human kidney showing enrichment in afferent/pre-glomerular arterioles, and the descending vasa recta. Endothelial cells were marked with VE-cadherin staining (VEcad). Scale bar 100 μm. (K) FISH staining validation of Ehd3 showing enrichment in glomerular capillaries in E15 embryos. VR, Vasa recta. Scale bar 50 μm. (L) Staining validation of Plvap in peritubular capillaries, veins, and the ascending vasa recta in E15 kidneys. VR, vasa recta. Scale bar 50 μm. (M) Staining validations of Igfbp7 in the descending and ascending vasa recta in adult kidneys. Endothelial cells were stained with Endomucin (Emcn). PCT, proximal convoluted tubule. Scale bar left 100 μm, right 200 μm. (N) Staining validations of Igfbp5 in glomerular capillaries, peritubular capillaries, and the ascending vasa recta. CT, convoluted tubule. Scale bar 100 μm. (0) Illustration of known vascular subtypes which were identified through ddSEQ. Vascular subtypes not identified are greyed in the text below.

An aspect of this disclosure provides a method of generating human glomeruli endothelial cells (HGECs) from human endothelial cells (ECs) by expressing in human ECs an exogenous nucleic acid encoding a T-box transcription factor 3 (Tbx3) polypeptide, a PR domain zinc finger protein 1 (Prdm1) polypeptide, a GATA Binding Protein 5 (Gata5) polypeptide or a Pre-B-Cell Leukemia Transcription Factor 1 (Pbx1) polypeptide. Without limiting to any particular theory, the inventors discovered that expressing a Tbx3 polypeptide, a Prdm1 polypeptide, a Gata5 polypeptide or a Pbx1 polypeptide, alone or in combination, in human ECs can transdifferentiate the human ECs into HGECs in vitro, and, when transplanted, can safeguard and augment kidney functionality in vivo.

In one aspect, the disclosure provides a product obtained from the present methods, e.g., a substantially pure population of HGECs.

In a further aspect, a resulting product from the present methods, e.g., a substantially pure population of HGECs, is administered to a subject in need, such as a subject suffering from chronic kidney failure and acute kidney failure.

The term "about," as used throughout this disclosure, refers to ±10% of any given value.

Subject in Need

A "subject in need", referred to herein, is a person suffering from chronic kidney failure and acute kidney failure or at risk of developing chronic kidney failure and acute kidney failure. In some embodiments, the subject suffers from pre-renal, renal, or post-renal kidney failure. As used herein "pre-renal" kidney failure (chronic or acute) occurs when the blood flow to the kidney is impaired. In some embodiments, impaired blood flow occurs from blood loss, heart disease, liver failure, some medications like aspirin and ibuprofen, overuse of NSAIDs. As used herein "renal" kidney failure (chronic or acute) occurs when there is damage to the kidney, a blood clot formation in kidney, or kidney infections. As used herein "post-renal" kidney failure (chronic or acute) occurs when there is urinary obstruction. Diseases that can cause blockage of urine include colon cancer, prostate cancer, cervical cancer, and blood clots.

Endothelial Cells

In some embodiments, the ECs are adult human endothelial cells that could be isolated from any tissue-specific organs. In some embodiments, the ECs comprise generic endothelial cells, which can be derived from any tissue that ECs can be isolated from. In some embodiments, the ECs are autologous ECs isolated from tissue subject in need of the treatment disclosed herein. In a specific embodiment, the autologous ECs are isolated from a subject's own adipose tissue. In some embodiments, the ECs are allogeneic ECs derived from a genetically matched donor. In some embodiments, the ECs are derived from circulating or tissue-specific EC progenitor or stem cells.

In some embodiments, the endothelial cell is a differentiated (mature) endothelial cell. The term "differentiated" or "differentiated endothelial cell" as used herein refers to a developmental process whereby an endothelial cell becomes specialized for a particular function, for example, where cells acquire one or more morphological characteristics and/or functions different from that of the initial cell type. The term "differentiation" includes both lineage commitment and development of a cell into a mature, fully differentiated adult endothelial cell. Differentiation may be assessed, for example, by monitoring the presence or absence of lineage markers, using immunohistochemistry or other procedures known to one skilled in the art.

Endothelial cells can be obtained by methods known in the art. For example, endothelial cells can be isolated from tissue using a collagenase-based digestion approach as described in Ginsberg, M. et al. Cell; 151, 559-575, (2012) and U.S. Pat. No. 6,899,822 to Ferrara et al. Endothelial lineage can be verified by staining with, for example, an anti-CD31 antibody, VE-cadherin or anti-von Willebrand factor antibody. Isolation of ECs can be achieved using antibodies specific for EC surface markers, such as VE-cadherin, CD31 or VEGFR2, attached to magnetic beads or fluorophores for use in Magnetic or Fluorescence Activated Cell Sorting (MACS or FACS). In some embodiments, the ECs are derived from direct transcriptional conversion of non-vascular cells, such as fibroblasts into endothelial cell fate. In some embodiments, non-vascular cells are directly converted into endothelial cells by introducing transcription factors Flil and Erg into the non-vascular cells.

In the alternative, endothelial cells may be obtained from commercial sources. Endothelial cells can be cultured and maintained (expanded) under conditions that maintain their differentiated lineage and the ability to replicate. Such conditions have been well documented in the art. For example, isolated endothelial cells can be cultured in coated tissue culture dishes in complete media including endothelial cell growth supplement. The endothelial cells can then be split and passaged until used.

In some embodiments, the differentiated human endothelial cell is a human umbilical vein derived endothelial cell (HUVEC), a human adipose derived endothelial cell, Induced Pluripotent Stem Cells (iPSC)-derived endothelial cells, adult dermal micro-vascular endothelial cells (hDMECs), or a tissue/organ specific human fetal, neonatal or adult-derived endothelial cell. In some embodiments of the present methods the differentiated endothelial cells are organ-specific endothelial cells including, but not limited to, endothelial cells of the heart, kidney, testis, ovary, retina, liver, pancreas, brain, lungs, spleen, large or small intestine, ovary or testis, or other endocrine organs. In other embodiments, the differentiated endothelial cells are tissue-specific endothelial cells from muscle, lymph tissue, olfactory tissue, osteogenic tissue, oral (dental) tissue, or glandular tissue (e.g., endocrine, thymic).

A differentiated endothelial cell can be cultured in any culture medium capable of sustaining growth of endothelial cells such as, but not limited to, DMEM (high or low glucose), advanced DMEM, DMEM/MCDB 201, Eagle's basal medium, Ham's F10 medium (F10), Ham's F-12 medium (F12), Hayflick's Medium, Iscove's modified Dulbecco's medium, Mesenchymal Stem Cell Growth Medium (MSCGM), DMEM/F12, RPMI 1640, and CELL-GRO-FREE (Corning cellgro, Corning, NY). The culture medium can be supplemented with one or more components including, for example fetal bovine serum, preferably about 2-15% (v/v); equine serum; human serum; fetal calf serum; beta-mercaptoethanol, preferably about 0.001% (v/v); one or more growth factors, for example, platelet-derived growth factor (PDGF), epidermal growth factor (EGF), fibroblast growth factor (FGF), vascular endothelial growth factor-A (VEGF-A), insulin-like growth factor-1 (IGF-1), leukocyte inhibitory factor (LIF) and erythropoietin; amino acids, including L-valine; and one or more antibiotic and/or anti-mycotic agents to control microbial contamination, such as, for example, penicillin G, streptomycin sulfate, amphotericin B, gentamicin, and nystatin, either alone or in combination.

The endothelial cell can be cultured to expand the cell numbers, prior to reprogramming Sufficient numbers of endothelial cells may be isolated from an initial sample; however, even if an acceptable number of differentiated endothelial cells are present in the initial sample, expansion of the cells in culture can provide an even greater supply of endothelial cells for reprogramming Methods of culturing and expanding cells are known in the art. See, for example, Helgason et al., *Basic Cell Culture Protocols,* 4th Edition, Human Press Publishing, 2013; and Mitry et al, *Human Cell Culture Protocols,* 3rd Edition, Human Press Publishing, 2012.

Transcription Factors TBX3, PRDM1, GATA5, and PBX1

The term “Tbx3,” “TBX3” or “Tbx3 transcription factor” are used interchangeably herein to refer to the T-Box Transcription Factor 3 (aka., UMS, TBX3-ISO, or XHL). Human TBX3 sequences are as set forth in RefSeq Gene ID 6926, NCBI Reference Sequence No. NM_005996.4, which encodes a DNA binding transcription factor protein having an amino acid sequence set forth in NP_005987. Possible TBX3 protein sequences are as follows; *Homo sapiens* TBX3 isoform 1 (NP_005987): SEQ ID NO: 1; *Homo sapiens* TBX3 isoform 2 (NP_057653): SEQ ID NO: 2; *Mus musculus* TBX3 (NP_035665): SEQ ID NO: 3; *Rattus norvegicus* TBX3 (NP_853669): SEQ ID NO: 4; *Gallus gallus* TBX3 (NP_001257807): SEQ ID NO: 5; *Canis lupus familiaris* TBX3 (XP_013963215): SEQ ID NO: 6; *Danio rerio* TBX3 (NP_001095140): SEQ ID NO: 7; *Xenopus tropicalis* TBX3 (NP_001027524): SEQ ID NO: 8; *Macaca mulatta* TBX3 (XP_001111920): SEQ ID NO: 9; *Pan troglodytes* TBX3 (XP_001154426): SEQ ID NO: 10; *Bos taurus* TBX3 (XP_024833523): SEQ ID NO: 11; *Oryzias latipes* TBX3 (XP_011480082): SEQ ID NO: 12; *Equus caballus* TBX3 (XP_023502869): SEQ ID NO: 13; *Sus scrofa* TBX3 (XP_001928037): SEQ ID NO: 14; *Mustela putorius furo* TBX3 (XP_004753472): SEQ ID NO: 15; *Camelus ferus* TBX3 (XP_032328065): SEQ ID NO: 16; *Pteropus alecto* TBX3 (XP_006908645): SEQ ID NO: 17; *Ictalurus punctatus* TBX3 (XP_017316212): SEQ ID NO: 18; *Hipposideros armiger* TBX3 (XP_019497204): SEQ ID NO: 19.

A TBX3 nucleic acid of the present disclosure can include the TBX3 DNA sequence or a portion thereof, as well as an RNA transcript that expresses TBX3 protein. Functional derivatives and homologs of TBX3 are further contemplated for use in the disclosed methods. As used herein, a “functional derivative” of a given transcription factor is a molecule that possesses the capacity to perform the biological function of the given transcription factor. For example, a functional derivative of TBX3 (or PRDM1 or GATA5 or PBX1) as disclosed herein is a molecule that is able to bind DNA as the TBX3 (or PRDM1 or GATA5 or PBX1) transcription factor is and reprogram differentiated endothelial cells. Functional derivatives include fragments, variants, parts, portions, equivalents, analogs, mutants, mimetics from natural, synthetic or recombinant sources including fusion proteins. A “homolog” refers a protein related to the given transcription factor by descent from a common ancestral nucleic acid sequence. Homologs contemplated herein include, but are not limited to, TBX3 proteins derived from different species, such as, for example, mouse, rat, and monkey.

The term “Prdm1,” “PRDM1” or “Prdm1 transcription factor” are used interchangeably herein to refer to the PR domain-containing Protein 1 (aka., BLIMP1, EC 2.1.1, or XHL) transcription factor. Human PRDM1 sequences are as set forth in RefSeq Gene ID 639, NCBI Reference Sequence No. NM_001198.4, which encodes a DNA binding transcription factor protein having an amino acid sequence set forth in NP_001189. Possible PRDM1 protein sequences are as follows; *Homo sapiens* PRDM1 (NP_001189): SEQ ID NO: 20; *Mus musulus* PRDM1 (NP_031574): SEQ ID NO: 21; *Rattus norvegicus* PRDM1 (XP_008771213): SEQ ID NO: 22; *Danio rerio* PRDM1 (NP_955809): SEQ ID NO: 23; *Gallus gallus* PRDM1 (XP_004940410): SEQ ID NO: 24; *Canis lupus familiaris* PRDM1 (XP_005627729): SEQ ID NO: 25; *Xenopus tropicalis* PRDM1 (XP_002937203): SEQ ID NO: 26; *Bos taurus* PRDM1 (NP_001179865): SEQ ID NO: 27; *Macaca mulatta* PRDM1 (XP_001087708): SEQ ID NO: 28; *Camelus ferus* PRDM1 (XP_006189488): SEQ ID NO: 29.

A PRDM1 nucleic acid of the present disclosure can include the PRDM1 DNA sequence or a portion thereof, as well as an RNA transcript that expresses PRDM1 protein. Functional derivatives and homologs of PRDM1 are further contemplated for use in the disclosed methods.

The term “Gata5,” “GATA5” or “Gata5 transcription factor” are used interchangeably herein to refer to the GATA Binding Protein 5 (aka., GATA5, CHRD5, or BB379024.1) transcription factor. Human GATA5 sequences are as set forth in RefSeq Gene ID 140628, NCBI Reference Sequence No. NM_080473.5, which encodes a DNA binding transcription factor protein having an amino acid sequence set forth in NP_001189. Possible GATA5 protein sequences are as follows; *Homo sapiens* GATA5 (NP_536721): SEQ ID NO: 30; *Mus musculus* GATA5 (NP_032119): SEQ ID NO: 31; *Danio rerio* GATA5 (NP_571310): SEQ ID NO: 32; *Gallus gallus* GATA5 (NP_990752): SEQ ID NO: 33; *Canis lupus familiaris* GATA5 (XP_543086): SEQ ID NO: 34; *Xenopus tropicalis* GATA5 (XP_031749920): SEQ ID NO: 35; *Rattus norvegicus* GATA5 (NP_001019487): SEQ ID NO: 36; *Bos taurus* GATA5 (NP_001029393): SEQ ID NO: 37; *Macaca mulatta* GATA5 (XP_028684531): SEQ ID NO: 38; *Ovis aries* GATA5 (XP_027832772): SEQ ID NO: 39.

A GATA5 nucleic acid of the present disclosure can include the GATA5 DNA sequence or a portion thereof, as well as an RNA transcript that expresses PRDM1 protein. Functional derivatives and homologs of GATA5 are further contemplated for use in the disclosed methods.

The term “Pbx1,” “PBX1” or “Pbx1 transcription factor” are used interchangeably herein to refer to the Pre-B-Cell Leukemia Transcription Factor (aka., PBX Homeobox, CAKUHED, or PRL). Human PBX1 sequences are as set forth in RefSeq Gene ID 5087, NCBI Reference Sequence No. NM_002585.4, which encodes a DNA binding transcription factor protein having an amino acid sequence set forth in NP_002576. Possible GATA5 protein sequences are as follows; *Homo sapiens* PBX1 (NP_002576): SEQ ID NO: 40; *Mus musculus* PBX1 (NP_899198): SEQ ID NO: 41; *Rattus norvegicus* PBX1 (NP_001128334): SEQ ID NO: 42; *Gallus gallus* PBX1 (XP_025008517): SEQ ID NO: 43; *Pan*

*troglodytes* PBX1 (XP_009435139): SEQ ID NO: 44; *Canis lupus familiaris* PBX1 (XP_022271012): SEQ ID NO: 45; *Bos taurus* PBX1 (NP_001179697): SEQ ID NO: 46; *Xenopus tropicalis* PBX1 (XP_012816136): SEQ ID NO: 47; *Ovis aries* PBX1 (XP_012040770): SEQ ID NO: 48; *Camelus ferus* PBX1 (XP_032319725): SEQ ID NO: 49.

A PBX1 nucleic acid of the present disclosure can include the PBX1 DNA sequence or a portion thereof, as well as an RNA transcript that expresses PRDM1 protein. Functional derivatives and homologs of PBX1 are further contemplated for use in the disclosed methods.

Methods of Generating Human Glomeruli Endothelial Cells (HGECs) from Human Endothelial Cells (ECs)

The HGECs of the present disclosure are derived from endothelial cells (ECs), which are "reprogrammed" or "reset" through the expression of at least one exogenous nucleic acid encoding at least one transcription factor selected from the group consisting of Tbx3, Prdm1, Gata5 and Pbx1, in the endothelial cells. In some embodiments, HGECs are produced by expressing only Tbx3 from an exogenous nucleic acid in an EC. In some embodiments, at least one transcription factor selected from the group consisting of Prdm1, Gata5 and Pbx1 is also expressed from at least one nucleic acid in an EC that already expresses Tbx3 from an exogenous nucleic acid. In some embodiments, Tbx3, Prdm1, Gata5 and Pbx1 are all expressed in an EC from at least one exogenous nucleic acid at the same time.

An aspect of this disclosure is directed to methods of generating human glomeruli endothelial cells (HGECs) from human endothelial cells (ECs), comprising expressing in human ECs an exogenous nucleic acid encoding a T-box transcription factor 3 (Tbx3) polypeptide. In some embodiments, the method is directed to expressing in human ECs a protein having at least 85%, at least 88%, at least 90%, at least 93%, at least 95%, at least 99%, or more amino acid sequence identity to the Tbx3 polypeptide. In some embodiments, the Tbx3 polypeptide comprises an amino acid sequence selected from the group consisting of SEQ ID NO: 1-19.

In some embodiments, the method further comprises expressing at least one exogenous nucleic acid encoding at least one transcription factor selected from the group consisting of a PR domain zinc finger protein 1 (Prdm1) polypeptide, a GATA Binding Protein 5 (Gata5) polypeptide and a Pre-B-Cell Leukemia Transcription Factor 1 (Pbx1); polypeptide wherein the Prdm1 polypeptide is a polypeptide having at least 85%, at least 88%, at least 90%, at least 93%, at least 95%, at least 99%, or more amino acid sequence identity to an amino acid sequence selected from the group consisting of SEQ ID NO: 20-29, and wherein the Gata5 polypeptide is a polypeptide having at least 85%, at least 88%, at least 90%, at least 93%, at least 95%, at least 99%, or more amino acid sequence identity to an amino acid sequence selected from the group consisting of SEQ ID NO: 30-39, and wherein the Pbx1 polypeptide is a polypeptide having at least 85%, at least 88%, at least 90%, at least 93%, at least 95%, at least 99%, or more amino acid sequence identity to an amino acid sequence selected from the group consisting of SEQ ID NO: 40-49.

In some embodiments, the endothelial cell is at a starting concentration of at least 3 million cells/ml, at least 3.5 million cells/ml, at least 4 million cells/ml, at least 4.5 million cells/ml, at least 5 million cells/ml, at least 5.5 million cells/ml, at least 6 million cells/ml, at least 6.5 million cells/ml, or at least 7 million cells/ml. In a specific embodiment, the endothelial cell is at a starting concentration of about 5 million cells/ml.

In some embodiments, the culturing of the endothelial cell is carried out in a medium supplemented with molecules, such as basic FGF (FGF-2) and heparin. In some embodiments, the medium comprises between about 5 ng/ml and about 100 ng/ml FGF2. In some embodiments, the medium comprises about 5 ng/ml, about 10 ng/ml, about 15 ng/ml, about 20 ng/ml, about 25 ng/ml, about 30 ng/ml, about 35 ng/ml, about 40 ng/ml, about 45 ng/ml, about 50 ng/ml, about 55 ng/ml, about 60 ng/ml, about 65 ng/ml, about 70 ng/ml, about 75 ng/ml, about 80 ng/ml, about 85 ng/ml, about 90 ng/ml, about 95 ng/ml, about 100 ng/ml FGF2. In a specific embodiment, medium comprises about 10 ng/ml FGF-2. In some embodiments, the medium comprises between about 20 μg/ml and about 200 μg/ml heparin. In some embodiments, the medium comprises about 20 μg/ml, about 30 μg/ml, about 40 μg/ml, about 45 μg/ml, about 50 μg/ml, about 60 μg/ml, about 70 μg/ml, about 80 μg/ml, about 90 μg/ml, about 100 μg/ml, about 110 μg/ml, about 125 μg/ml, about 150 μg/ml, 175 about μg/ml, or about 200 μg/ml heparin. In a specific embodiment, medium comprises about 100 μg/ml heparin.

In some embodiments, the culturing is carried out in a medium further supplemented with molecules in addition to FGF-2 and/or heparin, such as human serum albumin (between 0.05% and 2%, e.g., about 0.05%, about 0.1%, about 0.5%, about 1%, about 1.5%, or about 2%), human transferring (between 5 μg/ml and 20 μg/ml, e.g., about 5 μg/ml, about 10 μg/ml, about 15 μg/ml, or about 20 μg/ml), ethanolamine (between 20 μM and 100 μM, e.g., about 20 μM, about 30 μM, about 40 μM, about 50 μM, about 60 μM, about 70 μM, about 80 μM, about 90 μM, or about 100 μM), phosphoethanolamine (between 20 μM and 100 μM, e.g., about 20 μM, about 30 μM, about 40 μM, about 50 μM, about 60 μM, about 70 μM, about 80 μM, about 90 μM, or about 100 μM), sodium selenite (between 3 μg/ml and 10 μg/ml, e.g., about 3 μg/ml, about 3.5 μg/ml, about 3.5 μg/ml, about 4 μg/ml, about 4.5 μg/ml, about 5 μg/ml, about 5.5 μg/ml, about 6 μg/ml, about 6.5 μg/ml, about 7 μg/ml, about 7.5 μg/ml, about 8 μg/ml, about 8.5 μg/ml, about 9 μg/ml, about 9.5 μg/ml, or about 10 μg/ml), glucose (between 2 mM and 10 mM, e.g., about 2 mM, about 2.5 mM, about 3 mM, about 3.5 mM, about 4 mM, about 4.5 mM, about 5 mM, about 5.5 mM, about 6 mM, about 6.5 mM, about 7 mM, about 7.5 mM, about 8 mM, about 8.5 mM, about 9 mM, about 9.5 mM, or about 10 mM), Triiodothyronine (T3) (between 0.3 ng/mL and 1 ng/mL, e.g., about 0.3 ng/mL, about 0.4 ng/mL, about 0.5 ng/mL, about 0.6 ng/mL, about 0.65 ng/mL, about 0.7 ng/mL, about 0.8 ng/mL, about 0.9 ng/mL, about 1 ng/mL), Prolactin (PRL) (between 10 ng/mL and 30 ng/mL, e.g., about 10 ng/mL, about 15 ng/mL, about 20 ng/mL, about 23 ng/mL, about 25 ng/mL, about 28 ng/mL, about 30 ng/mL), IGF-I (between 1 ng/mL and 10 ng/mL, e.g., about 1 ng/mL, about 2 ng/mL, about 3 ng/mL, about 4 ng/mL, about 5 ng/mL, about 6 ng/mL, about 7 ng/mL, about 8 ng/mL, about 9 ng/mL, about 10 ng/mL) or a combination thereof. In a specific embodiment, the medium comprises 10 ng/ml FGF-2, 100 μg/ml heparin, 0.1% human serum albumin, 10 μg/ml human transferrin, 50 μM Ethanolamine, 50 μM Phosphoethanolamine, 6.7 μg/ml sodium selenite, 5.5 mM glucose, 0.65 ng/mL Triiodothyronine (T3), 23 ng/mL Prolactin (PRL), and 5 ng/mL IGF-I. In some embodiments, the medium comprises between about 2% and about 10% fetal bovine serum (FBS). In some embodiments, the medium comprises about 2%, about 3%, about 4%, about 5%, about 6%, about 7%, about 8%, about 9%, or about 10% fetal bovine serum (FBS). In some embodiments, the medium comprises a basal medium, such as M199 (Sigma), 100 ng FGF2, 100 μg/ml of heparin, about 10% FBS and Endothelial mitogen (Alfa Aesar, J65416).

In some embodiments, the culturing of the endothelial cell is performed in a bioreactor or a microfluidic device. In some embodiments, the microfluidic device is capable of transporting human blood or other specialized media, solutions, chemicals or biopharmaceutical drugs or reagents. In some embodiments, the culturing of the endothelial cell is performed in a 3D gel.

In some embodiments, the culturing of the EC expressing the above-defined at least one exogenous nucleic acid is carried out for at least 1-4 weeks. In some embodiments, the culturing is done for at least 3-4 weeks. In some embodiments, the culturing is done for at least 1 week, at least 2 weeks, at least 3 weeks, at least 24 days, at least 4 weeks, at least 32 days, at least 5 weeks, at least 38 days, at least 6 weeks, at least 45 days, at least 7 weeks, at least 52 days, at least 8 weeks, but not more than 4 months or not more than 3 months. In some embodiments, the culturing is performed for about 3 weeks, about 24 days, about 4 weeks, about 32 days, about 5 weeks, about 38 days, about 6 weeks, about 45 days, about 7 weeks, about 52 days, or about 8 weeks.

In other embodiments, the exogenous nucleic acid encoding at least one transcription factor selected from TBX3, PRDM1, GATA5, and PBX1 provided to a differentiated endothelial cell is a modified synthetic RNA. Modified synthetic RNA molecules can be produced by methods known by one of ordinary skill in the art, such as those set forth in Machnicka, M A, et al. *Nucleic Acids Res.,* 41 pp. D262-D267, (2013). Exemplary modified synthetic molecules for use in the present invention include chemical modifications to the RNA polynucleotide that modulate the stability (alter nuclease resistance) or cellular uptake (e.g., conjugation of the RNA polynucleotide to a cholesterol, linker, lipid, polymer, peptide or apamer).

The exogenous nucleic acids of the disclosure can be provided to a cell by methods well known to those of ordinary skill in the art. For example, the nucleic acid can integrate a selected transcription factor (TBX3, PRDM1, GATA5, or PBX1) nucleic acid sequence into the endothelial cell genome, or non-integrative, meaning the transcription factor gene is expressed from an extrachromosomal location. In some embodiments, the transcription factor-encoding nucleic acid sequence is provided by a vector into which the nucleic acid sequence is cloned by techniques known in the art. The vector can be introduced by any suitable method, such as by transfection or by viral-mediated transduction.

The present methods include culturing a differentiated endothelial cell including the exogenous nucleic acid under conditions that express the TBX3, PRDM1, GATA5, or PBX1 transcription factor protein. In certain embodiments, the TBX3, PRDM1, GATA5, or PBX1 protein is expressed constitutively. In other embodiments, the TBX3, PRDM1, GATA5, or PBX1 protein is expressed transiently, such as under the control of an inducible promoter. In certain embodiments, the exogenous TBX3, PRDM1, GATA5, or PBX1 transcription factor is expressed in an endothelial cell for at least 3 weeks, at least 4 weeks, at least 5 weeks, at least six weeks, at least 7 weeks, at least 8 weeks, at least 9 weeks, at least 10 weeks, at least 11 weeks, at least 12 weeks or more. In a specific embodiment, exogenous TBX3, PRDM1, GATA5, or PBX1 protein is expressed for at least 4 weeks. In another embodiment, the exogenous TBX3, PRDM1, GATA5, or PBX1 protein is expressed for at least 3 to 4 weeks.

Vectors for use for the methods of the instant disclosure include, for example, retrovirus, lentivirus, adenovirus, adeno-associated virus, and other vectors that, once introduced into a cell, integrate into a chromosomal location within the genome of the subject and provide stable, long-term expression of at least one of TBX3, PRDM1, GATA5, or PBX1. Other vectors include episomal vectors, as well as engineered lentivirus vector variants that are non-integrative. Here, the TBX3, PRDM1, GATA5, or PBX1 nucleotide sequence can be cloned into the vector sequence; the vector is grown in differentiated endothelial cells, and used to reprogram the endothelial cells using the methods described herein.

In one embodiment, the nucleic acid encoding at least one transcription factor selected from TBX3, PRDM1, GATA5, and PBX1 is included in a lentiviral vector and provided to an endothelial cell by lentivirus-mediated transduction. In one embodiment, the lentiviral vector is lenti pgk-vector. In specific embodiments the exogenous TBX3, PRDM1, GATA5, or PBX1 encoding nucleic acid is provided to an endothelial cell by transduction with an inducible expression system such as, for example, the reverse tet-transactivator (rtTA)-doxycycline inducible expression system.

In some embodiments, the vectors comprise at least one selectable marker. In some embodiments, the selectable marker is an antibiotic resistance marker, an enzymatic marker, an epitope marker, or a visual marker.

In some embodiments, the ECs are enriched for expression of Tbx3, Prdm1, Gata5, Pbx1, or a combination thereof, by selecting cells expressing at least one selectable marker.

In some embodiments, the endothelial cells are cultured in serum-free media for a period of time. In some embodiments, the present methods include culturing the endothelial cells in serum free media for at least 7 days, at least 10 days, at least 2 weeks, at least 3 weeks, at least 4 weeks, at least 5 weeks, at least 6 weeks, at least 7 weeks, at least 8 weeks or more.

Isolated Human Glomeruli Endothelial Cells ("HGECs") and a Substantially Pure Population of HGECs In another aspect, this disclosure provides isolated human glomeruli endothelial cells ("HGECs") and a substantially pure population of HGECs, prepared by the method disclosed herein (reprogramming ECs to express at least one transcription factor selected from TBX3, PRDM1, GATA5, and PBX1 via one or more exogenously introduced nucleic acids).

In some embodiments, the HGECs provided herein display substantially the same characteristics as a human glomeruli cell isolated from a human kidney. In some embodiments, the term "characteristics" of a cell refers to a phenotypic marker profile of the cell. As used herein, the phrase "phenotypic marker profile" or "phenotypic signature" refers to a group of proteins that are expressed on the surface of a cell that define the type and tissue origin of the cell and distinguish the cell from cells of other types or tissue origins. In some embodiments, the term "characteristics" of a cell refers to a molecular marker profile of the cell. As used herein, the phrase "molecular marker profile" refers to a group of gene expression profiles that define the type and tissue origin of the cell and distinguish the cell from cells of other types or tissue origins. In some embodiments, the molecular marker profile of a cell is determined using RNA-seq, single cell RNA-seq or in situ hybridization. In some embodiments, the term "characteristics" of a cell refers to functional features of the cell.

In some embodiments, the HGECs provided herein comprise endothelial cells that display the phenotypic marker profile of a human glomeruli cell isolated from a human kidney. In some embodiments, the HGECs provided herein display the following phenotypic marker profile: $Ehd3^+Mapt^+Sox17^+Mest^+Igfbp5^+Kdr^+VE\text{-}cadherin^+$ (Ehd3: EH Domain Containing 3, Mapt: Microtubule Associated Protein Tau, Sox17: SRY-Box Transcription Factor 17, Mest: Mesoderm Specific Transcript, Igfbp5: Insulin Like Growth Factor Binding Protein 5, Kdr: Kinase Insert Domain Receptor, VE-cadherin: Vascular Endothelial cadherin). In some embodiments, this set of phenotypic markers is used to distinguish HGECs from other cells and cell clusters within the kidney, or purify HGECs for further analyses or therapeutic purposes. In some embodiments, flow cytometry is used to identify the phenotypic marker phenotype of a cell.

In some embodiments, the HGECs provided herein comprise endothelial cells that display the molecular marker profile of a human glomeruli cell isolated from a human kidney. In some embodiments, the molecular markers of HGECs provided herein are most similar to human glomeruli cell isolated from a human kidney, and are distinct and distinguished from other cells and cell clusters within the kidney, and from other organ specific endothelial cells, such as liver, lung or heart endothelial cells.

In some embodiments, the HGECs provided herein comprise endothelial cells that display the functional features of a human glomeruli cell isolated from a human kidney. In some embodiments, the functional features of an HGEC provided herein includes filtration (ability to filter waste from blood) when transplanted. In some embodiments, an HGEC provided herein that can filter waste from blood expresses filtration transporters, salt transporters, ion transporters and filtration factors that are known in the art.

By "isolated" HGECs or "substantially pure population" of HGECs, it is meant that a significant portion of the cells in the cell population prepared by the reprogramming method disclosed herein are HGECs having the characteristics as defined above. By "significant portion" is meant at least 70%, 75%, 80%, 85%, 90%, 95%, 96%, 97%, 98%, 99% or higher.

Methods for Treating a Subject in Need by Administering HGECs

In another aspect, the disclosure is directed to a method of treating a subject in need comprising administering to the subject in need HGECs prepared by the methods described hereinabove. By "treating" it is meant to ameliorate or eliminate the severity of the symptoms (e.g., symptoms of acute or chronic kidney failure), or reduce the risk or delay the onset of developing the disease (e.g., acute or chronic kidney failure).

In some embodiments, the HGEC is autologous to the recipient subject (i.e., an endothelial cell is taken from the subject, converted into an HGEC as described herein, and transplanted back to the same subject). In some embodiments, the HGEC is allogeneic to the recipient subject (i.e., the HGECs are prepared from endothelial cells from another donor); in some such embodiments, the HGEC is genetically matched to the recipient subject.

In some embodiments, the administration of the HGECs is achieved by subcutaneous transplantation, direct injection into kidneys. In some embodiments, the administration of the HGECs is achieved by surgical or catheter implantation. In some embodiments, the administration of the HGECs is achieved by infusion through an intravascular route.

In some embodiments, HGECs are administered as a composition comprising HGECs and a pharmaceutically acceptable carrier. For the purposes of this disclosure, "pharmaceutically acceptable carriers" means any of the standard pharmaceutical carriers. Examples of suitable carriers are well known in the art and may include, but are not limited to, any of the standard pharmaceutical carriers such as a phosphate buffered saline solution and various wetting agents. Compositions comprising such carriers are formulated by well-known conventional methods.

In some aspects, the administered HGECs are functional in vivo. As used herein, the term "functional" refers to an islet that can replace glomerulus cells and effectively filter blood, restore filtration of solutes, balance acid-base disruption and normalize vasomotor tone. In some embodiments, the HGECs of the instant disclosure display a substantially the same characteristics as a human glomeruli cell isolated from a human kidney In some embodiments, the administered HGECs remain engrafted and functional for at least 2 weeks, at least 3 weeks, at least a month, at least 6 weeks, at least 2 months, at least 10 weeks, at least 3 months, at least 4 months, at least 5 months, at least 6 months or at least a year.

In some embodiments, the HGECs do not cause malignant transformation in said recipient. In some embodiments, the HGECs are mixed with kidney organoids before administration.

Unless defined otherwise, all technical and scientific terms used herein have the same meaning as commonly understood by one skilled in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

The specific examples listed below are only illustrative and by no means limiting.

EXAMPLES

Example 1: Materials and Methods

Cell Digestion and FACS Sorting

To isolate adult endothelial cells from mouse kidney, liver, heart, and lung, mice were injected intravitally with 25 μg of anti-VE-cadherin-AF647 antibody (clone BV13, Biolegend) retro-orbitally in 6 to 8-week-old male C57BL/6J mice under anesthesia 10 min before they were sacrificed and the organs harvested. For cell sorting, organs were minced and incubated with Collagenase A (25 mg ml-1) and Dispase II (25 mg ml-1) at 37° C. for 20-30 min to create a single-cell suspension. Cells were filtered through a 40-μm filter immediately before counter staining. The single-cell suspension was first blocked with an Fc-quenching antibody before antibody staining with anti-mouse CD31-Alexa Fluor® 488 (102414, Biolegend), anti-mouse CD45-Pacific Blue™ (103126, Biolegend), and anti-mouse Podoplanin-PE/Cy7(127412, Biolegend). Embryonic tissues were dissected and processed through the same antibodies. Following staining, cells were processed for FACs sorting.

Immunofluorescent Staining

Tissues were fixed overnight in 4% paraformaldehyde at 4° C. The following day, organs were washed in PBS and cryoprotected in 30% sucrose overnight. Tissues were then embedded in Tissue-Tek O.C.T. Compound and sectioned at 10 μm on a cryostat. Frozen sections were washed PBS to remove O.C.T. Antigen retrieval was performed on select slides using a pressure cooker. During retrieval, slides were soaked in citrate buffer (EMS, buffer B cat. #62706-11 for cytoplasmic stains and buffer A catalog number 62706-10 for nuclear stains). The tissues were permeabilized in PBS with 0.1% Triton X-100 and blocked for 1 h at room temperature in 5% normal donkey serum. Primary antibody incubations were done at 4° C. Slides were then washed in PBS, incubated in secondary antibody for 1 h at room temperature. Slides were then washed in PBS and mounted using Prolong Gold Mounting Medium containing DAPI. Images were obtained using an A1R Nikon confocal microscope and a Zeiss LSM 710 Confocal Microscope. The following antibodies were used: chicken anti-GFP (for Flk-GFP; Ayes, GFP-1020, 1:500), goat anti-Cx40/Gja5 (Santa Cruz, sc-20466, 1:100), rabbit anti-Collagen IV (Millipore, AB756P, 1:400), goat anti-Nrp1 (R&D Systems, AF566, 1:100), rat anti-Plvap (BD Pharmingen, 550563, 1:100), goat anti-Sox17 (R&D Systems, AF1924, 1:100), rat anti-Endomucin (Santa Cruz, sc-65495, 1:100), rabbit anti-Aquaporin1 (Biorad, MCA2100, 1:100), rabbit anti-Tbx3 (Abcam, ab99302, 1:100), rabbit anti-Aplnr (Protein Tech, 20341-1-AP, 1:100), goat anti-Igfbp5 (R&D Systems, AF578, 1:100), goat anti-Igfbp7 (Abcam, ab129302, 1:100), rabbit anti-Six2 (Protein Tech, 11562-1-AP, 1:100).

In Situ Hybridization

Fixed E15.5, E18.5, or P5 kidneys were dehydrated to 100% ethanol and embedded in paraffin before sectioning using a microtome. Sections were de-paraffinized in xylene, then rehydrated to PBS before being treated with 15 proteinase K for 15 min and fixed in 4% PFA/PBS. Slides were then washed and incubated with a pre-hybridization buffer for 1 hour at room temperature before being hybridized with the specific probes at 1 μg/mL overnight at 65° C. The following day, slides were washed in 0.2×SSC then transferred to MBST, and blocked with 2% blocking solution (Roche) for at least 1 hour at room temperature. Slides were then incubated with anti-Dig alkaline phosphatase-conjugated antibody (Roche, 1:4000) overnight at 4° C. Next day, slides were washed 3× in MBST and NTMT before incubating with BM purple (Roche) for a color reaction. After the color reaction, slides were fixed with 4% PFA and mounted using Permount mounting solution. Images were taken using a Zeiss Axiovert 200 M scope and a DP-70 camera from Olympus.

Fluorescent in situ hybridizations were performed following the same procedure up to SSC washes. Following the washes, slides were transferred to TNT and treated with 0.3% $H_2O_2$ for 30 min Slides were then washed again in TNT and blocked in 1% blocking buffer (Perkin Elmer) for 1 hour at room temperature. Slides were then incubated with anti-Dig peroxidase (Roche, 1:500), rat anti-PECAM, and rat anti-Endomucin antibodies overnight at 4° C. Next day, slides were washed in TNT 3× before incubating with TSA Fluorescein Amplification Reagent (1:50 in Amplification Diluent, Perkin Elmer) for 15 min Slides were washed in TNT following TSA incubation, incubated with goat anti-rat Alexa Fluor 555 for 2 hours at room temperature, and then incubated in DAPI. Slides were washed in TNT and mounted using Prolong Gold Mounting Medium. The slides were imaged using an AIR Nikon confocal microscope.

Masson's Trichrome Staining

Masson's trichrome staining was performed by Histoserv, Inc. To fix the tissues, following euthanasia, mice were sacrificed and perfused with 25 mls PBS then 10 mls of 4% PFA/PBS through the left ventricle of the heart. The right atrium of the heart was severed to accommodate bleeding. Kidneys of the mice were then additionally fixed overnight in 4% PFA/PBS overnight at 4° C. The following day, the kidneys were washed with PBS then stored in 40% ethanol before being shipped to Histoserv, Inc.

Transmission Electron Microscopy (TEM)

TEM was carried out by the Weill Cornell Medicine Electron Microscopy Core Facility per their standard protocols.

Lentivirus Protocol

The lentiviral vectors used to overexpress TBX3 (pLV[Exp]-Hygro-hPGK>hTBX3[NM_016569.3]), GATA5 (pLV[Exp]-Hygro-hPGK>hGATA5[ORF024149]), PRDM1 (pLV[Exp]-Hygro-hPGK>hPRDM1[NM_001198.3]), and PBX1(pLV[Exp]-HygromPGK>mPbx1[ORF039780]) in the current study was constructed and packaged by VectorBuilder (Cyagen Biosciences).

Human Umbilical Vein Endothelial Cell (HUVEC) Culture

HUVECs were isolated from umbilical cords at the New York Presbyterian Hospital. The permission and approval for obtaining discarded or left over umbilical cords were obtained from institutional review board (IRB) at Weill Cornell Medicine. The IRB deemed the studies on HUVECs exempt from the requirement of informed consent. The primary HUVECs cultured on plates coated with gelatin in media consisting of M199 (Sigma, M4530), 10% FBS (Omega Scientific, 1-B07), 50 μg ml-1 endothelial mitogen (Alfa Aesar J65416), and 100 μg ml-1 heparin (Sigma, H3393).

Clinical Pathology Analysis

Urine analysis and serum analysis panels were carried out by the Memorial Sloan Kettering Cancer Center laboratory of comparative pathology per their standard protocols. Urine was collected using metabolic chambers. Analysis was of urine was normalized to the volume that was produced. Serum was collected retroorbitally via a heparin-coated capillary after mice were anesthetized with isofluorane.

Glomerular Filtration Rate 100 mg of Inulin-FITC was boiled into 5 ml 0.85% NaCl then filtered into a Bio-Spin gel column. Mice were anesthetized with isofluorane, then retroorbitally injected with the Inulin-FITC solution (2 ul/g bw). Mouse tails were clipped and blood was collected at 0, 3, 5, 7, 10, 15, 35, 56, and 75 minutes post injection via a capillary coated with heparin. The blood was spun down then plasma was diluted 1:10 in 0.5M HEPES. The concentration of FITC was then measured using a Spectra Max photometer (485 excitation and 538 emission). GFR was calculated in GraphPad Prism using a two-phase exponential decay function.

Blood Pressure Measurement

Between the hours of 8-10 am, systolic blood pressure was measured using an IITC Life Science tail cuff plethysmography blood pressure system. Mice were fed a regular salt diet (normal water) or a high salt diet (2% NaCl in drinking water) for 6 weeks prior to measurements.

Animal Husbandry

All animal experiments were performed under the approval of Weill Cornell Medicine Institutional Animal Care and Use Committee (IACUC), New York, NY. The breeding and maintenance of animal colonies abided by the guidelines of the IACUC of Weill Cornell Medical College, New York, New York, USA. All experimental procedures followed the IACUC guidelines. Genotyping was carried out in the laboratory or the tails were sent to Transnetyx (transnetyx website). To compare the phenotypes between different mouse genotypes, sex- and weight-matched littermates were used. The study used 4 month old male mice. Tbx3 mice (Tbx3tm3.1Moon), provided by Anne Moon (Weis Center for Research), were crossed with Cdh5-Cre (Tg (Cdh5-cre)7Mlia) from Luisa Arispe (UCLA) to produce Tbx3flox/flox; Cdh5Cre mice (referred to as Tbx3ΔEC), and maintained as homozygous. The Cre allele was maintained in a heterozygous stage after it was bred in (Cre/+). Male littermates were used for all assays comparing control and Tbx3ΔEC mice. Flk1-eGFP mice (Kdrtm2.1Jrt) were kindly provided from Ondine Cleaver at UT Southwestern Medical center. R26R-Confetti mice (Gt(ROSA)26Sortm1(CAG-Brainbow2.1)Cle) purchased from Jax and crossed to Cdh5 (PAC)-CreERT2 (Tg(Cdh5-cre/ERT2)1Rha) mice from Ralph Adams were kindly donated from Jason Butler at Weill Cornell Medicine.

Human Tissue Data

Human kidneys used for glomerular endothelial cell isolation or histology were obtained as medical waste from a deceased-donor human kidney that was not transplanted. The deidentified, discarded human kidneys used for research are not considered as "human subject research" as per the standard NIH definition. Hence no IRB approval of the protocol is required. All relevant ethical regulations have been complied with the Institutional Review Board at Weill Cornell Medical College.

Single Cell RNA-Seq Analysis

Cells were harvested from E17, P2, P7, Adult murine kidneys and were digested into single cells. A single cell suspension was loaded into the Bio-Rad ddSEQ Single-Cell Isolator (BioRad, Hercules, CA) on which cells were isolated, lysed and barcoded in droplets. Droplets were then disrupted, and cDNA was pooled for second strand synthesis. Libraries were generated with direct tagmentation followed by 3' enrichment and sample indexing using Illumina BioRad SureCell WTA 3' Library Prep Kit (Illumina, San Diego, CA). Pooled libraries were sequenced on the Illumina NextSeq500 sequencer at pair-end read (R1: 68 cycles, sample index: 8 cycles and R2: 75 cycles). Sequencing data were primarily analyzed using the SureCell RNA Single-Cell App in Illumina BaseSpace Sequence Hub. In particular, sequencing reads were aligned to the human hg19 reference genome using STAR aligner49; cell barcodes were used to separate reads from different cells, and unique molecular identifiers (UMI) were used to remove duplicate reads that were actually derived from the same mRNA molecule. A knee plot was generated based on the number of UMI counts per cell barcode in order to identify quality cells separating from empty beads or noise, and a raw UMI counts table for each gene in each cell was then prepared. The raw counts table was fed into Seurat version 2.0.1 was used for clustering analysis. Cells with between 200 and 2500 genes detected were kept for downstream analyses. This filtering step was used to filter for high-quality single cells. Epithelial cells and perivascular cells were filtered based on the expression of Cdh1/Epcam/Cdh16 and Pdgfrb, respectively. The resulting data was log-normalized in Seurat. To mitigate the effects of cell cycle heterogeneity in data, the inventors assigned each cell a score based on its expression of canonical cell phase markers and then regressed these out using Seurat. The inventors also regressed out effects associated with the number of UMIs, mitochondrial content and ribosomal gene content. A principle component analysis (PCA) was performed on the top variable genes determined in Seurat, where the top 13 principal components were selected by choosing the inflection point in the Scree plot and were used for cell clustering and t-SNE projection. t-SNE plots were generated using R ggplot2 package.

Pseudo-Time Analysis

Data was normalized and cells were filtered using tools available in the Seurat package, as described above. Normalized data was converted to an object that useable by Monocle V2 in R. Low quality reads were detected as those with a minimum normalized expression<0.1 and which were expressed in at least 10 cells. The dimensionality of the dataset was reduced with a DDR tree with the number of dimensions set at 13, defined according to the procedure listed above. The number of dimensions were selected by choosing the inflection point in the Scree plot. Cells were then ordered in pseudo-time and trajectories were plotted using Monocle 2.

SCENIC

SCENIC35 was used according to the protocol previously described using the protocol in the SCENIC package in R. Briefly, the transcription factor network was defined based on co-expression and filtered using GENIE3 in R using the GENIE3 and GRNboost packages. Cells were first filtered to be those expressed in at least 1% of cells with a count value of at least 3. Targets for transcription factor regulons were then scored with RcisTarget. Cells were scored based on the activity of the gene regulatory network with AUCell and cells were clustered according to GRN activity with t-stochastic neighbor embedding using only high confidence regulons. Regulon activity was binned according to the activity above the AUC threshold. A one-way hierarchical cluster was drawn based on binned regulon activity using the stats package in R. Cells were ordered according to clusters defined in the Seurat package described above.

Isolation of Glomeruli from Human Kidney

Human kidney was decapsulated uniformly and minced into small fragments with scalpels. These small fragments were then digested with 1 mg/ml collagenase III in RPMI medium at 37° C. for 40 min with mild rotation. The specimens were then gently pressed with a flattened pestle and passed through a 100 μm cell strainer. After washing with complete medium (RPMI+10% FBS) for three times, glomeruli were collected and centrifuged at 55×g for 5 min. The emerging suspension contained uniformly decapsulated human glomeruli with minimal disintegration.

Affinity Propagation Clustering

Replicate values were collapsed by the median expression value. As input to the algorithm, cells were clustered by the top 20% of the most highly variant transcripts, corresponding to 3331 genes.

RNAseq Normalization Pipeline

As a part of the standard RNAseq pipeline, Fastq files were quality checked with FastQC and reads were processed to remove adapter sequences with BBtools. Reads were aligned to the mm10 mouse genome or the hg38 human genome with STAR v2.5.3a. Aligned files were sorted and indexed with samtools v1.5, and count files were generated with HTseq v0.9.1. Counts were imported to R v3.4.0, batch corrected and normalized with the EdgeR package. The limma package was used to calculate differential expression and assign p and q-values.

Pathway Analysis

Genes were associated as being differentially expressed between conditions if the limma derived p-value was <0.001 and the log 2 fold change was >1. Gene sets were curated from Broad MSigDB V3 (Kegg, Reactome, GO) or CORUM databases and filtered for gene sets containing between 5 and 200 members. The sets of transcription factors were defined from the transcription factor classification database (TCDB database website) and the sets of membrane proteins were defined from the DBD database. Growth factors were curated from the lists of secreted proteins in the human protein atlas. A hypergeometric test was used to calculate enrichment of gene sets in lists of genes and p-values were adjusted for false discovery rate.

Other Statistical Analyses:

Hierarchical clustering was performed using the stats package in R.

Example 2: Molecular Profiling of Kidney ECs

To decipher the heterogeneity of the kidney vasculature, the inventors performed comparative transcriptomic analysis of the vasculature of the kidney to that of lungs, liver, and heart at different stages of murine development (FIG. 1A). Each organ was dissected from embryonic stages (E) E13, E14, E15, E16, and E17, postnatal stage (P) P4, and adult mice and dissociated into single cells. The inventors isolated the EC fraction by fluorescence-activated cell sorting (FACS) using fluorescent-conjugated CD31 antibody.

Affinity propagation clustering (APC) of the transcriptomic dataset showed the adult and post-natal vascular expression patterns of each organ to be distinct from those of embryonic stages (FIG. 1B). Given the homogeneity of kidney embryonic vascular gene expression, the inventors considered the kidney early embryonic stages (E13-E16) as a single class and sought to determine how vascular expression patterns change from embryonic to adult stages. In embryonic stages, 657 genes were significantly upregulated and were enriched for growth-related pathways. APC clustering showed adult stages to cluster separately and away from each other and from embryonic stages from their respective organs. In the adult kidney, 283 genes were significantly upregulated and were enriched in pathways relating to small molecule, water, and amino acid transport.

Thus, gene expression programs distinct to the kidney are turned on early in development to promote growth, morphogenesis, and specification. A wave of genes is differentially induced at various stages of development. At the onset of birth, new sets of genes are induced to promote kidney-specific vascular functions, including upregulation of transporters and metabolism programs, setting the stage for the specialization of kidney vasculature function in post-natal stages. Collectively, the inventors show that kidney vascular heterogeneity diversifies perinatally and throughout adulthood.

Kidney ECs are Heterogeneous and Tightly Zonated

To determine how kidney vasculature acquires specialized function, the inventors dissected kidney EC heterogeneity throughout development. Because kidney-specific vascular genes are induced during late gestation to adult stages (FIG. 1B the inventors performed single-cell RNA-seq (scRNA-seq) on kidney vascular ECs from fetal E17, perinatal P2, P7 and adult stages (FIG. 1C).

Figures 1F, 1G, 1H, 1I, 1J:
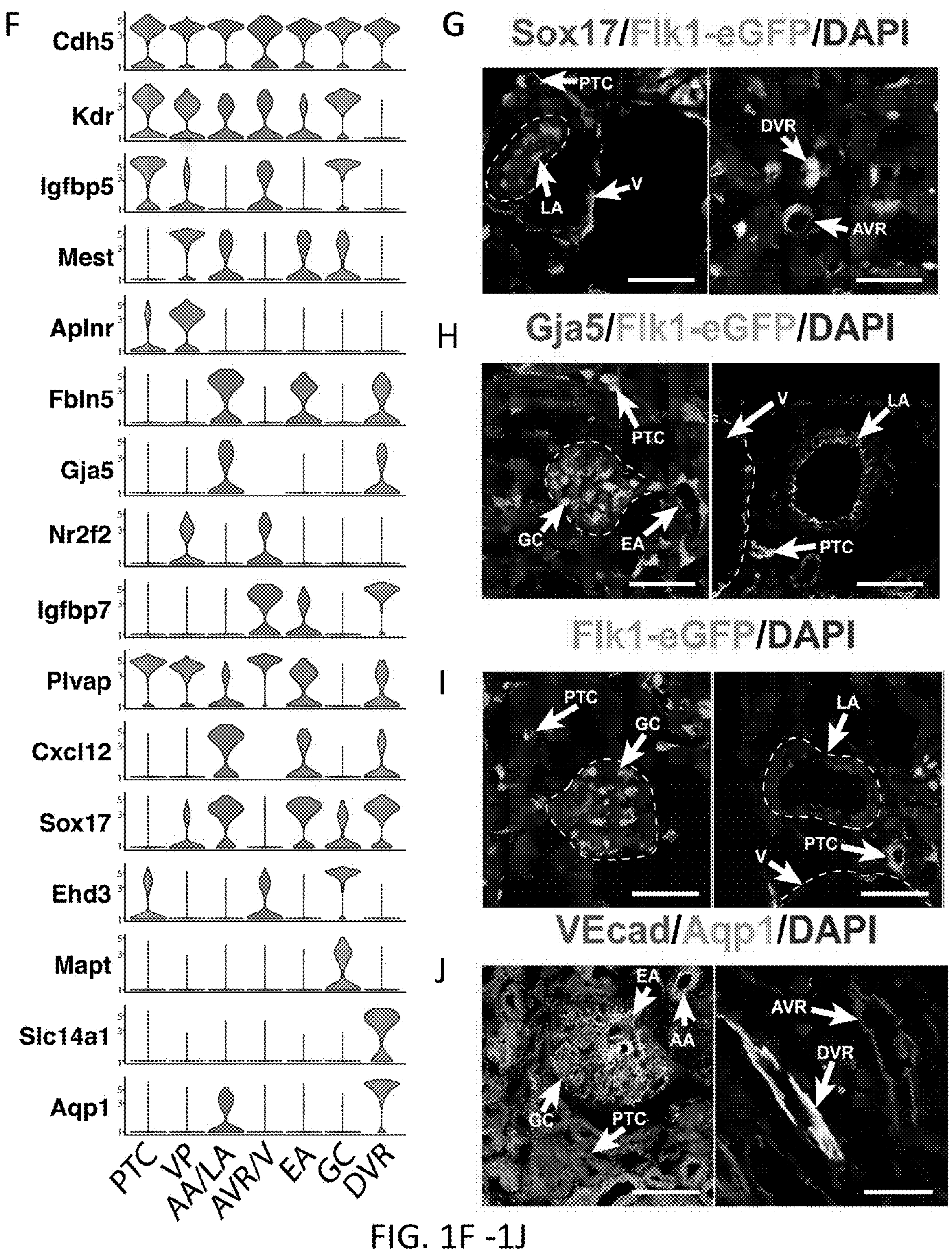
Figures 1K, 1L, 1M, 1N, 1O:
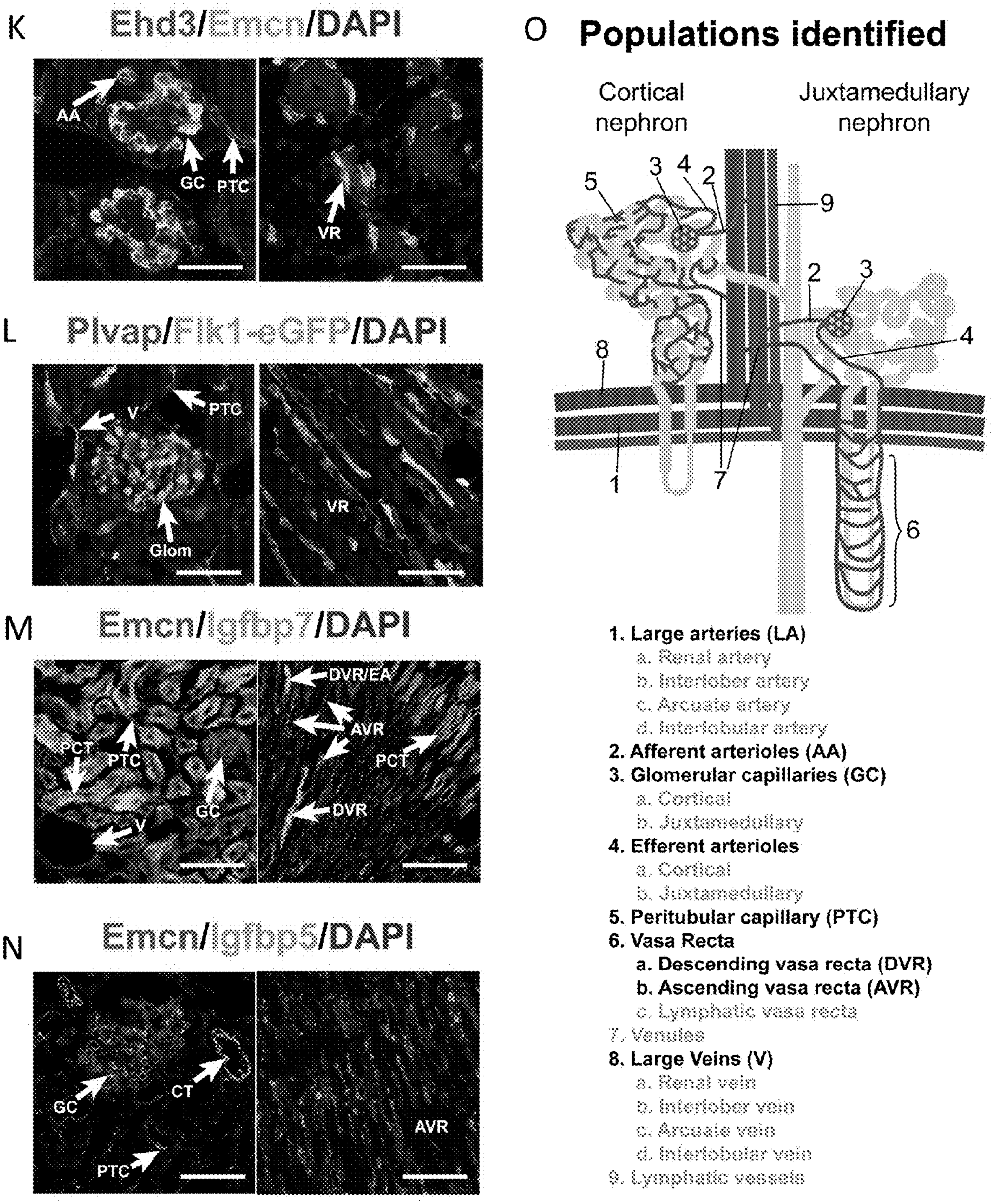

$CD31^+CD45^-Podoplanin^-$ non-lymphatic ECs were purified by FACS. Single-cell isolates were then processed for digital droplet scRNA-seq (ddSEQ). The inventors sequenced 5936 cells, including 922, 1000, 917, and 3097 single ECs for E17, P2, P7, and adult kidneys, respectively. Filtering for contaminating epithelial and perivascular cells reduced the dataset to 4552 cells. Raw data was normalized and the effects of cell cycle and mitochondrial and ribosomal content were scaled17. Dimensionality reduction identified 7 major vascular clusters (FIGS. 1D-1E), as marked by the expression of pan-vascular EC gene Cdh5 (FIG. 1F). Clusters were labeled according to known markers and expression validations via protein and RNA staining (FIGS. 1G-1N). Cell types identified include the afferent arteriole (AA) and associated large arteries (LA), GC, efferent arteriole (EA), peritubular capillaries (PTC), descending vasa recta (DVR), and ascending vasa recta (AVR) and associated hierarchy of veins and venules leading to the renal vein (V), and embryonic capillaries, which the inventors have designated as vascular progenitors (VP) (FIG. 1O).

EC Subsets in Kidney Execute Defined Vascular Functions

For each population, the inventors selected one or two of the specific genes amongst the top differentially expressed genes and validated the presence of protein expression in various EC populations. Most types of ECs identified did not manifest unique markers. Instead, each vessel displayed markers that were unique to two or more types of vessel. Arterial vessels express markers, including S100a4, Sox17 (FIGS. 1F-1G), Gja5 (FIGS. 1F,1H), Cxcl12 18, low levels of VEGFR2 (FIGS. 1F, 1I), and extracellular matrix proteins, including Fibulin 5, Elastin, Fibulin 2, Collagen 18a1, and Laminin 3 (FIG. 1F). Gja5 is expressed in the DVR and all preglomerular arteries, including the AA, while absent in the EA19 (FIGS. 1F, 1H). The DVR traffic urea and water in the medulla of the kidney through the membrane transporters Slc14a1 and Aqp1, respectively (FIGS. 1F, 1J). The GC can be identified by a variety of specific markers including Mapt and Ehd3, a known glomerular EC marker (FIGS. 1F, 1K). Venous ECs were identified through expression of Nr2f2 (FIG. 1F). The PTCs share several markers with venous EC—including Plvap and Igfbp7 (FIGS. 1L-1M)—but were Nr2f2 negative. They were identified by expression of Igfbp5, a marker shared with GC but not with venous ECs (FIGS. 1F, 1N). The AVR was discriminated through presence of Igfbp7 but lack of Igfbp5 expression. The PTCs were joined with a seventh population of EC unique to E17-P7 stages. Vessels within this population were $Nr2f2^+$ and manifested high expression of Aplnr and Mest (FIG. 1F). Gene expression signatures were not obtained for lymphatic vessels or larger hierarchies of arteries or veins. Thus, these gene expression signatures enabled us to uncover the differentiation profiles of LA and AA pooled together, GC, EA, PTC, DVR, and a pool of AVR and V.

Vascular Heterogeneity Arises from Vascular Progenitor Cells

Figures 2A, 2B, 2C:
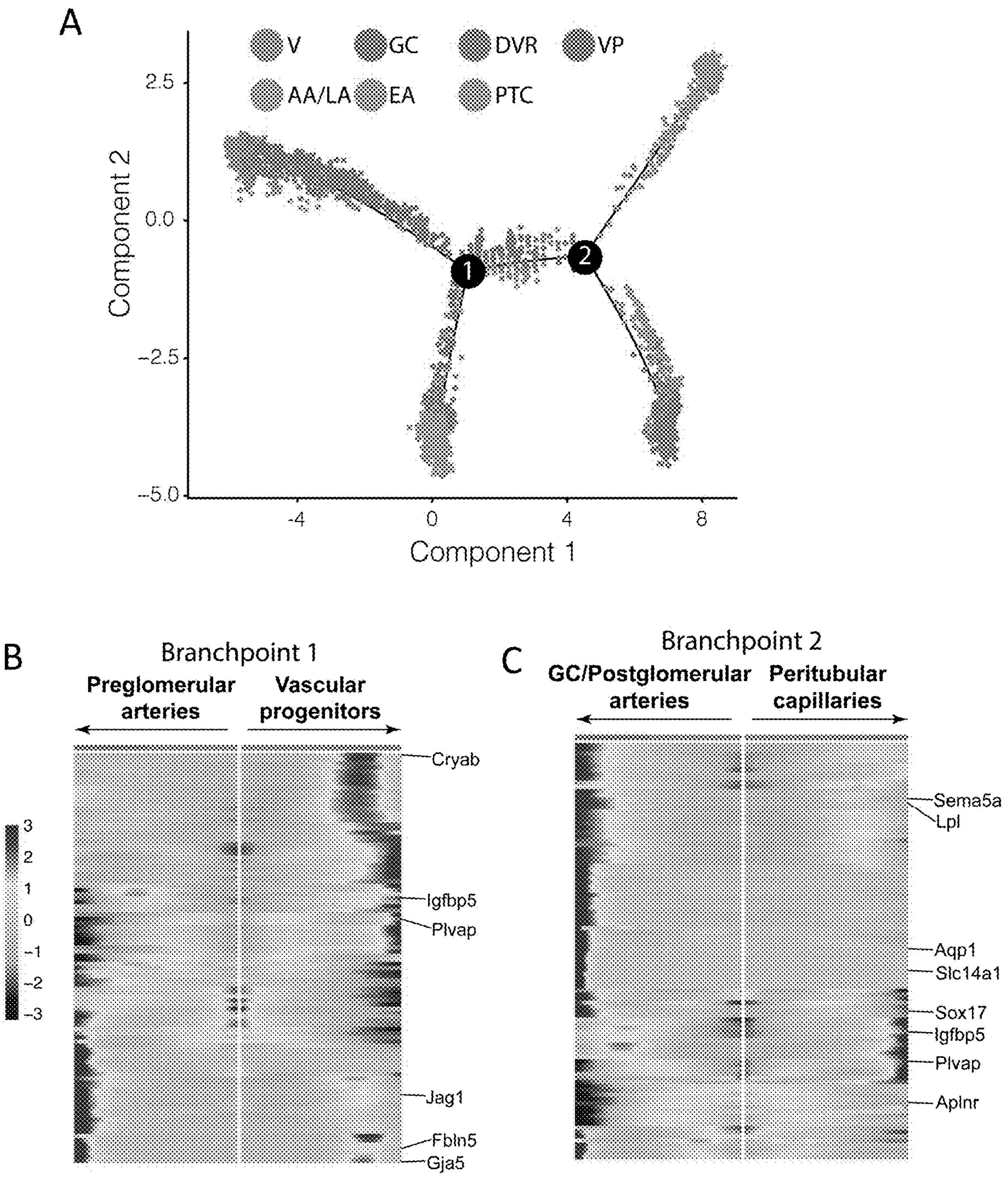
FIGS. 2A-2L. (A) Pseudotime trajectory of vascular differentiation in the kidney. VP, vascular progenitor; PTC, peritubular capillary; AA/LA, afferent arteriole/large arteries (pre-glomerular); AVR/V, ascending vasa recta/venous blood vessels; EA, efferent arteriole; GC, glomerular capillaries; DVR, descending vasa recta. (B) Heat maps denoting genes that become differentially expressed as preglomerular arteries branch from vascular progenitor cells. Notable genes of venous peritubular progenitor capillaries (Cryab, Igfbp5, Plvap) and arteries (Jag1, Fbln5, Gja5) are shown on the right. (C) Heat maps denoting genes that become differentially expressed as glomerular capillaries (GC) and postglomerular arteries branch from embryonic progenitor capillaries which mature into peritubular capillaries. Notable genes of glomerular capillaries (Sema5a, Lpl), postglomerular arteries (Aqp1, Slc14a1), and peritubular capillaries (Igfbp5, Plvap) are on the right. (D-G) Pseudo-time trajectory plots denoting the expression of genes enriched in particular vascular clusters. Plots include Aplnr in vascular progenitor cells (VP)(D), Plvap in veins (V), VPs, and peritubular capillaries (PTC)(E), Sox17 in afferent arterioles/large preglomerular arteries (AA/LA) and descending vasa recta/efferent arterioles (DVR/EA)(F), and Lpl in glomerular capillaries (GC). (H) Immunofluorescent staining of the apelin receptor (Aplnr) in E17 kidney. Endothelial cells were stained with endomucin (Emcn). SSB, s-shaped body; VP, vascular progenitor; Angio., angiogenic vessel; GC, glomerular capillary; V, vein; A, arteriole. Scale bars: first panel 40 μm, second panel 5 μm, third and fourth panel 10 μm. (I) Pie chart denoting mean fluorescent intensity of Aplnr antibody staining in peritibular capillaries, veins, arteries, and glomerular capillaries. n=3, average of 5 frames of view. (J) R26R-Confetti E18 mouse kidneys cut in half sagittally after tamoxifen induction at E11. GC, glomerular capillary; PTC, peritubular capillary. Scale bars: first panel 100 μm, second to sixth panel 5 μm. (K) Bar graph denoting the number of fluorescent reporters found in identified vascular structures. n>10 for each structure. (L) E13 mouse kidney showing the primary vascular plexus exists as generic capillaries (the vascular progenitor cells) before subvascular specification at E14-E15 stages. Dotted lines outline the cortex and medulla. Endothelial cells are stained with endomucin (Emcn) and the outer cortex of the kidney is denoted by Six2 staining of nephron progenitors. Scale bar 100 μm.
Figures 2D, 2E, 2F, 2G:
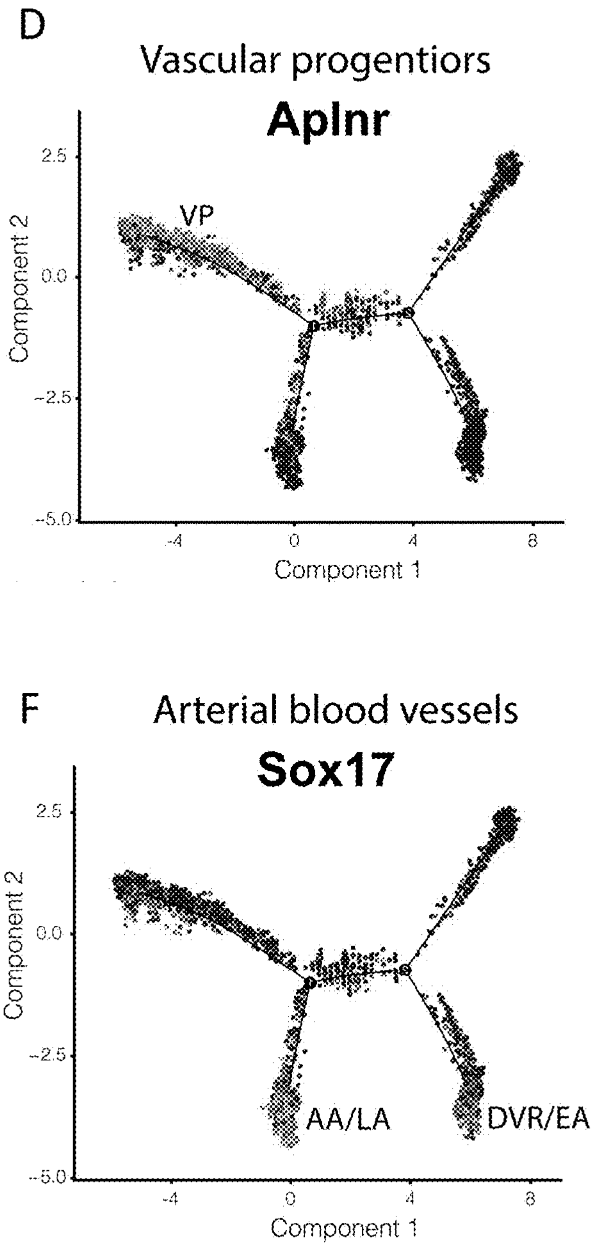
Figure 2H:
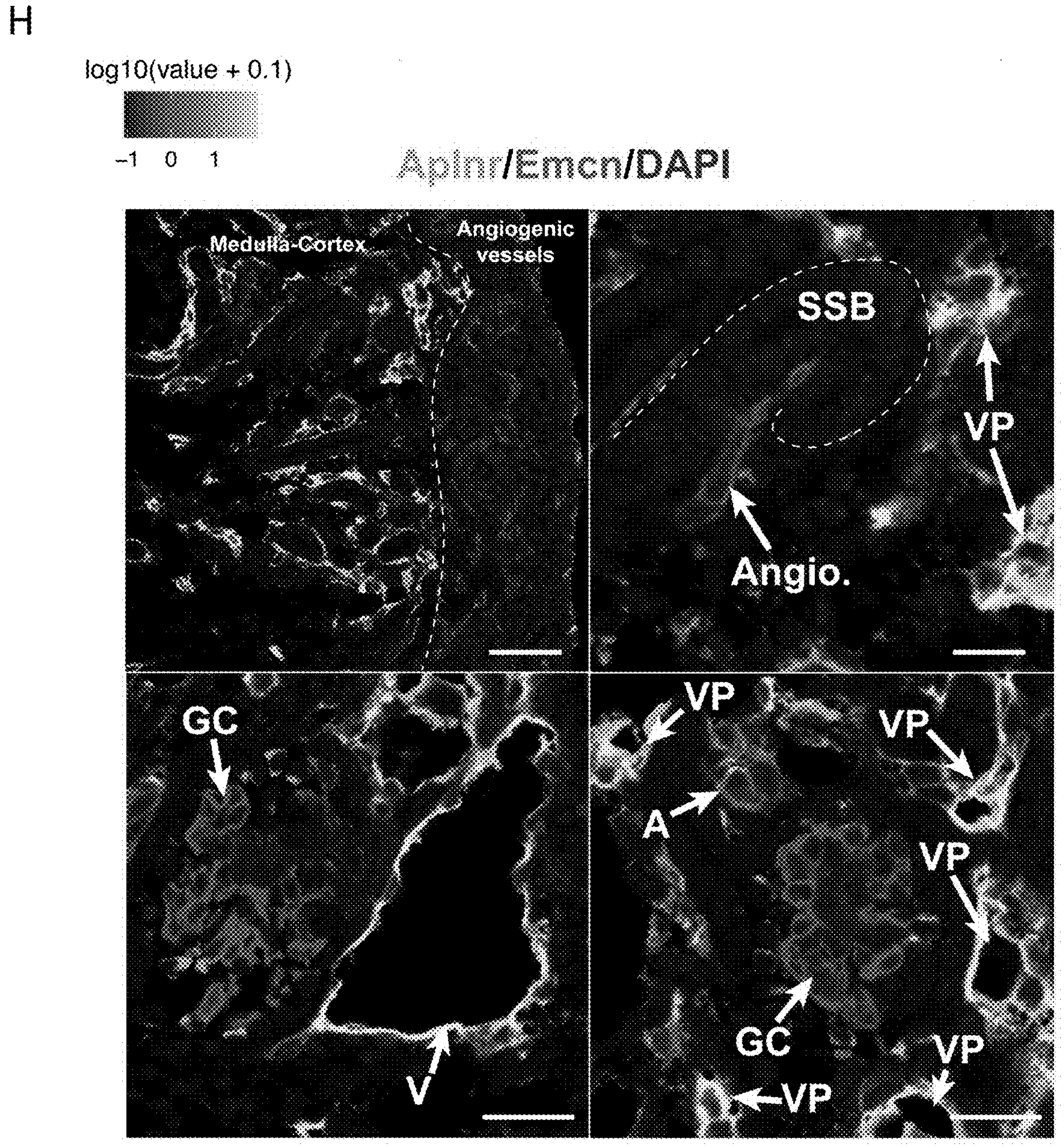
Figure 2I:
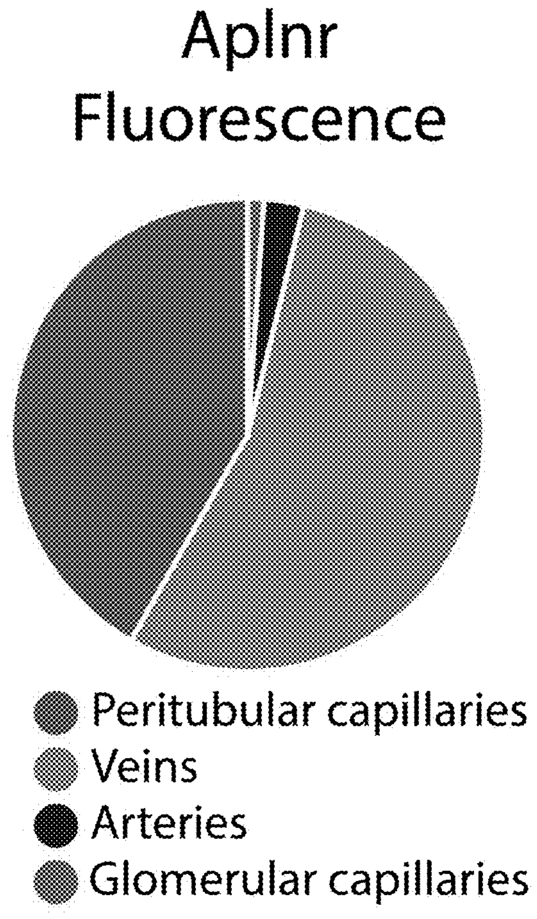

To discern how vascular heterogeneity arises in the kidney, ECs were ordered according to pseudotime (FIGS. 2A-2C). The earliest capillary cells correspond to VPs and were labeled by the apelin-receptor gene, Aplnr (FIG. 2D). Quantifications of Aplnr fluorescent staining validated its restriction to capillaries and veins (FIGS. 2H-2I). Pseudotime trajectory predicts two branch-points from early VPs. At the first branchpoint, pre-glomerular large arteries (AA and LA) branch from the VPs (early generic capillaries) (FIG. 2A). This transition is marked by downregulation of Vein and VP signatures, such as Plvap, Aplnr, Nr2f2, (FIGS. 2B, and 2D-2E) and up-regulation of gene signatures found in (but not specific to) preglomerular arteries (AA/LA), such as Gja5, Fbln5, Jag1, Sox17, and Cxcl12 (FIGS. 2B, and 2F). Accordingly, arteries and veins are the first vascular subtypes, which build up from capillaries at E13 before other vascular structures13. Remaining VPs transition into GCs ($Lpl^+$, $Ehd3^+$, $Sema5a^+$, etc.) (FIGS. 2C, 2G) in association with EAs or the DVR ($Slc14a1^+$, $Aqp1^+$) (FIG. 2C), which is successive to the juxtaglomerular efferent arteriole. Remaining VP capillaries then mature into PTCs in the kidney cortex, downregulating VP markers including Aplnr and Nr2f2, while maintaining partially unique markers Igfpb5 and Plvap (FIGS. 2C-2E). Large veins may emerge from VP capillaries and maintain expression of venous markers, including $Nr2f2^+$ and $Cryab^+$ECs (FIG. 2B).

Figure 2J:
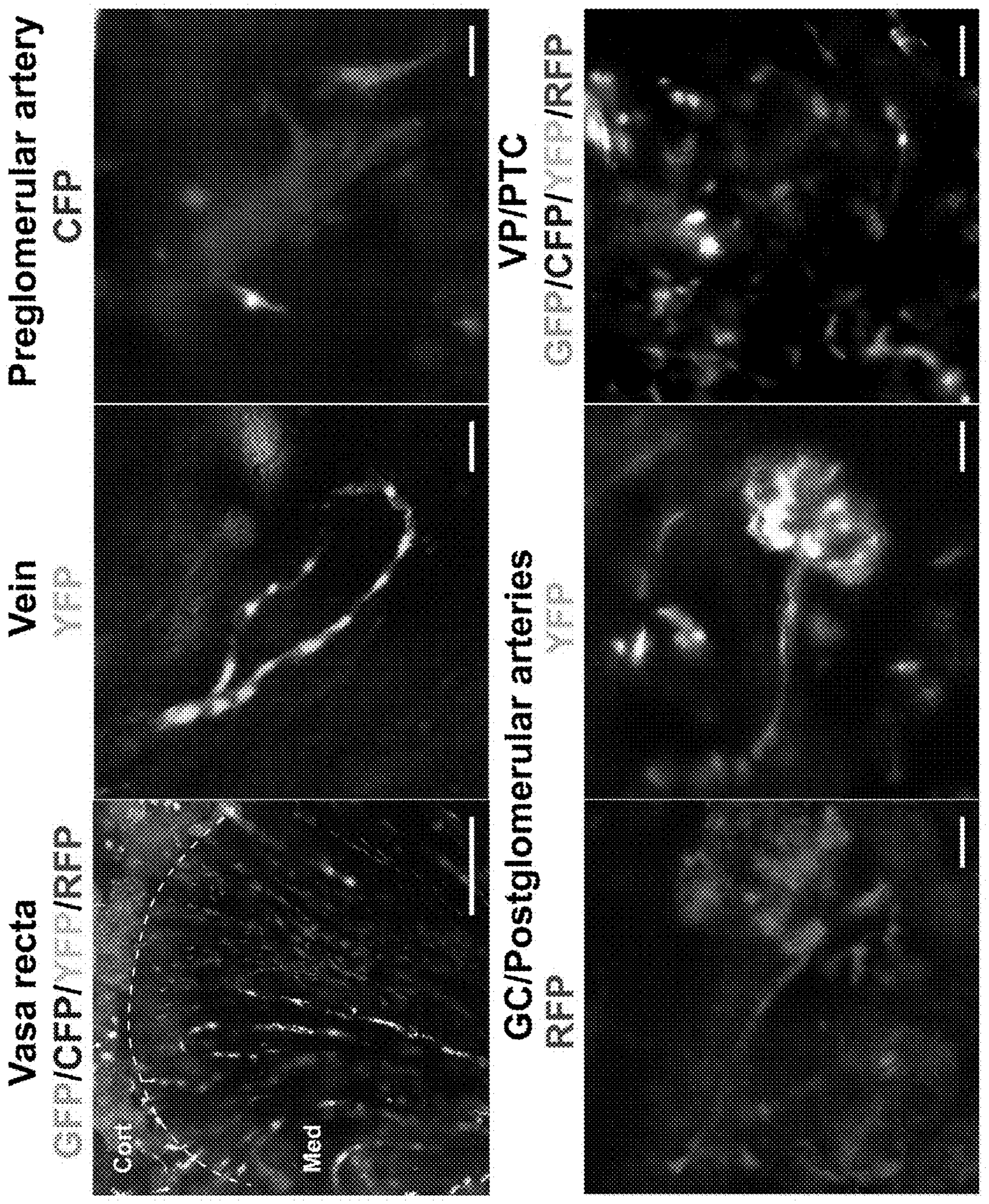
Figure 2K:
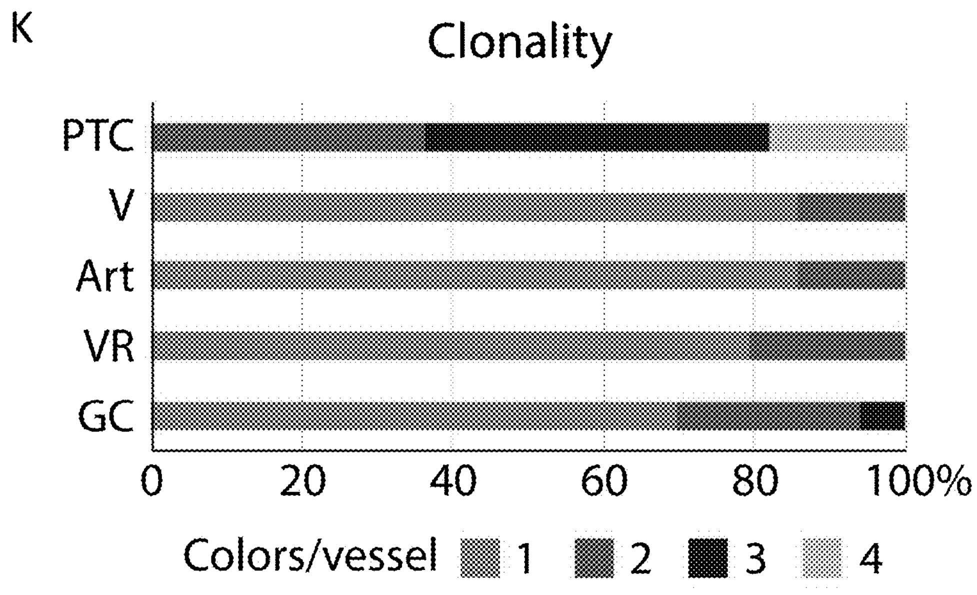

To unravel the plasticity of kidney EC subtypes, the inventors pursued lineage-tracing clones of VPs. The inventors utilized R26R-Confetti mice expressing four fluorescent reporter genes and crossed them to the vascular-specific and inducible Cdh5(PAC)-CreERT2 strain. Pregnant mice were pulsed with tamoxifen at E11, when ureteric buds emerge. ECs began to express single clones of green (GFP), cyan (CFP), yellow (YFP), and red fluorescent proteins (RFP) at E13. By E18, vasa recta, veins, arteries, and glomerular vascular subtypes were labeled with only one fluorescent protein (FIGS. 2J-2K). Pseudotime analysis predicts the EAs branch off progenitors in tandem with GCs while pre-glomerular arteries and arterioles develop independently. Notably, a single arteriole was found to protrude from developing GCs marked with the same fluorescent protein while pre-glomerular arteries were labeled separately (FIG. 2J). Progenitors of cortical PTC displayed heterogeneous mixture of differentially labeled and diverse ECs. Because progenitor capillaries were the first to be labeled, VP ECs may have migratory potential and do not interact during development, leading to intermingling of confetti colored cells. Collectively, specified ECs appear to remain within their structures after they have developed and do not draw a large degree of plasticity to migrate and become other vascular subtypes.

Figure 2L:
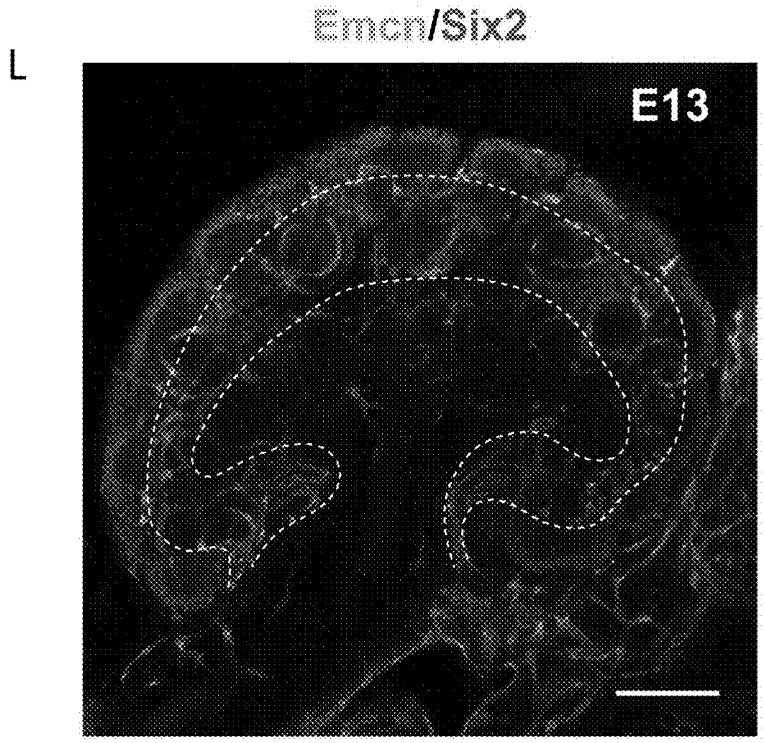

Vasa recta and glomeruli are reported to grow from PTCs in the cortex between E14-E15 stages13,25. Bulk RNA-seq (FIG. 3A) and staining validations of the vasculature at E15 (FIGS. 1G-1O) show genes specific to vascular subtypes become expressed at E14-E15 stages. Peritubular capillaries (the vascular progenitors) were found to constitute the primary vascular plexus in the cortex of the kidney at E13 stages (FIG. 2L). Following vascular specification, transcripts defining vascular subtypes gradually become upregulated over the course of development, peaking at adult stages. Therefore, vascular heterogeneity in the kidney is specified at E14-E15 stages where they branch off VP capillaries in the cortex. As ECs branch off, they lose and gain several key markers and mostly sustain the phenotype of their designated vascular subtypes.

Changes in Kidney Expression Dynamics During Development

Figures 3A, 3B:
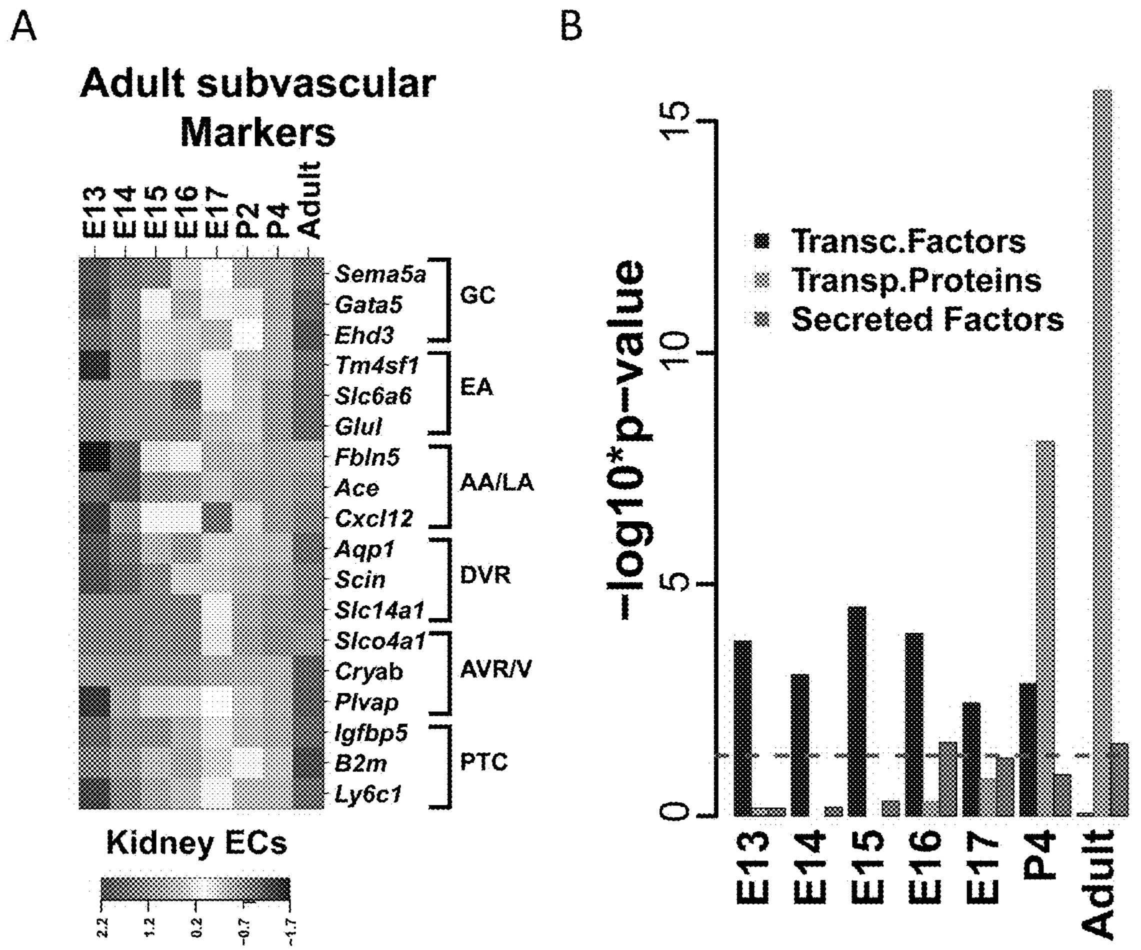
FIGS. 3A-3M. (A) Heatmap relating expression profiles (z-scores) of 3 top highly enriched genes to each vascular cluster across 7 developmental stages. VP, vascular progenitor; PTC, peritubular capillary; AA/LA, afferent arteriole/large arteries (pre-glomerular); AVR/V, ascending vasa recta/venous blood vessels; EA, efferent arteriole; GC, glomerular capillaries; DVR, descending vasa recta. (B) Hypergeometric p-values indicating enrichment of transcription factors, transporters, and secreted proteins in the lists of genes differentially expressed between the kidney and the heart, liver, and lungs at each stage of development. Red dotted line denotes p values>0.05. (C) Numbers of transporters, growth factors, and transcription factors found to be differentially expressed in each vascular cluster. (D) Heatmap relating expression profiles (z-scores) of the top 1 or 2 highly enriched transporters to each vascular cluster across 7 developmental stages. (E) Violin plots showing the normalized expression level of representative solute transporter genes across the 8 vascular zones of the kidney. Genes shown here were chosen arbitrarily. Y-axis is log scale-normalized read count. (F-G) Human protein atlas image and tSNE showing an example of a pan-endothelial transporter, Slc9a3r2, in the kidney vasculature. Scale bar 40 μm. AA, afferent arteriole; EA, efferent arteriole; GC, glomerular capillary; V, vein; PTC, peritubular capillary. Patient 2184, image available from v18.1 proteinatlas website. (H-I) Human protein atlas image and tSNE showing an example of a glomerular capillary transporter, Kcnj5, in the kidney vasculature. Scale bar 10 μm. Patient 1767, image available from v18.1 proteinatlas website. (J-K) In situ hybridization and tSNE showing an example of a transporter, Slc6a6, that is pan-endothelial and differentially highly expressed in arterioles. Scale bar 20 μm. (L-M) In situ hybridization and tSNE showing an example of a transporter, Aqp1, that differentially expressed in the DVR and large arteries (LA). Scale bar 20 μm.

The vasculature in adult kidneys differ from other organs by modulating trafficking of amino acids, water, and ion transport proteins, while embryonic stages are defined by specific induction of cell growth and morphogenic pathways. Hence, the inventors sought to determine how gene expression associated with transcription factors, solute transporters, and growth factors change within each vascular subpopulation over the course of development. From bulk RNA-seq of the kidney vasculature, the inventors first annotated differentially expressed genes in the kidney vessels at each stage of development. The inventors defined 617 transporter proteins, 1314 transcription factors, and 2032 secreted proteins, from the transporter classification database (TCDB database website), the DBD transcription factor prediction database26, and the human protein atlas (Protein-atlas website). The inventors find sets of genes expressed in the early embryo (E13-E16) are highly enriched for transcription factors (hypergeometric test p-values range from 1.1E-4 to 3.1E-5), but for not secreted proteins and transporters. Transcription factors are downregulation at E17 (FIG. 3B), with stabilization of their expression (hypergeometric test p=0.89) thereafter. Notably, the bulk of gene expression of vascular genes in post-natal and adult stages, are dominated by transporters (adult hypergeometric test p=5.1.E-18) and secreted proteins (adult hypergeometric test p=0.027) (FIG. 3B). From the P4 to the adult stage, transporters specific to a wide variety of substrates that are not expressed in other organs are enriched in the kidney vasculature. The inventors also detected an increase in total numbers of transcripts in these stages compared to embryonic stages. Notably, membrane transport proteins were transcribed only after birth and their expression are augmented steadily to adulthood. Therefore, transport proteins may be induced in ECs in response to the environmental stimulation and dietary changes.

Specialized Capillaries Regulate Filtrate Reabsorption

As the glomerular filtrate passes through different segments of the kidney tubule, selective reabsorption of the filtrate is returned to the systemic circulation through the PTC. The inventors investigated whether vasculature zonation accommodates selective filtrate reabsorption and secretion. The inventors compared tubular epithelium and the surrounding stroma through sequencing the mRNA of the non-endothelial fraction (CD3 V VEcadherin$^-$CD45$^-$Podoplanin$^-$) and non-lymphatic endothelial fraction (CD31$^+$ VEcadherin$^+$CD45$^-$Podoplanin$^-$). In kidney ECs, 34 transporters were uniquely expressed, including a variety of calcium and potassium channels as well as transporters for phospholipids, glucose, and amino acids.

The inventors integrated scRNA-seq data to investigate whether the expression of transporter proteins in kidney vessels is also zonated to guide selective filtrate reabsorption. The inventors find membrane transporters to exhibit both punctate and ubiquitous expression patterns. For instance, Slc25a3 and Slc25a4 that transport mitochondrial phosphate and adenine, respectively, are ubiquitously expressed across the kidney vasculature. Select transporters were also found to be specific to endothelium, such as Slc9a3r2, a protein involved in sodium absorption (FIGS. 3E-3G). However, many membrane transport proteins identified were expressed within distinct populations of the kidney vasculature (FIGS. 3E-3M) supporting the notion that transporters tailor the function of surrounding nephrogenic zones.

Figures 3C, 3D:
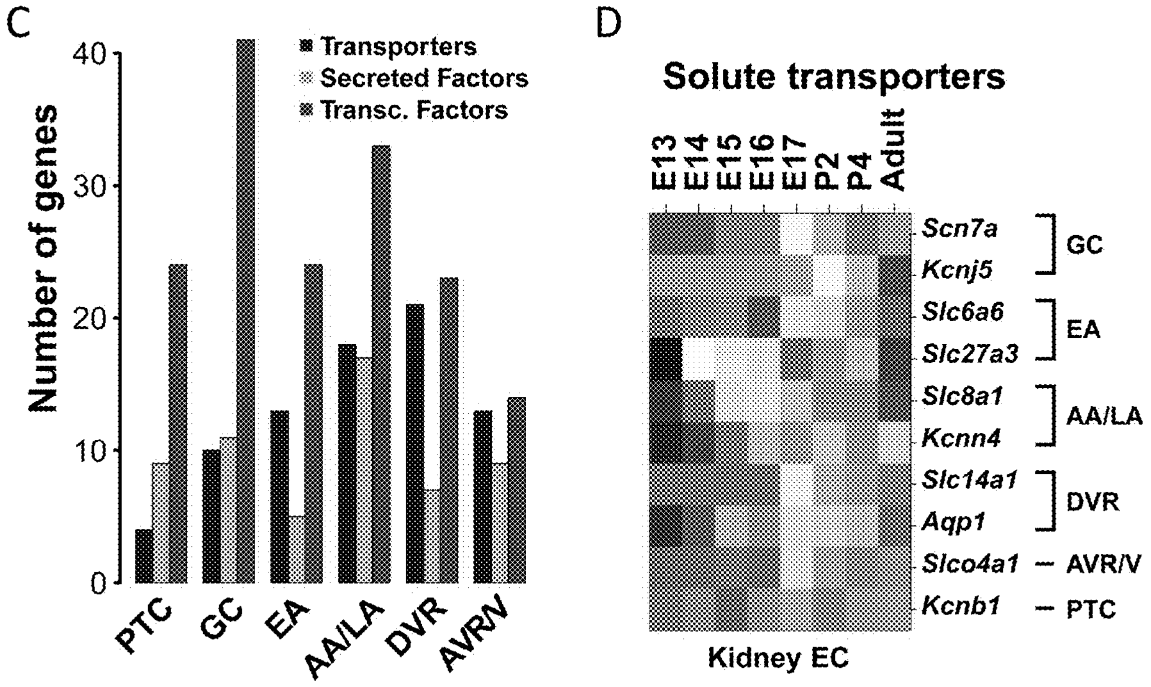
Figure 3E:
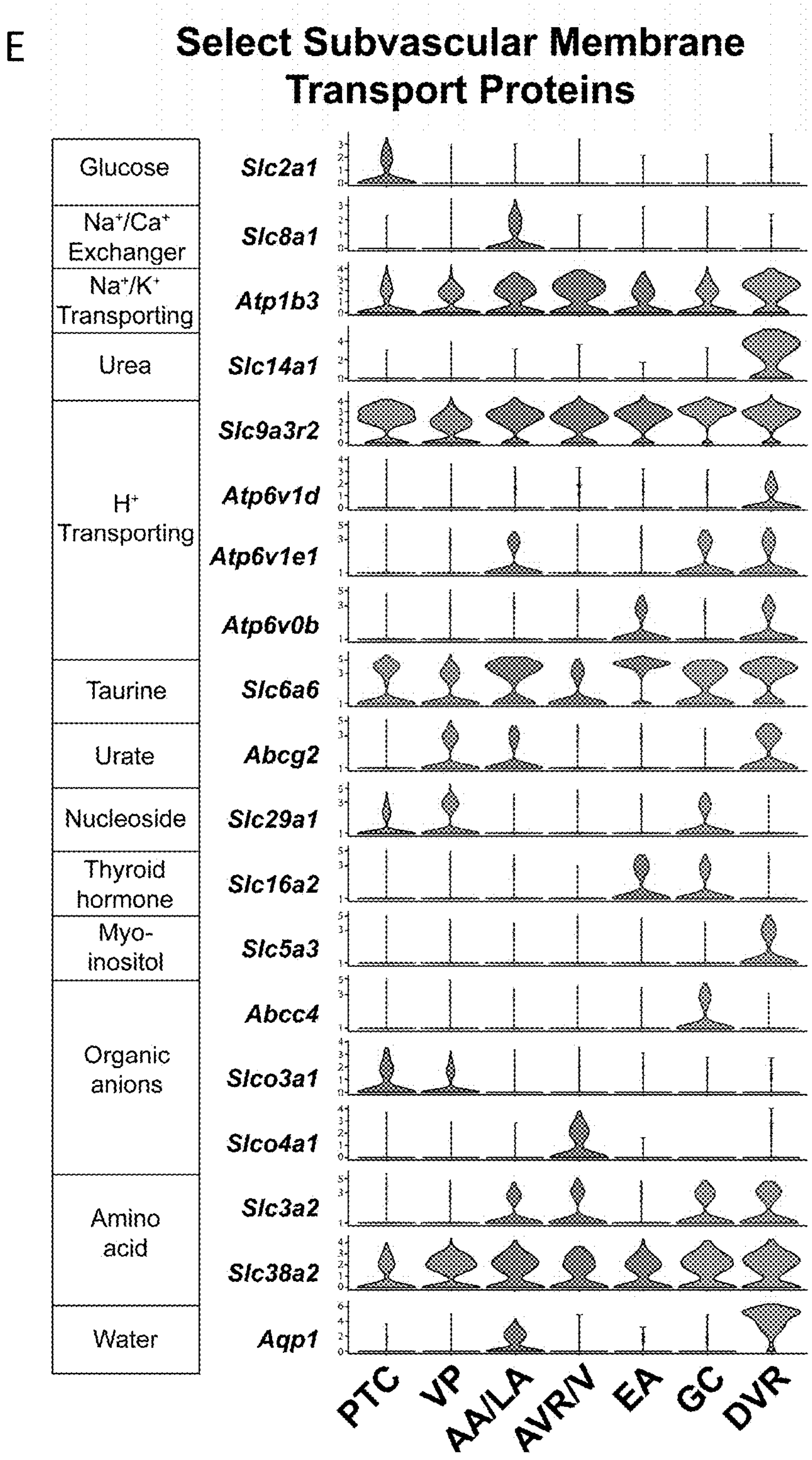
Figures 3F, 3G, 3H, 3I:
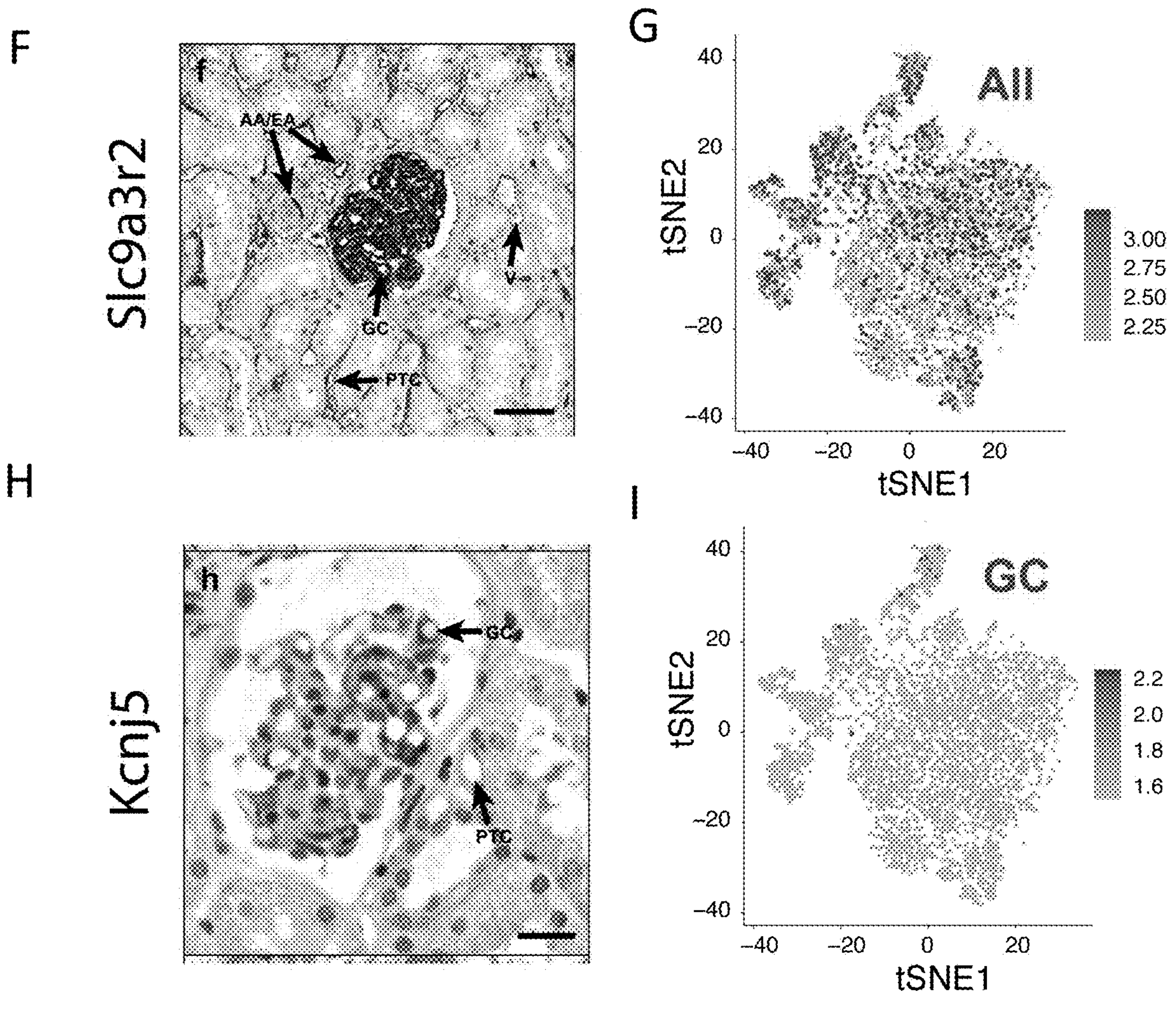
Figures 3J, 3K, 3L, 3M:
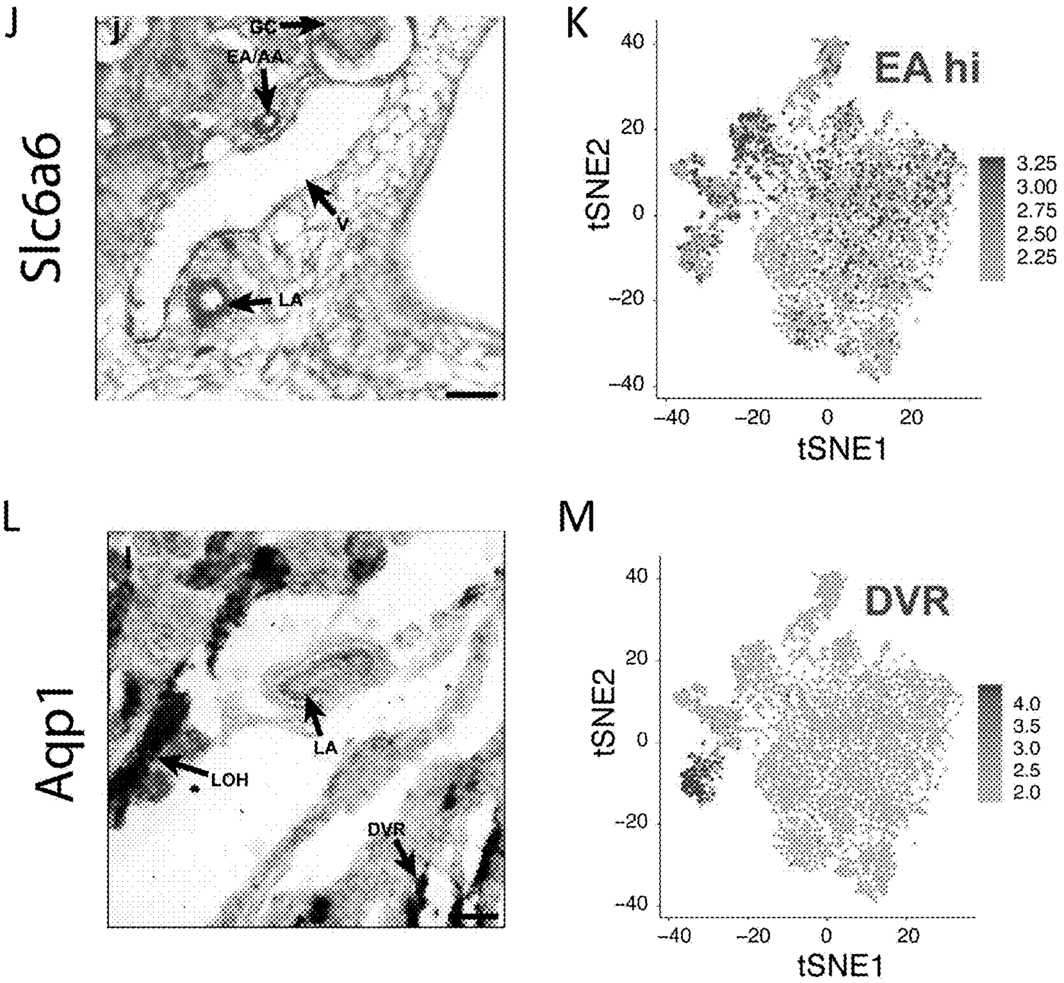

Temporal analysis of transporters specific to vessels reveals that most membrane transport proteins are induced at E14-E15 stages, while being upregulated from E17 to adult stages (FIG. 3D). The GCs specifically expresses two of the voltage gated channels, Kcnj5 and Scn7a, which are both linked to hypertension (FIGS. 3H-3I). Preglomerular arterial ECs (AA/LA) express genes, such as Slc8a1 and Kcnn4 that pump calcium (FIG. 3E). This is consistent with the role calcium plays in regulating the contraction and relaxation of smooth muscles surrounding the arterial endothelium. Efferent arterioles present high levels of Slc6a6, which mediates membrane transport of taurine, modulating osmoregulation, membrane stabilization, antioxidation and the conjugation of bile acids (FIGS. 3J-3K). Slc6a6 gene ablation predisposes mice to streptozotocin-induced diabetic nephropathy. The DVR cluster selectively express urea transporter Slc14a1 and Aqp1, which plays a central role in urea and water transport, respectively (FIGS. 3E, 3L-3M). The organic anion transporter Slco4a1 mediates Na$^+$-independent uptake of thyroid hormones and bile acids in the apical membrane of the proximal convoluted tubule. The inventors find this transporter is expressed in venous blood vessels (AVR/V) (FIG. 3E). Thus, organized distribution of chemical transporters to various kidney ECs may regulate electrolyte balance and homeostasis of various molecules in the blood.

Kidney EC-Epithelial Crosstalk Evolves Over Development

Kidney epithelial cells and the surrounding stroma crosstalk to mediate development and homeostasis of the kidney. The vasculature establishes a niche that through the secretion of specific angiocrine signals regulate specific developmental and homeostatic functions. Complete functional vascularization is required for progressing the development of the kidney and kidney organoids. However, the mechanism by which zone-specific vascular niche angiocrine signals sustain nephron homeostasis is unknown.

To address this, the inventors show that multitudes of factors are secreted by different vascular subtypes in different ECs from E17 to adult stages, (FIG. 3C). Notably, GCs supply Fgf1 and Vegfa, while glomerular ECs deploy Notch-ligand D114, neuronal guidance cue Sema5a, and Wnt antagonist Dkk2. During developmental progression, arterial ECs produce Tgfβ2, Ltbp4 and Pdgfβ, while VPs elaborate Igf1 and Igf2 with their expression shifting to veins and arteries, respectively. Regulatory molecules of IGF signaling zonate throughout the vasculature of the adult nephron. Contaminating podocyte or mesangial doublets were not detectable in the glomerular EC cluster. Thus, a network of angiocrine and autocrine factors manifests restricted transcription among defined kidney vascular zones. In addition, the inventors have developed a database to find what types of vessels in the kidney express specific secreted angiocrine factors that contribute to morphogenesis and patterning of nephrons.

Transcription Factors Choreograph the Kidney Vasculature

Specific transcription factors are enriched in various stages of developing kidney vasculature (FIG. 3B). The bulk of these genes are Hox family of transcriptional regulators. However, in post-natal stages, many of these genes are downregulated and other specific sets of transcription factors are induced. Notably, many different transcription factors are associated with distinct vascular sub-types, the majority of which are upregulated during late embryogenesis (E17). Hence, specific set of transcription factors are induced during later stages of development to promote additional vascular specialization.

Figures 4A, 4B:
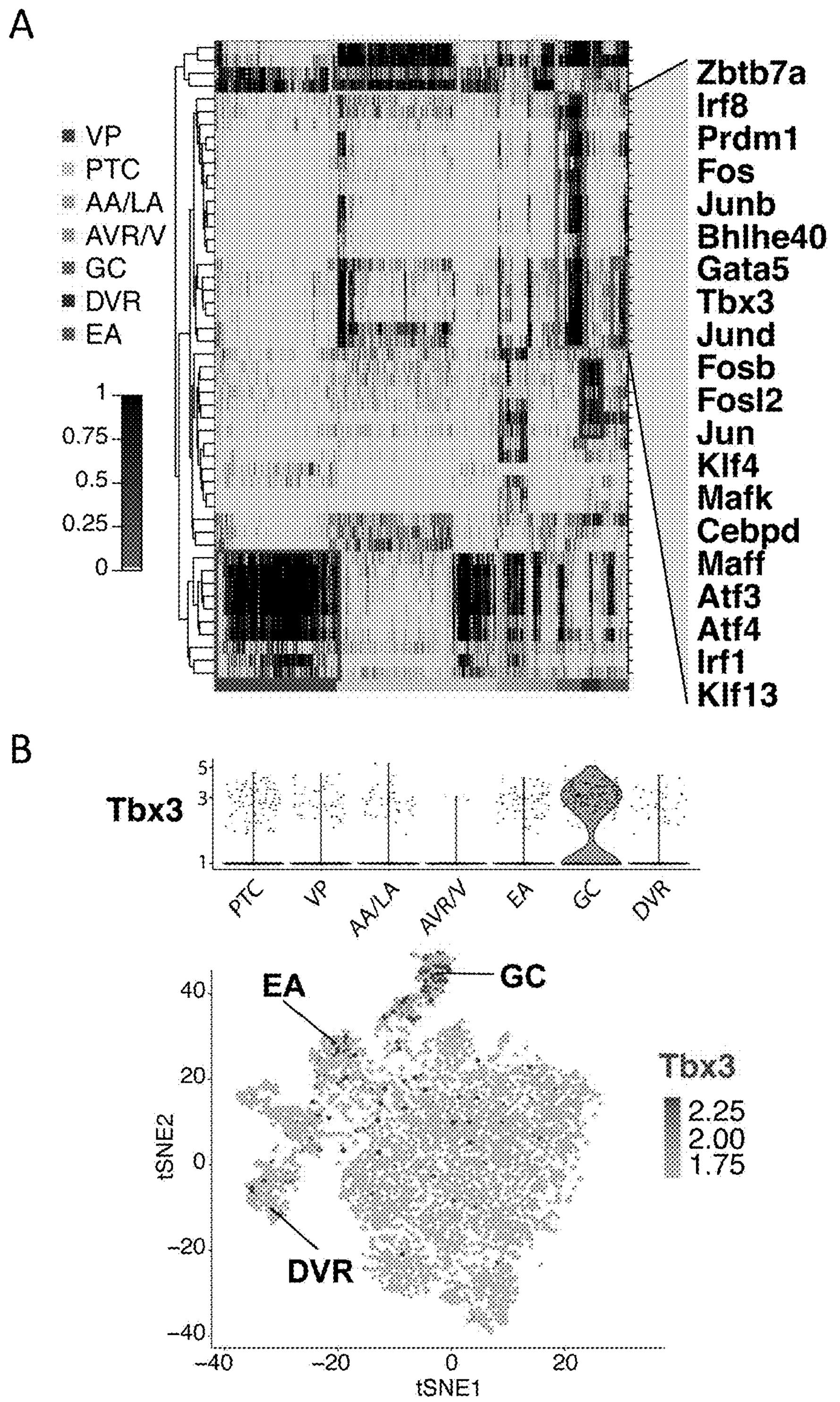
FIGS. 4A-4U. (A) Heat map denoting SCENIC results. VP, vascular progenitor; PTC, peritubular capillary; AA/LA, afferent arteriole/large arteries (preglomerular); AVR/V, ascending vasa recta/venous blood vessels; EA, efferent arteriole; GC, glomerular capillaries; DVR, descending vasa recta. (B) Violin plot and tSNE showing normalized Tbx3 expression. (C) Immunofluorescent staining of Tbx3 and VE-cadherin in adult human glomerular endothelial cells. EC, endothelial cell; Non-EC, non-endothelial cell. Scale bar 50 μm, inset scale bar 10 μm. (D) Masson's trichrome staining in control and Tbx3ΔEC. Yellow arrow show microaneurysms. Scale bar 50 μm. (E) Pie chart for percent of glomeruli possessing microaneurysms, hypoplasia, or fibrosis. (F) Quantification glomerular capillary area. n=3 mice, 5 frames/kidney. ***=p<0.0001 unpaired student t-test. Error bars, standard error mean. (G-L) Urine analysis (control n=15, Tbx3$^{\Delta EC}$ n=19). (E) Urea nitrogen, (F) Creatinine (CREA), (G) micro total protein (MTP), (H) Sodium (Na), (I) Chloride (CL), (J) potassium ($K^+$). Normalized to volume. *=p<0.05, =p<0.01, *=p<0.001 unpaired student t-test. Error bars, standard error mean. (M) Transmission electron microscopy (TEM) of control and Tbx3ΔEC. Red dotted line outlines glomerular capillary lumens. P, podocyte; GBM, glomerular basement membrane; EC, endothelial cell; RBC, red blood cell; L, leukocyte. Scale bar 2 μm, inset scale bar 500 nm. (N) Systolic blood pressure (n=6 mice/group). *=p<0.05 unpaired student t-test. Center line=median. Bounds of boxes: the first to third quartile. Whiskers highlight quartile from minimum or maximum. Error bars, standard error mean. (O-Q) qPCR of Renin, Angiotensinogen (Ang), and Angiotensin converting enzyme (Ace) transcripts (kidneys, liver, and lung, respectively). n=4 mice each group. *=p<0.05 unpaired student t-test. Error bars, standard error mean. (R) Hypergeometric test p-values (−1*log 10) for overlap between mouse glomerular genes (scRNA sequencing) and genes down (blue) or up (green) regulated upon overexpression of the indicated transcription factors. EC, endothelial cell. (S) Euler plot illustrating overlap between glomerulus genes downregulated with overexpression with transcription factor. (T) Hypergeometric test p-values (−1*log 10) for overlap between human glomerular specific genes (human glomerular endothelial cells) and genes down-regulated upon overexpression of the indicated transcription factors (ALL=all 4 TF's). EC, endothelial cell. Red dotted line denotes p value>0.05. (U) Pathway enrichment analysis after over expression of Tbx3, Gata5, Prdm1, and Pbx1.

To identify transcription factors that may be important for the development of the kidney vasculature, the inventors utilized the single-cell regulatory network inference and clustering (SCENIC) method. The inventors identified 216 transcription factor regulons enriched in the dataset, which the inventors then binarized and clustered with a supervised analysis to obtain lists of transcription factors with differential activity amongst each vascular subtype (FIG. 4A). As expected, arteries and veins manifested an enrichment of Sox17 and Nr2f2 regulons, respectively. The GCs produced the largest and most unique combination of transcription factors. Many components of the AP-1 heterodimer such as Fos, Jun, and Atf were enriched (FIG. 4A). The AP-1 pathway is generally enriched during cellular stress and infection, suggesting that glomerular ECs may be sensitive to cellular stress during processing and tissue digestion. The glomerulus expressed several transcription factors known to be involved in stem cell differentiation and tissue morphogenesis, including Tbx3, Gata5, Prdm1, Irf8, Zbtb7a, Klf4, Maff, and Klf13. These gene transcriptional regulatory networks that can be investigated to further the understanding of kidney physiology and manipulated to enhance the construction of kidney tissues in vitro.

Tbx3 Contributes to Glomerulus Morphogenesis and Function

Figure 4C:
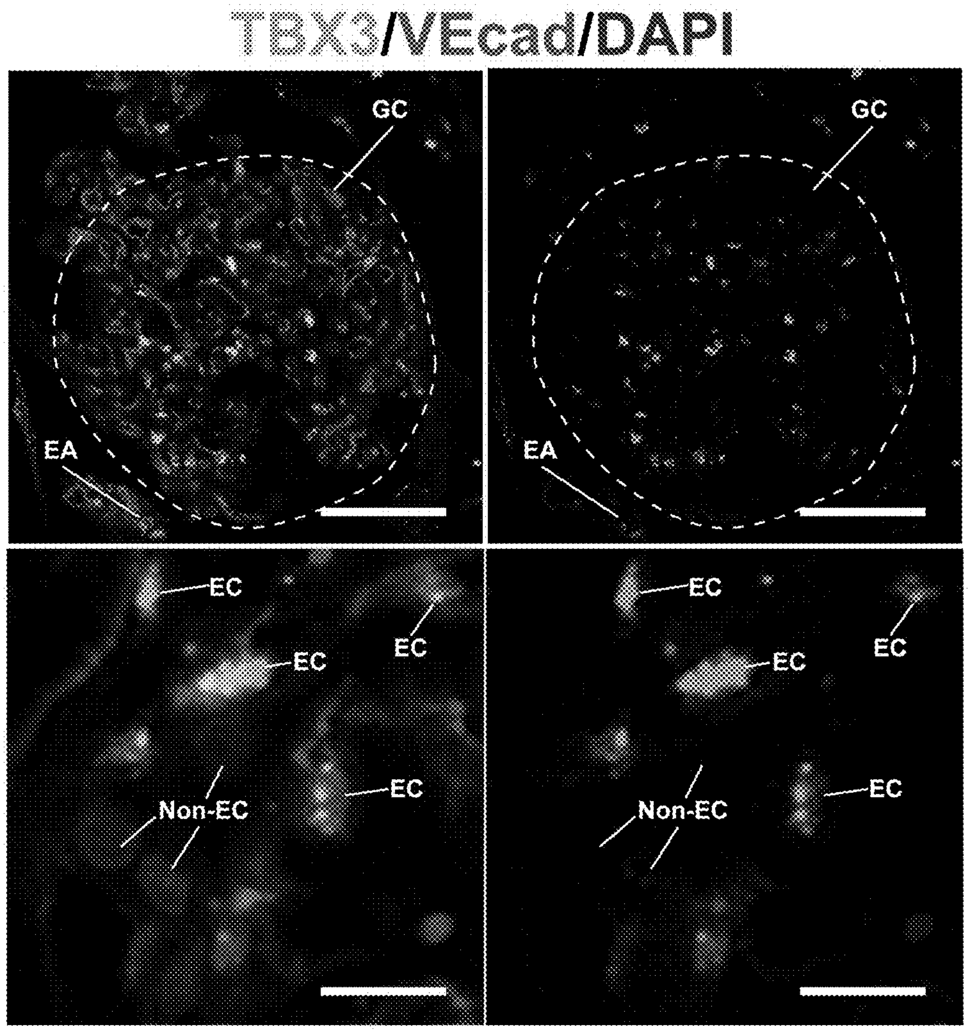

To elucidate mechanisms underlying glomerular development and function, the inventors focused on transcription factors with restricted and abundant expression and regulon (FIG. 4A), such as Tbx3 in GCs and EAs (FIG. 4B) Immunofluorescent staining in human kidney tissue confirmed that Tbx3 protein is restricted to ECs in GCs and EAs (FIG. 4C).

Figures 4D, 4E, 4F:
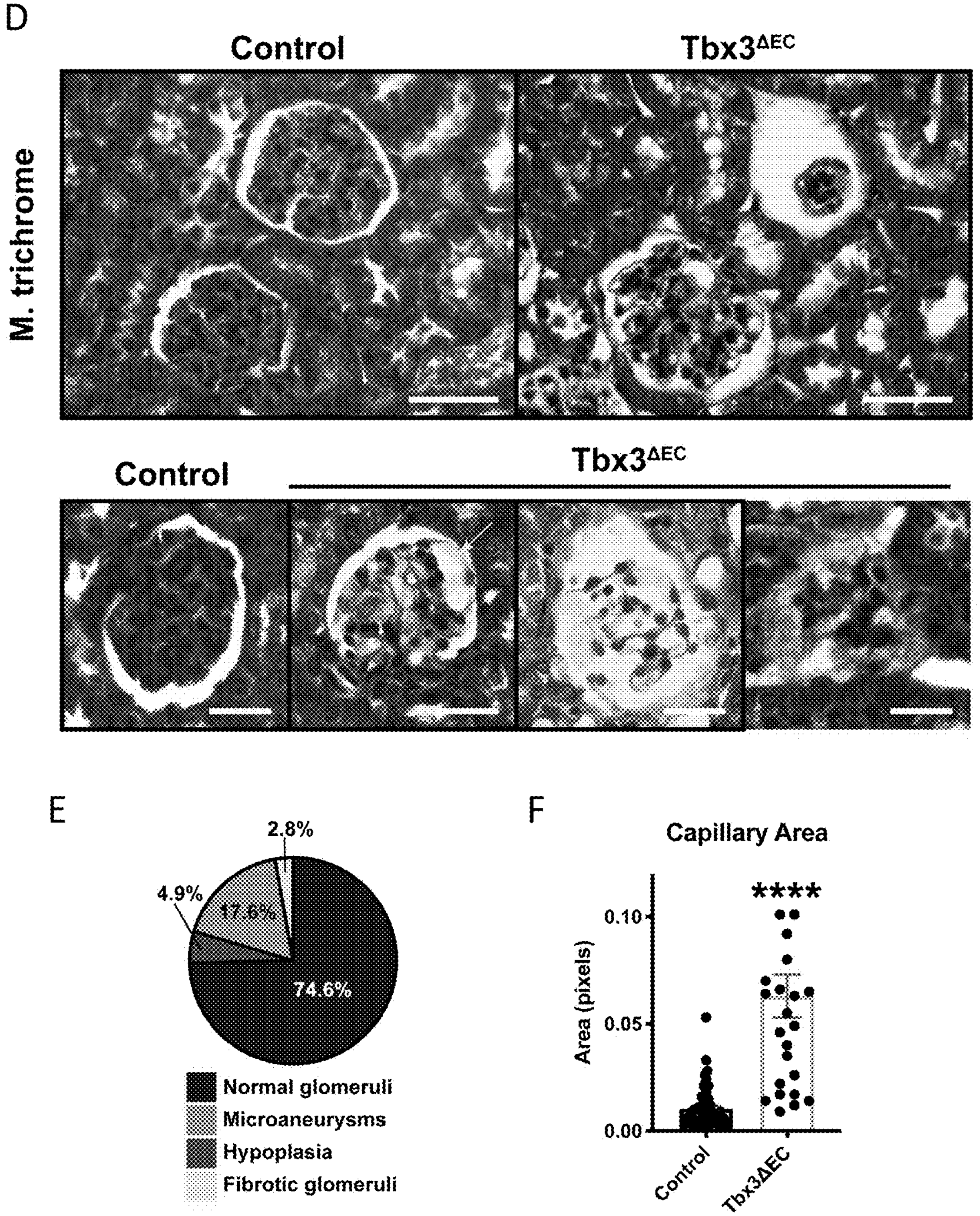
Figures 4G, 4H, 4I, 4J, 4K, 4L:
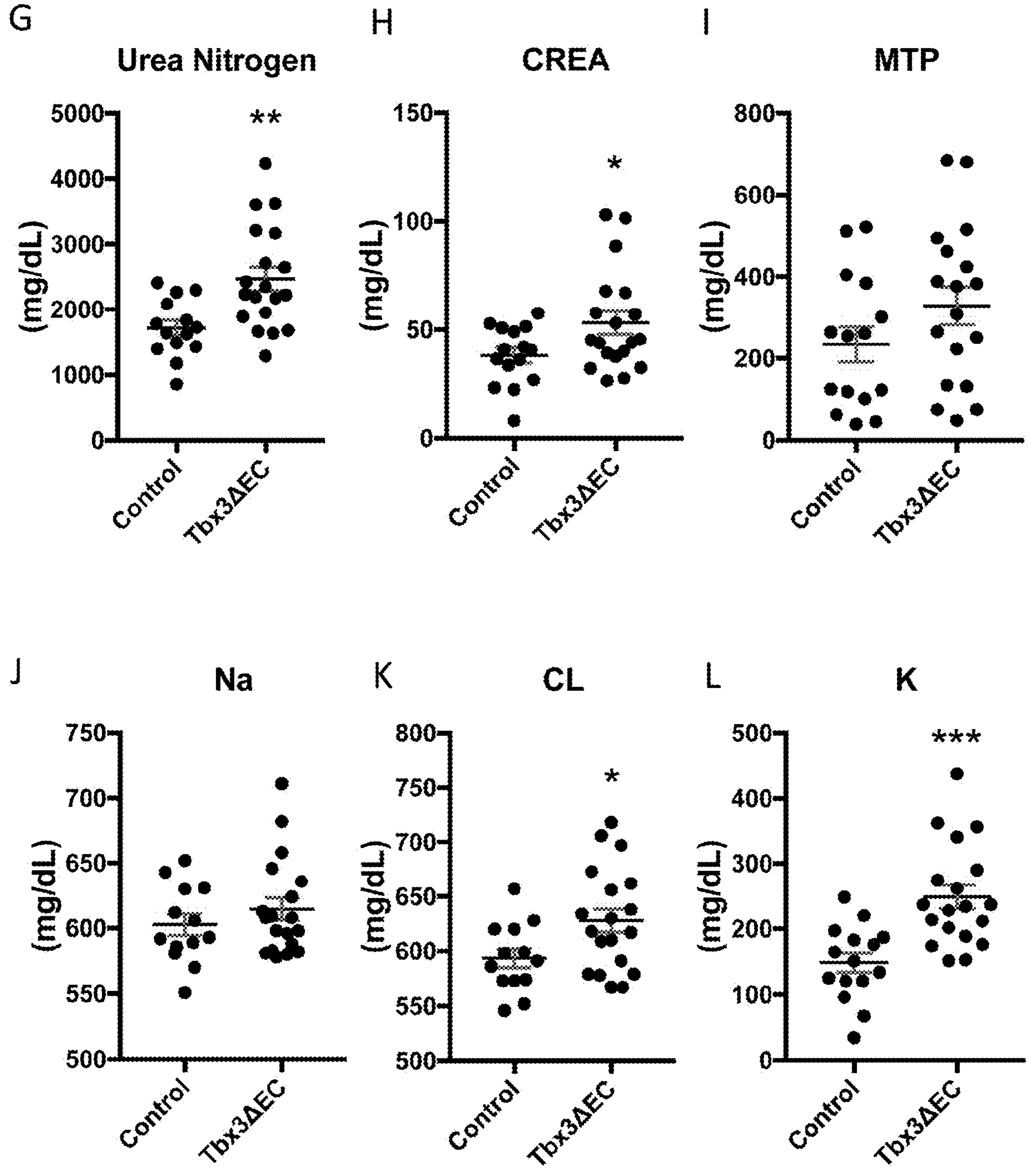

To uncover the role of Tbx3 in glomerular specification and function, the inventors conditionally ablated Tbx3 expression in ECs by employing the Cre/LoxP system with Cdh5-Cre (VE-cadherin-Cre) to generate $Tbx3^{\Delta EC}$ mice. The $Tbx3^{flox}$ allele loses 4.6 kb of genomic DNA encompassing the 5'UT promoter, the transcriptional start site and first exon of Tbx3 in the presence of Cre recombinase. Targeted homozygous deletion of the Tbx3 allele in ECs using the vascular-specific VE-cadherin-Cre manifested clearly noticeable morphogenic defects in subsets of the glomeruli in the $Tbx3^{\Delta EC}$ mice, but not in the control $Tbx3^{flox/flox}$ or $Tbx3^{flox/+}$; $Cdh5^{Cre}$ mice (FIG. 4D). In four-month-old mice, most glomeruli appeared normal although 18% developed microaneurysms, 5% of glomeruli exhibited hypoplasia, and 3% of glomeruli became fibrotic (FIGS. 4D-4E). Affected glomeruli manifested significantly dilated capillaries and arterioles (FIGS. 4D-4F).

Figures 4M, 4N, 4O, 4P, 4Q:
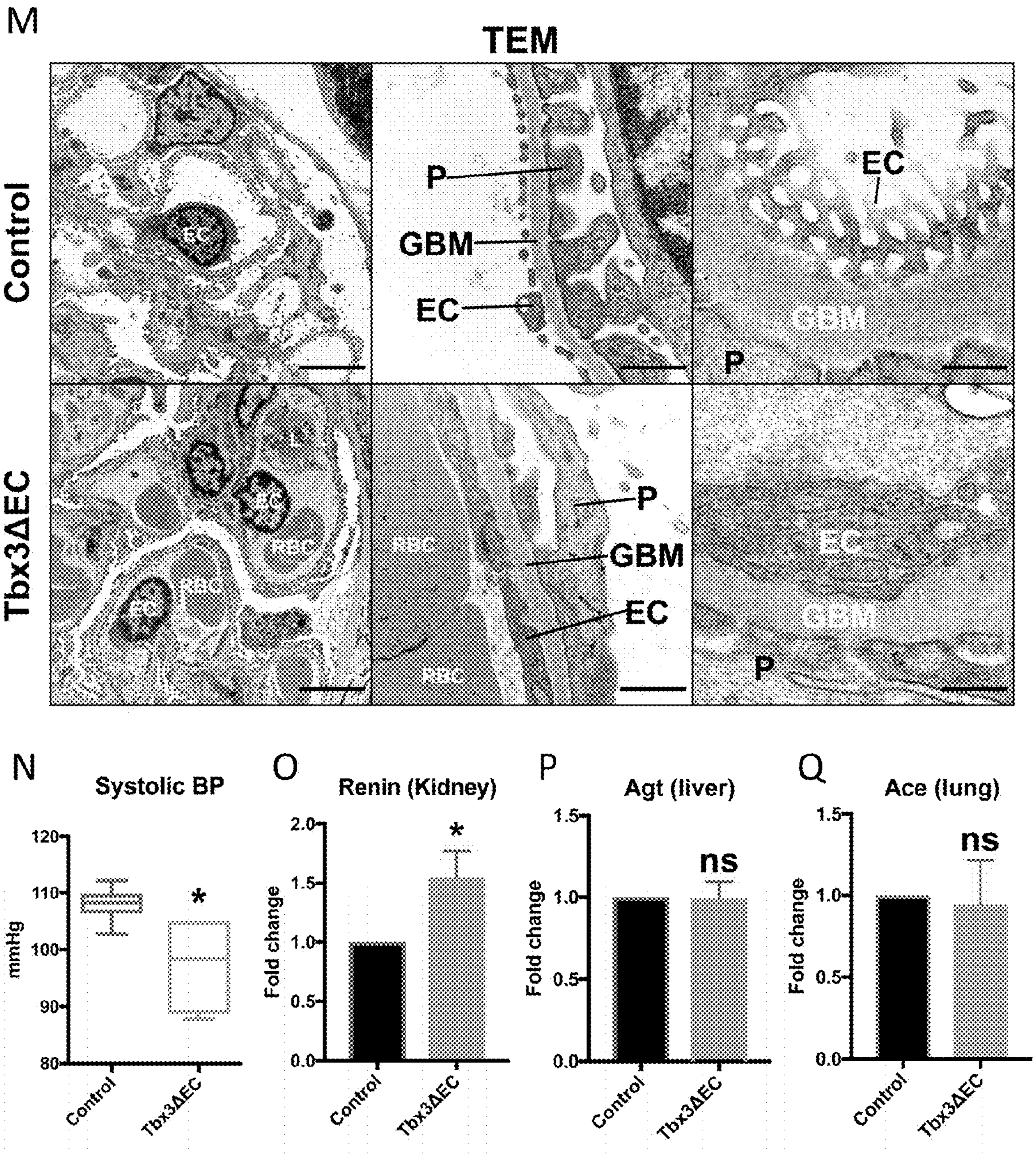

Urinalysis revealed $Tbx3^{\Delta EC}$ mice to have higher levels of urea, protein, and salt, suggesting aberrant nephron filtration or reabsorption (FIGS. 4G-4L). Consistent with most glomeruli appearing normal, serum panel showed few signs of kidney failure. Salt homeostasis, blood urea nitrogen, creatinine, and albumin levels remained normal in $Tbx3^{\Delta EC}$ serum, with normal glomerular filtration rate. Four-month-old $Tbx3^{\Delta EC}$ kidneys did not have significantly fewer ECs and did not show signs of kidney inflammation or apoptosis as marked by cleaved Caspase-3 and CD45 staining, respectively. No significant defects were found in major blood vessels in other organs. Transmission electron microscopy revealed a fraction of GCs with microaneurysms, significantly fewer fenestrations, and surrounded by deformed podocyte foot processes (FIG. 4M). Thus, Tbx3 maintains the structural organization of glomerular capillaries.

To determine whether Tbx3 plays a physiological role in BP homeostasis in adult mice, the inventors measured systolic BP in control and $Tbx3^{\Delta EC}$ mice. Systolic BP in mice lacking endothelial Tbx3 was lower compared to that of control mice (FIG. 4N). To determine whether this was due to defects in the renin-angiotensin system, levels of renin, angiotensinogen, and angiotensin-converting enzyme were measured in the kidney, lung, and liver respectively by qPCR. Renin levels were found to be higher in the absence of Tbx3 in the vasculature of the kidney, while Agt and Ace1 transcript levels remained the same (FIGS. 4O-4Q). Therefore, Tbx3 regulates a putative transcriptional program that suppresses or balances blood pressure via regulation of renin in the kidney.

Figures 5A, 5B:
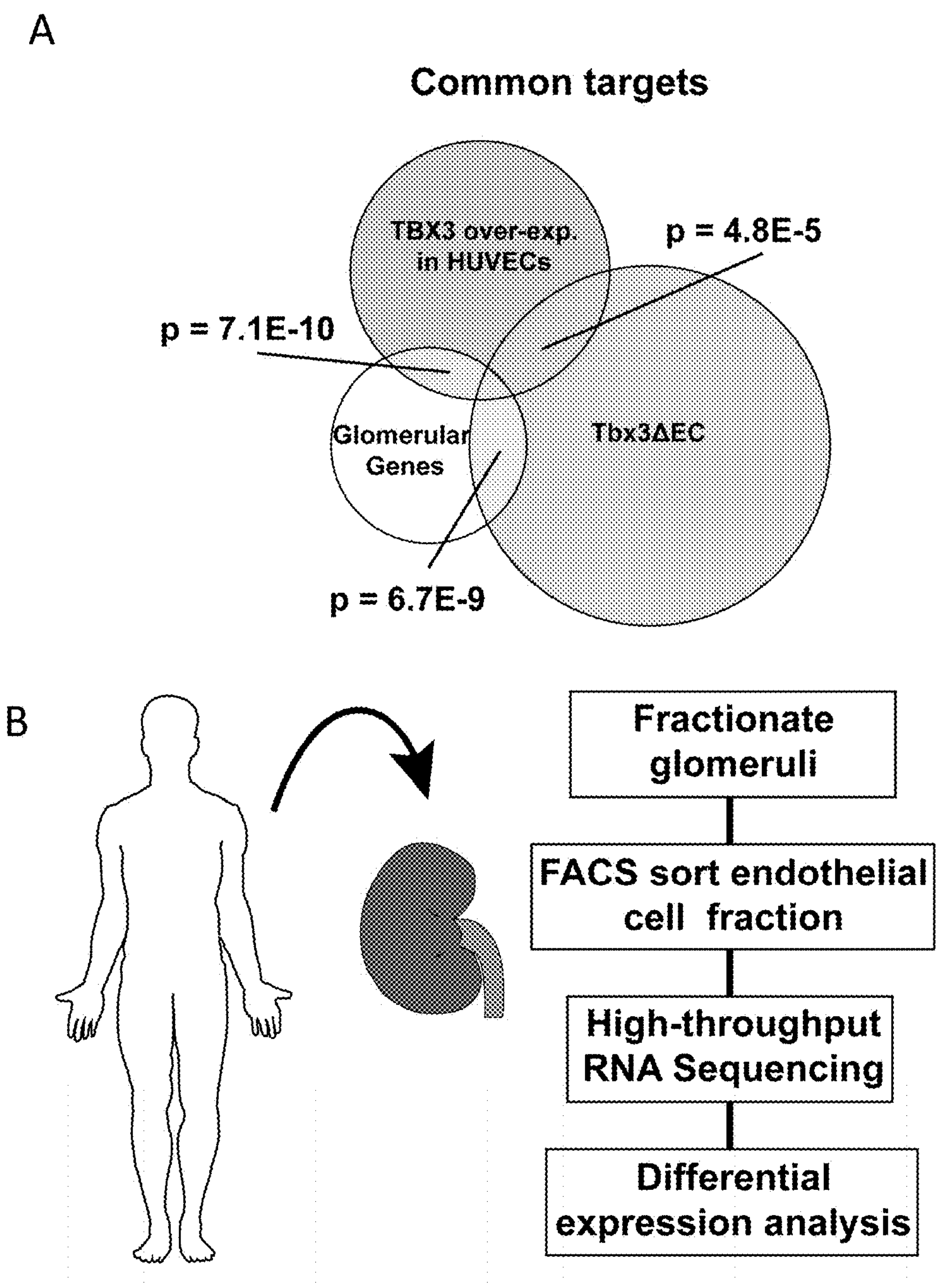
FIGS. 5A-5D. (A) Euler plot between genes significantly downregulated with Tbx3 overexpression in HUVECs, glomerular specific genes, and genes upregulated in Tbx3ΔEC cells. Hypergeometric test p-values for the overlap are indicated. (B) Diagram denoting the workflow to sequence the bulk transcriptome of human glomerular capillaries. (C) Human kidney glomerulus isolated via the glomerular fractionation protocol. Scale bar 20 μm. (D) Heatmap representing the top significantly up or downregulated genes in response to each transcription factor (n=3). Human glomeruli (hGlom) are included as a comparator. Values are fold change compared to empty vector (ALL=collective overexpression of all 4 TF's)

To uncover the mechanism by which Tbx3 mediates glomerular vascular development and function, ECs were isolated from control and $Tbx3^{\Delta EC}$ kidneys and processed for RNA sequencing. Differential expression analysis of glomerular-specific genes between control and $Tbx3^{\Delta EC}$ kidney vasculature revealed an array of transcripts that were differentially expressed after Tbx3 loss in mice. Downregulated genes include the solute transporter Slc44a2, transcription factors Gata5, Klf4, and Smad6, and proteins that mediate adhesion or the cytoskeleton, including Rhob and Itga3. The expression of Ehd3, the most abundant and specific gene in GCs (FIG. 2A), was also downregulated in the absence of Tbx3. Genes that increased in the absence of Tbx3 include those necessary for morphogenesis, (Spry4, Rap1b, and Pcdh17), transcription factors (Irf1, Prdm1, Elf1, and Stat3), and the growth factor Fgf1. While glomeruli represent a small fraction of the kidney vasculature, there was a significant overlap between genes that are differentially expressed in the bulk endothelial population of $Tbx3^{\Delta EC}$ and genes specifically expressed in the glomerular cluster (hypergeometric test p=6.7E-9; FIG. 5A).

To identify potential targets of Tbx3, either Tbx3 or a control vector was overexpressed in human umbilical vein endothelial cells (HUVECs), representing a generic-like vascular bed, and mRNA was sequenced. There was a significant overlap between Tbx3-regulated genes in HUVECs and glomerular-specific genes (hypergeometric test p=7.1E-10, FIG. 5A). When the inventors compared glomerular genes that were upregulated in $Tbx3^{\Delta EC}$ mouse kidney ECs and Tbx3 regulated genes in HUVECs, the inventors found a high concordance with glomerular genes identified through scRNA-seq (hypergeometric test p=4.8E-5, FIG. 5A). Hence, Tbx3 is a very potent and specific mediator of glomerular gene transcription and identity.

Tbx3, Gata5, Prdm1, and Pbx1 Repress Glomerular EC Genes

Figures 4R, 4S, 4T, 4U:
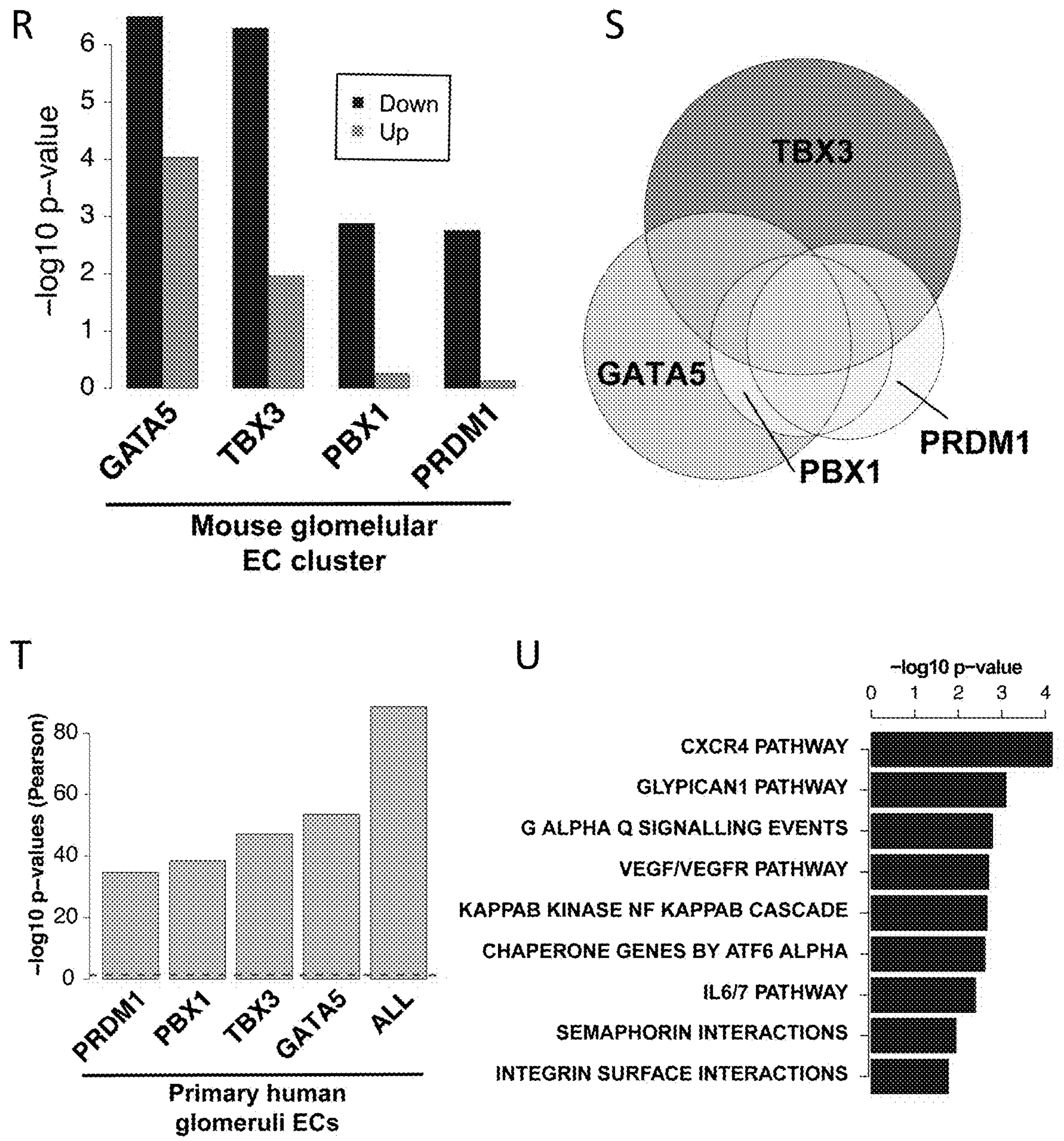

Other transcription factors were found to have enriched expression or activity in GCs in addition to Tbx3 (FIG. 4A), prompting the hypothesis that additional factors might cooperate with Tbx3 to establish glomerular function. To determine whether transcription factors cooperate in GCs, the inventors focused on additional factors with differential expression, including Tbx3, Gata5, Prdm1, and Pbx1. Each gene was stably overexpressed in HUVECs and mRNA was sequenced for each condition. $Log_2$ fold-changes were calculated relative to an empty-vector control (EV) to find genes regulated by each transcription factor. The inventor compared the lists of genes that change in response to stable overexpression of each transcription factor and found that a significant proportion of genes that were downregulated correspond to genes found within the GC cluster (FIG. 4R). The overlap, however, was not nearly as prominent for the sets of genes that are upregulated. Thus, the identified zone-specific transcription factors may be performing as repressors and possibly collaborate to regulate a common set of glomerular-specific targets.

Figure 5C:
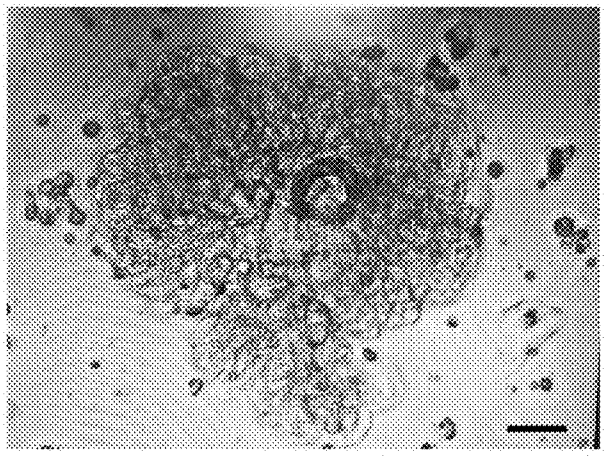
Figure 5D:
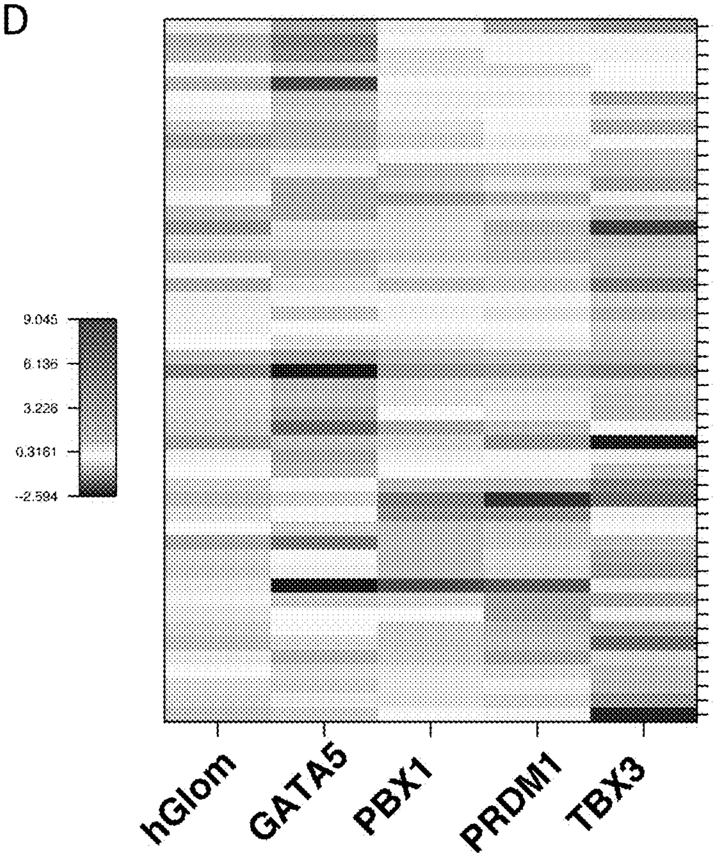

The inventors next sought to determine if transcription factor over-expression, either alone or in combination, is enough to approximate glomerular fate in HUVEC cells. As a positive reference control, the inventors used glomeruli isolated from a deceased-donor human kidney that was not transplanted (FIGS. 5B-5C). $CD31^+VE\text{-}cadherin^+CD45^-$ ECs were FACS-sorted from glomeruli and processed for RNA sequencing. To enable direct comparison between human glomeruli and transcription factor overexpression datasets, all datasets were normalized as a fold-change value relative to the HUVECs expressing an empty lentivirus vector. The inventors selected the top 10 significantly up or down-regulated genes in response to each overexpression condition and compared expression patterns to human glomeruli. The top differentially regulated genes in response to each transcription factor overexpression exhibited similar expression patterns and phenocopied expression patterns in human glomeruli (FIG. 5D). Expression patterns in response to PRDM1 and PBX1 very highly overlapped with that of TBX3 and GATA5, despite PRDM1 and PBX1 being more ubiquitously expressed, though significantly higher in GCs (FIG. 4S). The inventors directly compared correlation values between the expression of glomerular-specific genes in the human glomerulus and in response to each transcription factor. The inventors found that the over-expression of each transcription factor results in a very high correlation with expression patterns of the human glomerulus (FIG. 4T). The inventors next overexpressed all 4 transcription factors simultaneously in HUVECs and found the highest correlation with the human glomerular expression patterns, indicating these factors function additively in dictating glomerular specificity. Hence, overexpression of each transcription factor promotes a signature that renders HUVECs more like human glomeruli and opens avenues towards designing systems to conditionally reprogram cultured cells into human glomeruli.

To identify pathways downstream of these transcription factors, the inventors did pathway enrichment analysis on GC-specific genes regulated by these factors (FIG. 4U). Numerous vascular maintenance pathways, including those found to be enriched in the glomerulus were downregulated. These include the CXCR4 and VEGFR2 signaling pathways, semaphorin interactions, and integrin signaling, prompting the hypothesis that each of these four proteins controls a transcriptional hierarchy through which glomerular specific targets which guide vascular functions, are selectively downregulated to execute various glomerular functions. Accordingly, in $Tbx3^{\Delta EC}$ mice, the inventors observe subsets of glomeruli manifesting hypoplasia, microaneurysms, and fenestration loss, potentially leading to aberrant BP homeostasis. Notably, BP was decreased and there was no indication of vasculopathy in other organs that could induce secondary hypertensive changes in the kidney vasculature. The inventors conclude that Tbx3, along with other factors turns on the expression of pathways that confer the unique vascular functions of GCs. Dysregulation of these genes could lead to defects associated with developmental patterning, EC rarefaction, EC adhesion and contraction, and solute transport (FIG. 4Q).

Example 3

To decipher the molecular determinants regulating intra-kidney vascular network diversity, the inventors employed ddSEQ single-cell RNA sequencing. The inventors identified 6 discrete non-lymphatic vessels in the kidney vasculature. Although several important blood vessels are missing, including lymphatic vessels, the inventors focused primarily on unraveling the signature of glomerular EC, and broadly the veins and capillaries. Each vascular domain displays unique membrane transport proteins, regulators of transcription, growth factors, and endocrine hormone binding proteins that serve known and unknown functions in nephron development, filtrate reabsorption, and blood pressure homeostasis.

Kidney vascular specification begins at E14 while waves of organotypic kidney vascular genes are induced at the onset of birth, in perinatal stages, and during maturation into adult vessels. Genes that are unique to the kidney vasculature relative to other organs are robustly expressed after birth. Compared to the early developmental stages, several gene signatures in the adult kidney vasculature are unique. The inventors propose that this unexpected transition of vascular specialization could be due to the physiological stress on the kidney after birth. Notably, membrane transport proteins that are important for the kidney's vasculature function are not upregulated until after birth, indicating that expression of these transporters may be dependent on stimuli not present during gestation. Alternatively, the transcriptome of the postnatal and adult stages may dramatically differ from the embryonic stages of the same organ through the loss of developmental and mitotic transcripts and the transition to transcripts the kidney needs to function.

How do kidney blood vessels, specifically the capillaries, acquire this complex heterogeneity? One hypothesis suggests extrinsic cues turn off transcription factors driving vascular specialization. To test this, the inventors parsed out genes specific to the kidney and specific to zones of the vasculature. The inventors found that GCs primarily expresses factors that are suppressers of transcription. Pathways repressed by each of these transcription factors correspond to the same pathways that are enriched in the GCs in scRNA-seq. This creates a conundrum as to how genes become specifically expressed in the glomerulus, but also downregulated where Tbx3/Gata5/Prdm1/Pbx1 is expressed. It is conceivable that prior to glomerular specification, the ECs activate generic vascular specification programs with broad vascular gene profiles. Tbx3, Prdm1, Gata5, and Pbx1 may then be recruited to prune gene expression and fine-tune the specialized functions of the glomeruli. Each factor may also modulate other suppressors thereby activating GC genes. Alternatively, each gene may solely function to modulate or balance perinatal and adult kidney-specific processes, including BP homeostasis or glomerular filtration dynamics.

As an example of intrinsic transcriptional suppression regulating GC functions, the inventors focused on Tbx3, as it is robustly represented in the GCs and represses transcription of particular genes in a variety of diverse, yet specific, tissues. $Tbx3^{\Delta EC}$ mice developed phenotypes similar to capillary endotheliosis—glomerular swelling and loss of fenestrations—in subsets of the glomeruli. Differential expression analysis among pooled Tbx3-deleted mouse kidney endothelial cells, TBX3-over-expressing HUVECs, and genes enriched in the murine and human glomeruli revealed that a network of genes that regulate vasodilation/constriction, adhesion, and solute transport that may contribute to hypoplasia, microaneurysms, and loss of fenestrations in $Tbx3^{\Delta EC}$ mice.

A network of developmental genes is also altered in Tbx3 deleted ECs, including Gata5 and Ehd3. Both genes have both been shown to be necessary for the integrity of glomerular endothelium. Mice lacking Gata5 and Ehd3 develop glomerular lesions and kidney failure. $Tbx3^{\Delta EC}$ mice also have inversely correlated phenotypes to mice that lack endothelial Gata5, including aberrant BP and renin signaling, suggesting that both transcription factors may balance BP in the kidney and possibly arterial vessels in other organs. Tbx3 in arterioles, and glomerular endothelium, may suppress genes that allow crosstalk to juxtaglomerular cells, therefore regulating renin secretion, glomerular filtration rate, and BP homeostasis. Tbx3 may also regulate glomerular filtration dynamics by stimulating crosstalk to podocytes under certain conditions. Tbx3 was not found to be expressed in blood vessels in other tissues except for the lungs, which may explain, why phenotypes were centralized primarily in the kidneys. Tbx3 may also function redundantly with its paralogue Tbx2, possibly masking additional phenotypes. Additional studies are necessary to prove these hypotheses and to gain a better understanding of kidney vascular zonation, development, and function.

Notably, each vascular bed expresses a combination of secreted factors and transcriptional regulators that define zonated vascular fate. ECs by supplying angiocrine factors instructively orchestrate tissue healing and regeneration during lung, liver, and bone marrow injury. Generating kidney-specific endothelium may facilitate approaches to rebuild kidneys. The current dataset compiles an array of genes that could be used to engineer kidney-specific vascular endothelium.

What is claimed is:

1. A method of generating human glomeruli endothelial cells (HGECs) from human endothelial cells (ECs), comprising expressing in human ECs an exogenous nucleic acid encoding a T-box transcription factor 3 (Tbx3) polypeptide, or a polypeptide having at least 85% amino acid sequence identity to the Tbx3 polypeptide, and obtaining HGECs that display the phenotypic marker profile: Ehd3+Mapt+Sox17+Mest+Igfbp5+Kdr+VE-cadherin+ (Ehd3: EH Domain Containing 3, Mapt: Microtubule Associated Protein Tau, Sox17: SRY-Box Transcription Factor 17, Mest: Mesoderm Specific Transcript, Igfbp5: Insulin Like Growth Factor Binding Protein 5, Kdr: Kinase Insert Domain Receptor, and VE-cadherin: Vascular Endothelial cadherin).

2. The method of claim 1, wherein the Tbx3 polypeptide comprises an amino acid sequence selected from the group consisting of SEQ ID NO: 1-19.

3. The method of claim 1, wherein the ECs are cultured in serum-free media.

4. The method of claim 1, wherein the ECs are selected from fetal, neonatal, adult, or progenitor ECs.

5. The method of claim 4, wherein the ECs are selected from the group consisting of human umbilical vascular endothelial cells (HUVECs), endothelial cells isolated from adipose tissue, Induced Pluripotent Stem Cells (iPSC)-derived endothelial cells, and adult dermal micro-vascular endothelial cells (hDMECs).

6. The method of claim 1, wherein the ECs are transduced with a vector encoding the Tbx3 polypeptide.

7. The method of claim 1, further comprising expressing at least one exogenous nucleic acid encoding at least one transcription factor selected from the group consisting of a PR domain zinc finger protein 1 (Prdm1) polypeptide, a GATA Binding Protein 5 (Gata5) polypeptide, and a Pre-B-Cell Leukemia Transcription Factor 1 (Pbx1) polypeptide;

wherein the Prdm1 polypeptide is a polypeptide having at least 85% amino acid sequence identity to an amino acid sequence selected from the group consisting of SEQ ID NO: 20-29, and wherein the Gata5 polypeptide is a polypeptide having at least 85% amino acid sequence identity to an amino acid sequence selected from the group consisting of SEQ ID NO: 30-39, and wherein the Pbx1 is a polypeptide having at least 85% amino acid sequence identity to an amino acid sequence selected from the group consisting of SEQ ID NO: 40-49.

8. The method of claim 7, wherein the ECs are transduced with a vector encoding the Tbx3 polypeptide, and with one or more of a vector encoding the Prdm1 polypeptide, a vector encoding the Gata5 polypeptide, and a vector encoding the Pbx1 polypeptide.

9. The method of claim 8, wherein the vectors comprise a selectable marker.

10. The method of claim 9, wherein said selectable marker is an antibiotic resistance marker, an enzymatic marker, an epitope marker, or a visual marker.

11. The method of claim 9, wherein the ECs are enriched for expression of the Tbx3 polypeptide, the Prdm1 polypeptide, the Gata5 polypeptide, the Pbx1 polypeptide, or a combination thereof, by selecting cells expressing at least one selectable marker.

12. The method of claim 8, wherein the expression of one or more of the Tbx3 polypeptide, the Prdm1 polypeptide, the Gata5 polypeptide, and the Pbx1 polypeptide is inducible.

13. The method of claim 8, wherein the expression of one or more of the Tbx3 polypeptide, the Prdm1 polypeptide, the Gata5 polypeptide, and the Pbx1 polypeptide is transient.

14. The method of claim 1, wherein said ECs are cultured for at least 2-5 days, but not more than 10-14 days, to generate HGECs.

15. A substantially pure population of HGECs produced according to the method of claim 1.

16. The substantially pure population of HGECs of claim 15, wherein the HGECs, when transplanted into a subject, restore filtration of solutes, balance acid-base disruption and normalize vasomotor tone.

17. The substantially pure population of HGECs of claim 15, wherein the HGECs display substantially the same characteristics as a human glomeruli cell isolated from a human kidney.

18. A composition, comprising HGECs produced according to the method of claim 1 in a pharmaceutically acceptable carrier.

19. A method of treating a renal disorder, comprising administering HGECs produced according to the method of claim 1 to a subject in need thereof.

20. The method of claim 19, wherein the renal disorder is selected from chronic kidney failure and acute kidney failure.

21. The method of claim 19, wherein the HGECs are autologous to said recipient.

22. The method of claim 19, wherein the HGECs do not cause malignant transformation in said recipient.

23. The method of claim 19, wherein the HGECs are administered intravenously.

24. The method of claim 19, wherein the HGECs are mixed with kidney organoids before administration.

* * * * *